United States Patent
Bateman et al.

(10) Patent No.: US 9,150,721 B2
(45) Date of Patent: Oct. 6, 2015

(54) SELF HEALING POLYMER MATERIALS

(75) Inventors: Stuart Bateman, Campbell (AU); Sam Meure, Campbell (AU); Dong Yang Wu, Campbell (AU); Scott Furman, Campbell (AU); Sarah Khor, Campbell (AU); Russell Varley, Campbell (AU)

(73) Assignee: COMMONWEALTH SCIENTIFIC AND INDUSTRIAL RESEARCH ORGANISATION, ACT (AU)

( * ) Notice: Subject to any disclaimer, the term of this patent is extended or adjusted under 35 U.S.C. 154(b) by 298 days.

(21) Appl. No.: 13/376,359

(22) PCT Filed: Jun. 18, 2010

(86) PCT No.: PCT/AU2010/000763
§ 371 (c)(1),
(2), (4) Date: Mar. 16, 2012

(87) PCT Pub. No.: WO2010/144971
PCT Pub. Date: Dec. 23, 2010

(65) Prior Publication Data
US 2012/0165432 A1 Jun. 28, 2012

(30) Foreign Application Priority Data
Jun. 19, 2009 (AU) .............................. 2009902849

(51) Int. Cl.
*C08L 63/02* (2006.01)
*C08K 5/17* (2006.01)
(Continued)

(52) U.S. Cl.
CPC ............... *C08L 31/02* (2013.01); *C08G 59/502* (2013.01); *C08L 33/02* (2013.01); *C08L 63/00* (2013.01); *C08L 23/02* (2013.01); *C08L 23/0869* (2013.01); *C08L 23/0892* (2013.01)

(58) Field of Classification Search
CPC ...................................................... C08F 22/02
See application file for complete search history.

(56) References Cited

U.S. PATENT DOCUMENTS 4,421,897 A * 12/1983 Gutekunst et al. ............ 525/119
4,524,107 A * 6/1985 Marchetti et al. ............. 428/413
(Continued)

FOREIGN PATENT DOCUMENTS

JP 2000313818 A * 11/2000 ............ C08L 101/16
WO WO-88/03155 5/1988
(Continued)

OTHER PUBLICATIONS

M. Zako et al., "Intelligent Material Systems Using Epoxy Particles to Repair Microcracks and Delamination Damage in GFRP," J. Intell. Mat. Sys. Struct. 10:836-841 (1999).*
(Continued)

*Primary Examiner* — Mark Kaucher
*Assistant Examiner* — Kregg Brooks
(74) *Attorney, Agent, or Firm* — Foley & Lardner LLP

(57) ABSTRACT

The present invention generally relates to self healing polymer materials comprising thermoset and thermoplastic polymers. The present invention also relates to a method of manufacturing self healing polymer materials, methods of post-curing and healing the self healing polymer materials, composite materials comprising self healing polymer materials and methods of preparing the composite materials. In an attempt to develop improved structural materials, polymers and polymer materials have been identified that can be used in materials to act as self healing agents to repair structural damage occurring in the materials. The self healing polymer materials that have been identified are capable of being healed under post-curing or healing conditions.

22 Claims, 43 Drawing Sheets

(51) Int. Cl.
  *C08L 31/02* (2006.01)
  *C08G 59/50* (2006.01)
  *C08L 33/02* (2006.01)
  *C08L 63/00* (2006.01)
  *C08L 23/02* (2006.01)
  *C08L 23/08* (2006.01)

(56) References Cited

U.S. PATENT DOCUMENTS

| | | | |
|---|---|---|---|
| 4,954,195 A | | 9/1990 | Turpin |
| 5,248,550 A | * | 9/1993 | Turpin et al. ............ 442/63 |
| 6,566,414 B2 | * | 5/2003 | Takeshima et al. .......... 522/100 |
| 2010/0174041 A1 | * | 7/2010 | Klein ............... 526/335 |

FOREIGN PATENT DOCUMENTS

| | | |
|---|---|---|
| WO | WO-2005/066244 A2 | 7/2005 |
| WO | WO-2006/072767 A1 | 7/2006 |

OTHER PUBLICATIONS

Machine translation of JP 2000-313818.*
Nucrel 0403 Data Sheet (2010).*
Chemnetbase, Polymers: A Property Database, Bisphenol A Diglycidyl Ether Resin, no date.*
Dong Yang Wu et al., "Self-healing materials: A review of recent developments", Progress in Polymer Science, 33 (2008) 479-522.
International Search Report PCT/AU2010/000763 dated Jul. 13, 2010.
S.A. Hayes et al., "Self-healing of damage in fibre-reinforced polymer-matrix composites", J.R. Soc. Interface (2007), 4, 381-387.

* cited by examiner

SELF HEALING POLYMER MATERIALS

CROSS-REFERENCE TO RELATED APPLICATIONS

The subject application is the U.S. National Phase of PCT/AU2010/000763, filed Jun. 18, 2010, which claims priority to Australian Patent Application No. 2009902849, dated Jun. 19, 2009, each of which applications is incorporated herein by reference in entirety.

FIELD

The present invention generally relates to self healing polymer materials. More particularly, but not exclusively, the present invention relates to self healing polymer materials comprising thermoset and thermoplastic polymers. The present invention also relates to a method of manufacturing self healing polymer materials, methods of post-curing and healing the self healing polymer materials, composite materials comprising self healing polymer materials and methods of preparing the composite materials.

BACKGROUND

Epoxy resins are widely used as thermoset polymers for manufacturing fibre reinforced composites in structural applications. The highly crosslinked structure of these materials makes them inherently brittle and susceptible to micro-crack formation deep within the structure where detection and intervention are difficult or impossible.

The development of self healing or mendable epoxy resins has been proposed in recent years to restore strength to damaged components and make these materials safer to use, more reliable, and easier to maintain. The mendable epoxy resins have typically contained a dispersion of brittle vessels containing liquid healing agents that are capable of fracturing to release healing agents which subsequently rejoin contiguous damaged areas. These known technologies possess a number of limitations such as high raw materials cost, limited stability of the healing agents, extra processing steps required for encapsulating or infiltration of the healing agents into the delivery vessels, and limited ability to heal multiple incidents of damage.

An alternative approach has involved using thermoplastic healing agents. Thermoplastic healing agents have been included as additives or directly blended with the matrix to form smart epoxy-carbon fibre laminate structures exhibiting structural health monitoring and self-healing functions whereby the carbon fibres act as sensing elements to detect potential damages, by monitoring change in resistance, and as local heating elements to trigger the healing process.

Presently known thermoplastic based mendable polymers are limited by the need for high temperatures and pressures during healing, or achieving healing at the expense of reduced strength.

A need exists for new and alternative polymers and polymer materials that can provide improved self healing characteristics.

SUMMARY

In an attempt to develop improved structural materials, polymers and polymer materials have been identified that can be used in materials to act as self healing agents to repair structural damage occurring in the materials.

In one aspect, the present invention provides a self healing polymer material comprising a primary polymer phase and a secondary polymer phase, wherein:
  the primary polymer phase comprises a thermoset polymer matrix or one or more polymerizable thermoset agents capable, on curing, of producing a thermoset polymer matrix;
  the secondary polymer phase comprises a thermoplastic polymer that is capable of acting as a self healing agent and being chemically reactive, on post-curing or healing of the self healing polymer material.

Typically, the one or more polymerizable thermoset agents are selected to enable curing of the thermoset polymer matrix at a temperature substantially less than the melt temperature ($T_m$) for the thermoplastic polymer. The thermoplastic polymer can also be selected to have a melt temperature to promote, on post-curing or healing, the flow or movement of the thermoplastic polymer into an interstitial gap if present in the self healing polymer material.

In one embodiment, the secondary polymer phase is provided in an amount, on a volume basis with respect to the self healing polymer material, of up to about 40%, up to about 30%, up to about 25%, up to about 20%, up to about 15%, up to about 10%, or at least about 1%, at least about 5%, at least about 10%, or in a range of 1-30%, in a range of 5-25%, in a range of 5-20%, in a range of 10-20%, in a range of 15-20%, in a range of 15-18%, or in an amount of about 18%. In another embodiment, the secondary polymer phase is provided in an amount, on a volume basis with respect to the self healing polymer material, of up to about 30%, in the range of 5 to 25%, or in the range of 10 to 20%.

In another embodiment, the thermoset polymer matrix and thermoplastic polymer have functional groups attached to and/or incorporated into the backbone of the polymer. The functional groups may be in the form of pendant groups attached to the backbone of the polymer, form part of the backbone of the polymer, or be a combination of forms thereof.

The functional groups can be selected to promote, on post-curing or healing of the self healing polymer material, interfacial bonding between the thermoset polymer matrix and the thermoplastic polymer. The interfacial bonding typically involves hydrogen bonding, although the functional groups may be selected to promote covalent bonding on post-curing or healing of the selfhealing polymer material. In another embodiment, the functional groups can be selected to facilitate, on post-curing or healing of the self healing polymer material, chemical reaction of the thermoplastic polymer to produce a volatile by-product capable of forming a gas pocket in the thermoplastic polymer. The formation of the gas pocket can act to increase expansive pressure and enable flow or movement of the thermoplastic polymer into an interstitial gap if present in the self healing polymer material. In this way, the functional groups between the thermoset polymer matrix and thermoplastic polymer can be matched to facilitate the desired bonding and/or chemical reaction.

The functional groups of the thermoplastic polymer can be selected from one or more of the group consisting of amine, acid, hydroxyl, epoxy, ketone, ether, ester, or salts thereof. The acid can be an organic acid or a salt thereof. In a preferred embodiment the organic acid is a carboxylic acid or a salt thereof.

The functional groups of the thermoset polymer matrix can be selected from one or more of the group consisting of epoxy, urethane, imide, cyanate ester, benoxazine, polyester, vinyl ester, phenolic, bismaleimide, amine, acid, hydroxyl, ketone, ether, ester, or salts thereof. Preferably, the functional groups of the thermoset polymer matrix are selected from one or more of the group consisting of epoxy, amine and hydroxyl. More preferably, the amine is a tertiary amine.

The thermoset polymer matrix can be an epoxy based resin or the one or more polymerizable thermoset agents are epoxy resin forming agents. The epoxy based resin forming agents can comprise a resin and a hardener. The resin may be diglycidyl ether of bisphenol A (DGEBA). The hardener may be triethylenetetraamine (TETA). In one embodiment, the epoxy based resin forming agents comprise DGEBA and TETA. In another embodiment, the ratio of TETA:DGEBA is about 1:1.

The thermoplastic polymer can be a functionalised polyolefin or copolymer thereof. The thermoplastic polymer can be a functionalised polyolefin or copolymer thereof. In a preferred embodiment, the functionalised polyethylene or copolymer thereof is polyethylene co-methacrylic acid (EMAA).

In another embodiment, the thermoplastic polymer can be provided in the primary polymer phase as a dispersion of discrete portions. The thermoplastic polymer may be selected to be capable of producing a gas pocket within one or more discrete portions, on post-curing or healing of the self healing polymer material. The discrete portions can be in the form of particles having diameters of less than 1000 μm, less than 600 less than 500 μm, less than 400 μm, less than 300 μm, less than 200 μm, at least 50 μm, at least 100 μm, or in the range of 50-600 μm, in the range of 100-500 μm, or in the range of 250-450 μm. In one embodiment the diameters are in the range of 250-450 μm.

In another embodiment, the thermoplastic polymer is provided in the primary polymer phase in the form of one or more fibres, or woven or interlaced matrix or fabric formed from the fibres thereof. The one or more fibres can have diameters less than 400 μm, less than 300 μm, less than 200 μm, less than 100 μm, at least 10 μm, at least 50 μm, or in the range of 10-200 μm, in the range of 50-175 μm, or in the range of 100-150 μm. In one embodiment the diameters are in the range of 100-150 μm.

The thermoplastic polymer can be provided with functional groups selected to facilitate, on post-curing or healing of the self healing polymer material, chemical reaction to produce a volatile by-product capable of forming a gas pocket within a discrete portion of the thermoplastic polymer to increase expansive pressure and promote movement of the thermoplastic polymer into an interstitial gap if present in the self healing polymer material.

The thermoplastic polymer may be provided in various forms. In one embodiment, the thermoplastic polymer is partly or wholly encapsulated in an encapsulating agent. The encapsulating agent may be a thermoplastic polymer, a thermoset polymer, or a combination thereof.

The self healing polymer material may further comprise one or more additives.

In another aspect, the present invention provides a fibre reinforced composite comprising a fibrous reinforcement component and the self healing polymer material according to any of the above embodiments.

In another aspect, the present invention provides use of the self healing polymer material according to any of the above embodiments, as a coating or laminate.

In another aspect, the present invention provides a method for producing the self healing polymer material according to any of the above embodiments, whereby the method comprises:
dispersing the thermoplastic polymer into at least a first polymerizable thermoset agent, and
curing the at least first polymerizable thermoset agent to form a thermoset polymer matrix where the thermoplastic polymer is embedded or dispersed within the thermoset polymer matrix.

In another aspect, the present invention provides a partly or wholly encapsulated thermoplastic polymer that is capable of acting as a self healing agent within a thermoset polymer matrix, wherein the thermoplastic polymer is partly or wholly encapsulated with an encapsulating agent. The encapsulating agent may be a thermoplastic polymer, a thermoset polymer, or a combination thereof.

DETAILED DESCRIPTION

The particular embodiments of the present invention are described as follows, namely new polymer materials for use as self healing agents to repair structural damage forming in the materials.

Self Healing Polymer Material

The self healing polymer material according to the present invention comprises a primary polymer phase and a secondary polymer phase. The primary polymer phase comprises a thermoset polymer matrix or one or more polymerizable thermoset agents capable, on curing, of producing a thermoset polymer matrix. The secondary polymer phase comprises a thermoplastic polymer that is capable of acting as a self healing agent and being chemically reactive, on post-curing or healing of the self healing polymer material.

The thermoplastic polymer may be chemically reactive with the primary polymer phase, the secondary polymer phase or a component therein, under elevated temperatures applied to the self healing polymer material during post-curing or healing. It will be appreciated that the thermoplastic polymer is capable of being post-cured or healed at a temperature that does not decompose the thermoset polymer matrix. Typically, the one or more polymerizable thermoset agents are selected to enable curing of the thermoset polymer matrix at a temperature substantially less than the melt temperature ($T_m$) for the thermoplastic polymer. The thermoplastic polymer can also be selected to have a melt temperature to promote, on post-curing or healing, the flow or movement of the thermoplastic polymer into an interstitial gap if present in the self healing polymer material.

It will be appreciated that the term "curing" relates to the formation of the thermoset polymer matrix of the self healing polymer material. The terms "post-curing" and "healing" relate to the application of elevated temperatures and/or pressures for activating the thermoplastic polymer to undergo healing in the self healing polymer material.

According to various embodiments, it will be appreciated that the term "polymer" may include copolymers, prepolymers or monomers capable of forming the polymer.

Thermoplastic Polymer

For the thermoplastic polymer to act as a self healing agent, under healing conditions the thermoplastic polymer needs to be able to flow or move into an interstitial gap or crack if present in the material and undergo some form of bonding with the material, typically interfacial bonding such as hydrogen bonding with the thermoset polymer and/or thermoplastic polymer. According to the present invention, the thermoplastic polymer is also capable of being chemically reactive on post-curing or healing. For example, the chemical reactivity can provide a pressure-driven delivery mechanism of the thermoplastic polymer into a region in need of healing, such as by providing volatile by-products that expand under the healing conditions and force the thermoplastic polymer into interstitial gaps or cracks in the material. The properties of acting as a self healing agent and chemical reactivity may be provided by selecting appropriate functional groups in the thermoplastic polymer, and/or thermoset polymer matrix. Functional groups may be attached to or incorporated into the backbone of polymers such that they are available for bonding or chemical reaction. The functional groups may be in the form of pendant groups attached to the backbone of the polymer, form part of the backbone of the polymer, or be in a combination of forms thereof. It will be appreciated that the pendant groups may allow a range of spacing of one or more functional groups from the backbone of the polymer.

The thermoplastic polymer can be incorporated with the thermoset polymer matrix as a dispersion of discrete portions, for example particles or fibres. As mentioned above, the thermoplastic polymer is capable of being chemically reactive, on post-curing or healing, from within the self healing polymer material. For example, at elevated temperatures or pressures during post-curing or healing, the thermoplastic polymer can undergo a chemical reaction, such as a reaction to form a covalent bond and/or produce volatile by-products, from within the dispersed portion or at or near the surface of the dispersed portion, such as a chemical reaction at the interface between the primary polymer phase and the secondary polymer phase.

The thermoplastic polymer can be selected to be capable of undergoing a healing process within the thermoset polymer matrix when an external temperature and/or pressure is applied to the self healing polymer material that is sufficient to enable flow or movement of the thermoplastic polymer at or near an interface with the thermoset polymer matrix that is contiguous with an area of the material that is in need of healing. The thermoplastic polymer may then move into interstitial gaps, which may have been formed in or through the primary and/or secondary polymer phases. The chemical reactivity of the thermoplastic polymer facilitates movement into interstitial gaps, for example by producing volatile by-products which form gas bubbles that increase expansive pressure, and may also facilitate adhesive bonding with the thermoset polymer matrix. Thermoplastic polymers have been identified that can attain a balance between movement on healing as well as providing strong bonding interactions with primary polymer phases that enable healing or regain in strength of the primary polymer phases following damage.

The thermoplastic polymers, on dispersion in an appropriate primary polymer phase, and under post curing or healing conditions, can create a positive pressure to facilitate movement and bonding of the thermoplastic material with a thermoset polymer matrix, for example, by forming expanding bubbles in portions of the thermoplastic polymer dispersed or embedded in the primary polymer phase.

The thermoplastic polymers can have chemical functionality incorporated therein to facilitate a chemical reaction, on post curing, in a portion of the thermoplastic polymer that results in an increase in volume of the thermoplastic portion after the bulk phase is rigid, for example, by forming gas pockets or bubbles in the thermoplastic portion during post curing.

The thermoplastic polymers preferably have a low viscosity during healing. The thermoplastic polymers are also selected such that, on post curing or healing, pressure can be created via the thermoplastic polymer to facilitate movement of the thermoplastic polymer to the damaged region during healing. Other preferred thermoplastic polymers are polymers that can be provided in forms allowing dispersion in a primary polymer phase as a discrete or semicontinuous phase, for example, in the form of particles or a continuous or discontinuous fibre or fabric. Other preferred thermoplastic polymers include thermoplastic polymers with functional groups incorporated along the backbone of the polymer to facilitate bonding or chemical reaction with the thermoset polymer matrix. The thermoplastic polymer can also be selected so that the physical properties match the desired characteristic of the repair.

The bonding or chemical reactivity between the primary polymer phase and secondary polymer phase can be restricted or prevented until after the post-curing or healing conditions have been applied. It is preferred that the bonding between the primary phase, and in particular covalent bonding by chemical reaction, is prevented or restricted between the functionality on the backbone of the thermoplastic polymer and the thermoset polymer matrix until after post-curing or healing is initiated.

The thermoplastic polymer is selected to be capable of movement into an interstitial gap present in the self healing polymer material when an external temperature and/or pressure is applied to the self healing polymer material that is sufficient to enable flow or movement of the thermoplastic polymer. In another embodiment, the thermoplastic polymer material is capable of producing a gas pocket within a dispersed discrete portion of the secondary polymer phase when an external temperature and/or pressure is applied to the self healing polymer material. Although not wishing to be bound by any theory, it is understood that the formation of gas pockets in the thermoplastic material facilitate movement and interfacial bonding of the thermoplastic polymer with the thermoset polymer matrix. To achieve a certain level of bonding between the thermoplastic polymer and the thermoset polymer matrix, a certain level of viscosity should be attained in the thermoplastic polymer, with the required pressures and temperatures to obtain the viscosities depending on the form and type of thermoplastic polymer used.

The thermoplastic polymer contains functional groups capable of interfacial bonding with the thermoset polymer matrix, for example adhesive or covalent bonding at an interface where the thermoplastic polymer contacts the thermoset polymer. The thermoset polymer matrix or one or more polymerizable thermoset agents also contain functional groups capable of interfacial bonding with the thermoplastic polymer. The functional groups may include amines, carboxylic acids, hydroxyl, oxiranes, ketones, ethers, esters, conjugated compounds such as aromatics, or salts thereof. Strong interfacial bonding ineteractions between the thermoplastic and thermoset polymers, which are facilitated by selection of appropriate functional groups and typically involve a substantial amount of hydrogen bonding, provides for effective self healing properties.

Types of interfacial bonding may include chemical or physicochemical interactions selected from the group consisting of covalent bonding, ionic bond formation, Van der Waals, acid-base, hydrogen bonding, dipole-dipole interactions. The primary interfacial bonding before healing is typically hydrogen bonding. Preferably, covalent bonding between the thermoplastic polymer and the thermoset polymer matrix, before post-curing or healing, is restricted. Interfacial bonding after healing typically comprises hydrogen bonding and may also include ionic bonding. In an embodiment, the interfacial bonding after healing comprises covalent bonding.

The thermoplastic polymers may have one or more functional groups that are capable of interfacial covalent bonding with the thermoset polymer at a temperature substantially higher than the temperature necessary for curing the thermoset polymer matrix, for example at a temperature of post-curing or healing.

The thermoplastic polymers also have one or more functional groups that are capable of chemical reaction, on post-curing or healing of the self healing polymer material. The chemical reaction produces a volatile by-product capable of forming gas bubbles or gas pockets that increase expansive pressure and facilitate flow or movement of the thermoplastic polymer into an interstitial gap if present in the self healing polymer material. In other words, the formation of volatile bubbles under post-curing conditions provides a pressure delivery mechanism for enhancing the movement of the thermoplastic healing polymer into any interstitial gaps or cracks that may be present in the damaged material that requires healing. The chemical reaction may involve the formation of a covalent bond between the thermoplastic polymer and the thermoset polymer matrix. Alternatively the chemical reaction may be between the thermoplastic polymer and itself or another component present in the material. For example, to achieve the desired bonding and chemical reactivity (to enable bubble formation and increase pressure to enhance movement of thermoplastic healing agent) the functionality on the thermoplastic polymer and thermoset polymer can be matched. For the embodiment where thermoplastic polymer EMAA is dispersed in DGEBA-TETA thermoset matrix the ratio of DGEBA:TETA is preferably about 1:1.

Although not wishing to be bound by any theory, it is understood that one way to produce a volatile by-product that is capable of forming an expanding bubble wider the elevated temperatures of post-curing and/or healing, is to promote the formation of a condensation reaction from the thermoplastic polymer. This may be achieved by incorporating functional groups along the backbone of the thermoplastic and/or thermoset polymer that facilitate a condensation reaction. The functional groups involved in bonding may also be involved in the chemical reaction. The functional groups "along the backbone of the polymer" refers to functional groups being incorporated as pendant groups attached to the polymer backbone or as forming part of the polymer backbone. In one embodiment, acid groups, which may be organic acid groups such as carboxylic acid, can be incorporated along the backbone of the thermoplastic polymer. It is understood that such acid groups are available to react with hydroxyl groups, and may be catalysed by the presence of tertiary amines, to form condensation products such as $H_2O$ that are volatile at the elevated temperatures and pressures associated with healing. In another embodiment, the thermoplastic polymer contains carboxylic acid groups. The thermoset polymer matrix can also be provided with a sufficient amount of available tertiary amines and hydroxyl groups to promote a condensation reaction. It has been found that for the material comprising EMAA thermoplastic polymer in a range of about 10 to 20 vol % dispersed in DGEBA-TETA thermoset polymer matrix, the ratio of DGEBA:TETA of 1:1 provides an appropriate amount of available tertiary amine groups, hydroxyl and carboxylic acid groups to form a volatile by-product and initiate bubble formation on post-curing or healing.

The functional groups of the thermoplastic polymer can be selected from one or more of the group consisting of amine, acid, hydroxyl, epoxy, ketone, ether, ester, or salts thereof. The acid can be an organic acid or a salt thereof. In a preferred embodiment the organic acid is a carboxylic acid or a salt thereof. The carboxylic acid may be provided by using a polyethylene methacrylic acid as the thermoplastic polymer. Other types of acids, different co-polymer ratios, grafting ratios, and/or blends thereof form part of the invention. The thermoplastic polymer can be a functionalised polyolefin or copolymer thereof, which may include a functionalised polyolefin or copolymer thereof. The functionalised polyethylene or copolymer thereof may be polyethylene co-methacrylic acid (EMAA). It will be appreciated that the term "functionalised" refers to the polyolefin and polyethylene having functional groups as previously described. It will also be appreciated that the polyolefin and polyethylene copolymers may have functional groups as previously described.

It will be understood that a polyolefin is a polymer produced from a simple olefin (or alkene) as a monomer. For example, polyethylene is the polyolefin produced by polymerizing the olefin ethylene. Thermoplastic polyolefins may include polyethylene (PE), polypropylene (PP), polymethylpentene (PMP), or polybutene-1 (PB-1). Polyethylene copolymers may include poly(ethylene-co-butylene) (PEB).

The secondary polymer phase is provided in an amount, on a volume basis with respect to the self healing polymer material, of up to about 40%, up to about 30%, up to about 25%, up to about 20%, up to about 15%, up to about 10%, or at least about 1%, at least about 5%, at least about 10%, or in a range of 1-30%, in a range of 5-25%, in a range of 5-20%, in a range of 10-20%, in a range of 15-20%, in a range of 15-18%, or in an amount of about 18%. In another embodiment, the secondary polymer phase is provided in an amount, on a volume basis with respect to the self healing polymer material, of up to about 30%, in the range of 5 to 25%, or in the range of 10 to 20%.

The thermoplastic polymer can be provided in the primary polymer phase as a dispersion of discrete portions. The thermoplastic polymer may be selected to be capable of producing a gas pocket within one or more discrete portions, on post-curing or healing of the self healing polymer material. The discrete portions can be in the form of particles having diameters of less than 1000 µm, less than 600 µm, less than 500 µm, less than 400 µm, less than 300 µm, less than 200 µm, at least 50 µm, at least 100 µm, or in the range of 50-600 µm, in the range of 100-500 µm, or in the range of 250-450 µm. In one embodiment the diameters are in the range of 250-450 µm.

The thermoplastic polymer can be provided in the primary polymer phase in the form of one or more fibres, or woven or interlaced matrix or fabric formed from the fibres thereof. The one or more fibres can have diameters less than 400 µm, less than 300 µm, less than 200 µm, less than 100 µm, at least 10 µm, at least 50 µm, or in the range of 10-200 µm, in the range of 50-175 µm, or in the range of 100-150 µm. In one embodiment the diameters are in the range of 100-150 µm.

The self healing polymer material according to various embodiments as described above can have strength recovery healing rates ($\eta\rho$) of at least 100%, at least 110%, at least 120%, at least 130%, at least 140%, based on sustainable peak load using single edge notched bars (SENB) and an Instronn 5566 machine, with testing conducted at 23° C. in accordance with ASTM-D5045 using 5×10×50 mm bars in a 40 mm span three point bend with crosshead speed of 165 µm/sec, and applying to the bar a 2 mm deep pre-crack generating on testing an average crack length of about 9 mm.

It will be appreciated that post-curing and healing conditions will depend on, the nature of the primary polymer phase and the secondary polymer phase. It is preferred that the thermoplastic polymers can be post-cured or healed at relatively low temperatures and pressures, for example, by having melt temperatures ($T_m$) generally below 300° C. It will also be appreciated that the healing and post-curing conditions will need to be lower than the temperature at which the thermoset polymer materials decompose. Because of the typically asymptotic nature of the relationship between temperature and duration required for healing, it will also be appreciated that lower temperatures will require longer healing times to achieve similar strength recovery rates. A particular lower temperature will eventually be reached that cannot initiate healing (i.e. a critical healing temperature exists for a particular polymer material. It will be appreciated that optimal healing temperatures will vary depending on the nature of the polymer material, degree of healing required, duration and cycles of healing. For example, it has been observed that in some materials incorporating EMAA as thermoplastic polymer particles in DGEBA-TETA thermoset polymer matrix, a minimum healing condition requires the temperature be at least about 110° C.

Thermosetting Polymer Matrix

The thermoset polymer matrix can be formed from one or more polymerizable thermoset agents.

The functional groups of the thermoset polymer matrix, or polymerizable thermoset agents, can be selected from one or more of the group consisting of epoxy, urethane, imide, cyanate ester, benoxazine, polyester, vinyl ester, phenolic, bismaleimide, amine, acid, hydroxyl, ketone, ether, ester, or salts thereof. Preferably, the functional groups of the thermoset polymer matrix are selected from one or more of the group consisting of epoxy, amine and hydroxyl. More preferably, the amine is a tertiary amine.

It will be appreciated that the invention also extends to polymerizable agents such as monomers, co-monomers, prepolymers or polymers that are capable of producing the thermoset polymers described. Preferably, the thermoset polymer matrix is an epoxy based resin or the one or more polymerizable thermoset agents are epoxy resin forming agents. Examples of suitable polymerizable thermoset agents include triethylene-tetraamine (TETA) and diglycidyl ether of bisphenol A (DGEBA). The epoxy based resin may be aliphatic epoxy based resins, such as caprolactone based resins, or aromatic based resins, such as diglycidyl ether based resins.

For epoxy based resins such as diglycidyl ether based resins, the one or more polymerizable thermoset agents typically comprise a resin and a hardener.

The resin is essentially an epoxy prepolymer, typically formed by reaction of an epoxy monomer (e.g. chloromethyloxirane) and an aromatic diol (e.g. bisphenol A). The reaction of bisphenol-A (4,4'-dihydroxy-2,2-diphenylpropane) with chloromethyloxirane forms a diglycidyl ether of Bisphenol A (commonly abbreviated BADGE or DGEBA), which has the following formula:

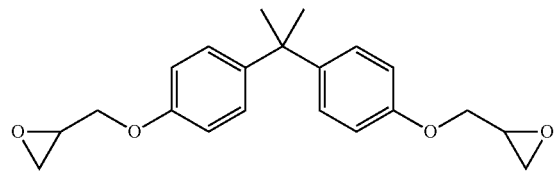 [SMILES: CC(C)(c1ccc(OCC2CO2)cc1)c1ccc(OCC2CO2)cc1]

It will be appreciated that many other prepolymer resins may be suitable.

The hardener is a cross-linking agent, which is typically a polyamine monomer e.g. TETA.

When the hardener and resin are mixed together the amine groups react with epoxide groups to form a covalent bond, typically resulting in a highly crosslinked, rigid and strong polymer material. For example, the following reaction scheme shows a configuration of crosslinking that may be formed between DGEBA and TETA that provides a thermoset matrix with functional groups including epoxy (oxirane), aromatic groups, ether, hydroxyl, and amine including tertiary amine:

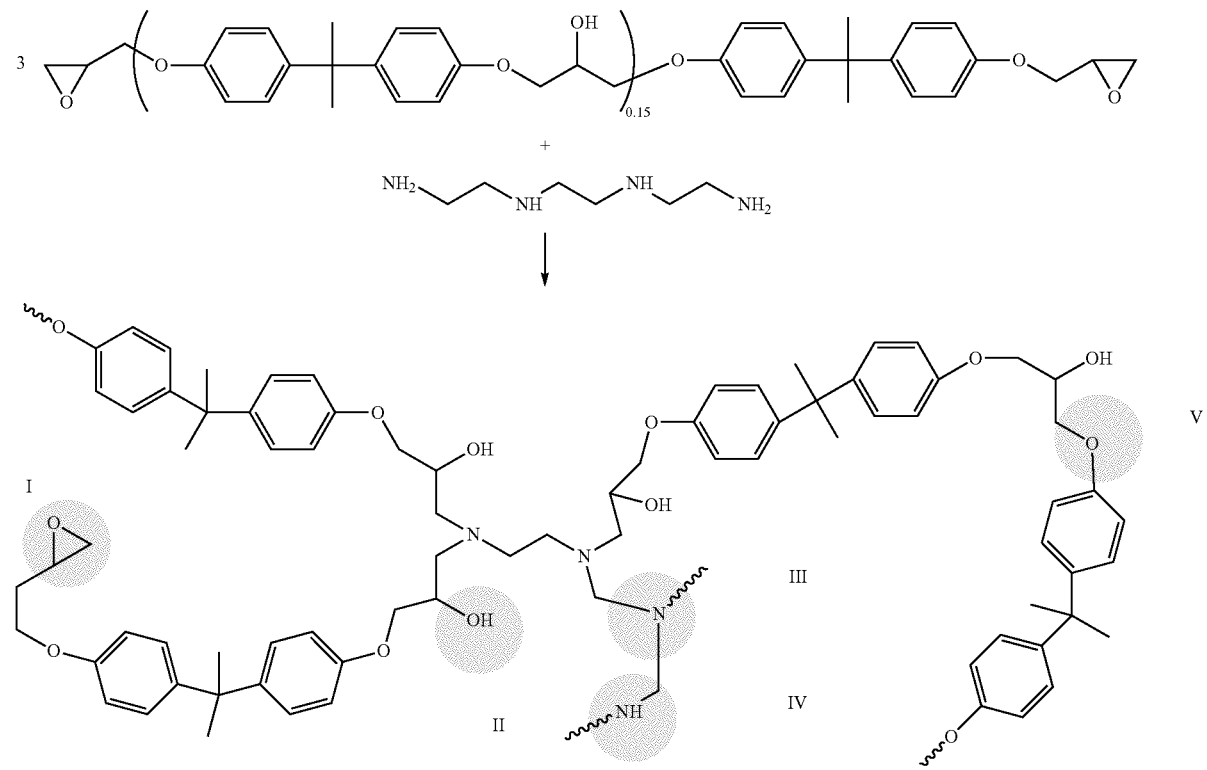

The thermoset polymer matrix can be an epoxy produced by curing a first polymerizable thermoset agent with a second polymerizable thermoset agent. The stoichiometric ratio of the first polymerizable thermoset agent to the second polymerizable thermoset agent may be about 1:2 to 2:1, but it will be appreciated that this will vary depending on the nature and functionality of the thermoset polymer matrix desired. For example, to achieve the desired bonding and chemical reactivity (to enable bubble formation and increase pressure to enhance movement of thermoplastic healing agent) the functionality on the thermoplastic polymer and thermoset polymer should be matched. For the embodiment where thermoplastic polymer EMAA is dispersed in DGEBA-TETA thermoset matrix the ratio of DGEBA:TETA is preferably about 1:1

Although not wishing to be bound by any theory, and as mentioned above, it is understood that one way to produce a volatile by-product that is capable of forming an expanding bubble under the elevated temperatures of post-curing and/or healing, is to promote the formation of a condensation reaction from the thermoplastic polymer. This may be achieved by providing organic acid groups such as carboxylic acid along the backbone of the polymer, which are available to react with hydroxyl groups and may be catalysed by the presence of tertiary amines. In the embodiment where the thermoplastic polymer contains carboxylic acid groups, the thermoset polymer matrix can therefore be provided with a sufficient amount of tertiary amine and hydroxyl groups to promote esterification. It has been found that for the material comprising EMAA thermoplastic polymer in a range of about 10 to 20 vol % dispersed in DGEBA-TETA thermoset polymer matrix, the ratio of DGEBA:TETA of 1:1 provides an appropriate amount of available tertiary amine groups, hydroxyl and carboxylic acid groups to form a volatile by-product and initiate bubble formation on post-curing.

Composite Material

The present invention also provides a fibre reinforced composite comprising a fibrous reinforcement component and a self healing polymer material as defined herein. The self healing polymer material may be incorporated or associated with the fibrous reinforcement component in a range of configurations.

In one embodiment, the self healing polymer material is provided as a sheet or layer, optionally incorporating fibrous reinforcement components therein. The fibre reinforced composite may be produced by assembling individual components of the self healing polymer material, namely the thermoplastic polymer and thermoset polymer matrix, with the fibrous reinforcement component. For example, the thermoplastic polymer may be provided as a mat or matrix over the fibrous reinforcement component and then the thermoset polymer matrix, or thermoset polymerizable agents, provided over the thermoplastic polymer, the configuration of components then being compressed together, and cured if required.

The fibrous reinforcement component can be selected from the group consisting of a carbon based component, a glass, an aramid, ultra high molecular weight polyethylene (UHMPE), or basalt fibre. Other fibrous reinforcement components may be used.

Coating Material

The present invention also provides a use of the self healing polymer material as herein defined, as a coating material or laminate. The self healing polymer material can used to coat or laminate a metal, composite or metal-composite material, or fibrous reinforcement component as described above. The metal may include titanium, aluminium, yttrium, zirconium, iron, cobalt, nickel, copper, silver, palladium, platinum, or combinations or alloys thereof.

Process for Forming Materials and Healing Thereof

The present invention also provides a method for producing a self healing polymer material as herein defined comprising dispersing a thermoplastic polymer or material thereof into at least a first polymerizable thermoset agent.

The at least first polymerizable thermoset agent can be heated to a temperature sufficient to enable flowability such that the thermoplastic polymer material can be dispersed into the at least first polymerizable thermoset agent. The temperature to achieve flowability for polymerizable thermoset agents will vary, and may be achieved at ambient temperature, although a small amount of heating is typically required.

The method may further comprise the step of curing the at least first polymerizable thermoset agent with one or more further polymerizable thermoset agents to form a thermoset polymer matrix where the thermoplastic polymer is embedded or dispersed within the thermoset polymer matrix. Alternatively, the polymerizable thermoset agents may be mixed together and the thermoplastic polymer introduced and dispersed before the curing of the thermoset polymer matrix reaches the point that flowability of the material is effectively compromised. The dispersion of the thermoplastic polymer may be in the form of discrete particles. The thermoplastic polymer may be in the form of a fibre or woven fabric.

Typically, the method for producing a self healing polymer material as herein defined comprises:
  dispersing a thermoplastic polymer or material thereof into at least a first polymerizable thermoset agent; and
  curing the at least first polymerizable thermoset agent with one or more further polymerizable thermoset agents to form a thermoset polymer matrix where the thermoplastic polymer is embedded or dispersed within the thermoset polymer matrix.

The process may comprise the step of applying temperature and/or pressure for curing.

It will be understood that to achieve good mixing and dispersion of the first polymerizable thermoset agent with the thermoplastic polymer material and second polymerizable thermoset agent, the heating should be sufficient to impart a temperature to the first and second polymerizable thermoset agents that is higher than their melt temperatures ($T_m$). For DGEBA, a temperature of about 70° C. is sufficient in which to mix EMAA particles. The melt temperature of EMAA is higher than 70° C., which enables EMAA particles or fibres to be effectively dispersed in the polymerizable thermoset agents. The EMAA at the dispersion or curing temperature is also substantially chemically unreactive with the polymerizable thermoset agents such that covalent bonding thereof is restricted.

In an alternative embodiment, the self healing polymer material may be produced by providing the thermoplastic polymer, for example in the form of dispersed particles or fiber or mat thereof, on the thermoplastic polymer matrix, which may be in the form of a sheet or layer, and optionally compressing the polymer and matrix together, to form a self healing polymer material.

It will be appreciated that the thermoplastic material may be associated with the thermoset polymer matrix (or polymerizable thermoset agent) in various configurations, such as dispersed or incorporated within, or provided on, or contiguously associated with, the thermoset polymer matrix (or polymerizable thermoset agent).

It will be appreciated that post-curing and healing conditions will depend on the nature of the primary polymer phase and the secondary polymer phase. The post-curing or healing process may comprise external or internal processes. For example, the self healing material may be heated by applying an external temperature to the surroundings of the material thereby raising the internal temperature of the polymer and resulting in curing thereof. An internal process may involve resistive heating, ultrasound, or other molecular motion process, whereby heat is generated internally in the material. Resistive heating may involve applying a current across a composite material (e.g. copper foil coated aircraft component) having a particular resistance and thereby causing internal heating in the component and material.

It is preferred that the thermoplastic polymers can be post-cured or healed at relatively low temperatures and pressures, for example, by having melt temperatures ($T_m$) generally below 300° C. It will also be appreciated that the healing and post-curing conditions will need to be lower than the temperature at which the thermoset polymer materials decompose. Because of the typically asymptotic nature of the relationship between temperature and duration required for healing, it will also be appreciated that lower temperatures will require longer healing times to achieve similar strength recovery rates. A particular lower temperature will eventually be reached that cannot initiate healing (i.e. a critical healing temperature exists for a particular polymer material). It will be appreciated that optimal healing temperatures will vary depending on the nature of the polymer material, degree of healing required, duration and cycles of healing. For example, an EMAA thermoplastic polymer dispersion in DGEBA-TETA thermoset matrix typically requires heating conditions of 110° C. for 90 mins or 150° C. for 15 mins, where the critical healing temperature is about 110° C.

The self healing polymer materials or composites comprising the self healing polymer materials may be healed more than once, for example such composites may be healed multiple times over a duration of many years. Partially or previously healed material may be further healed, for example by applying further heating and/or pressure.

Encapsulated Thermoplastic Polymer

The thermoplastic polymer may be provided in various forms. For example, the thermoplastic polymer may be coated or partially or wholly encapsulated with an encapsulating agent.

In one aspect, there is provided a partly or wholly encapsulated thermoplastic polymer that is capable of acting as a self healing agent within a thermoset polymer matrix, wherein the thermoplastic polymer is partly or wholly encapsulated with an encapsulating agent.

The encapsulating agent may be a thermoplastic polymer, a thermoset polymer, or a combination thereof. The encapsulating agent is selected to provide a system for incorporating the thermoplastic polymer into a primary polymer phase as described herein to enhance, maintain, or at least reduce the loss of, certain characteristics of the thermoplastic polymer, for example retaining a particular structural configuration in the thermoplastic polymer that attributes healing properties.

The encapsulation may be achieved through various methods. For example, thermoplastic polymer in the form of fibres may be co-extruded with an encapsulating agent to coat the extruded fibres with the encapsulating agent, or may undergo pultrusion processes. Encapsulation of thermoplastic polymer in the form of particles may be achieved by fluidized bed coating methods.

Additives

The self healing polymer material may also include other additives such as rheology modifiers, fillers, tougheners, thermal or UV stabilizers, fire retardants, lubricants, surface active agents. The additive(s) are usually present in an amount of less than about 10% based on the total weight of the activation treatment or the combination of solvent(s), agent(s) and additive(s). Examples include:

(a) rheology modifiers such as hydroxypropyl methyl cellulose (e.g. Methocell 311, Dow), modified urea (e.g. Byk 411, 410) and polyhydroxycarboxylic acid amides (e.g. Byk 405);
(b) film formers such as esters of dicarboxylic acid (e.g. Lusolvan FBH, BASF) and glycol ethers (e.g. Dowanol, Dow);
(c) wetting agents such as fluorochemical surfactants (e.g. 3M Fluorad) and polyether modified poly-dimethyl-siloxane (e.g. Byk 307, 333);
(d) surfactants such as fatty acid derivatives (e.g. Bermadol SPS 2543, Akzo) and quaternary ammonium salts;
(e) dispersants such as non-ionic surfactants based on primary alcohols (e.g. Merpol 4481, Dupont) and alkylphenol-formaldehyde-bisulfide condensates (e.g. Clariants 1494);
(f) anti foaming agents;
(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;
(h) stabilizers such as benzimidazole derivatives (e.g. Bayer, Preventol BCM, biocidal film protection);
(i) leveling agents such as fluorocarbon-modified polymers (e.g. EFKA 3777);
(j) pigments or dyes such as fluorescents (Royale Pigment and chemicals);
(k) organic and inorganic dyes such as fluorescein; and
(l) Lewis acids such as lithium chloride, zinc chloride, strontium chloride, calcium chloride and aluminium chloride.
(m) Suitable flame retardants which retard flame propagation, heat release and/or smoke generation which may be added singularly or optionally include:
Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.
Nitrogen containing derivatives such as melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine and thymine.
Molecules containing borate functional groups such as ammonia borate and zinc borate.
Molecules containing two or more alcohol groups such as pentaerythritol, polyethylene alcohol, polyglycols and carbohydrates, for example, glucose, sucrose and starch.
Molecules which endothermically release non-combustible decomposition gases, such as, metal hydroxides, for example, magnesium hydroxide and aluminum hydroxide.
Expandable graphite Applications The self healing polymer materials or composite materials thereof have applications for use in light weight construction where durability is required, for example aerospace and aircraft parts and components, critical infrastructure applications, construction or vehicle components including components for marine use, bridge pipes, energy production such as wind turbines and blades, adhesives, coatings and potting compounds.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

As used in the specification the singular forms "a" "an" and "the" include plural references unless the context clearly dictates otherwise. Thus, for example, reference to "a solvent" includes mixtures of solvents, reference to "an agent" includes mixtures of two or more such agents, and the like.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

DETAILED DESCRIPTION OF THE ABBREVIATIONS

In the Examples, reference will be made to the following abbreviations in which:
AFM Atomic Force Microscopy
APP Applications
C Celsius
Cl Class
$CFRP_f$ Carbon-fiber-reinforced polymer with thermoplastic fibers
$CFRP_p$ Carbon-fiber-reinforced polymer with thermoplastic particles
[ ] Concentration
EMAA polyethylene methacrylic acid
DGEBA diglycidyl ether of bisphenol A
DGEBA-TETA triethyltetramine cured diglycidyl ether of bisphenol A resin.
F Fahrenheit
FTIR Fourier Transform Infrared
h Hour
Mn Number average molecular weight
Mw Weight average molecular weight
MW Molecular weight
ηρ Healing efficiency
RH Relative Humidity
SEM Scanning Electron Microscopy
SENB single edge notched_bar
TDCB tapered double cantilever beam
TETA triethyltetramine
Wt % weight percentage
XPS X-Ray Photoelectron Spectroscopy

BRIEF DESCRIPTION OF THE DRAWINGS

Preferred embodiments of the present invention will now be further described and illustrated, by way of example only, with reference to the accompanying drawings in which.

Figure 1:
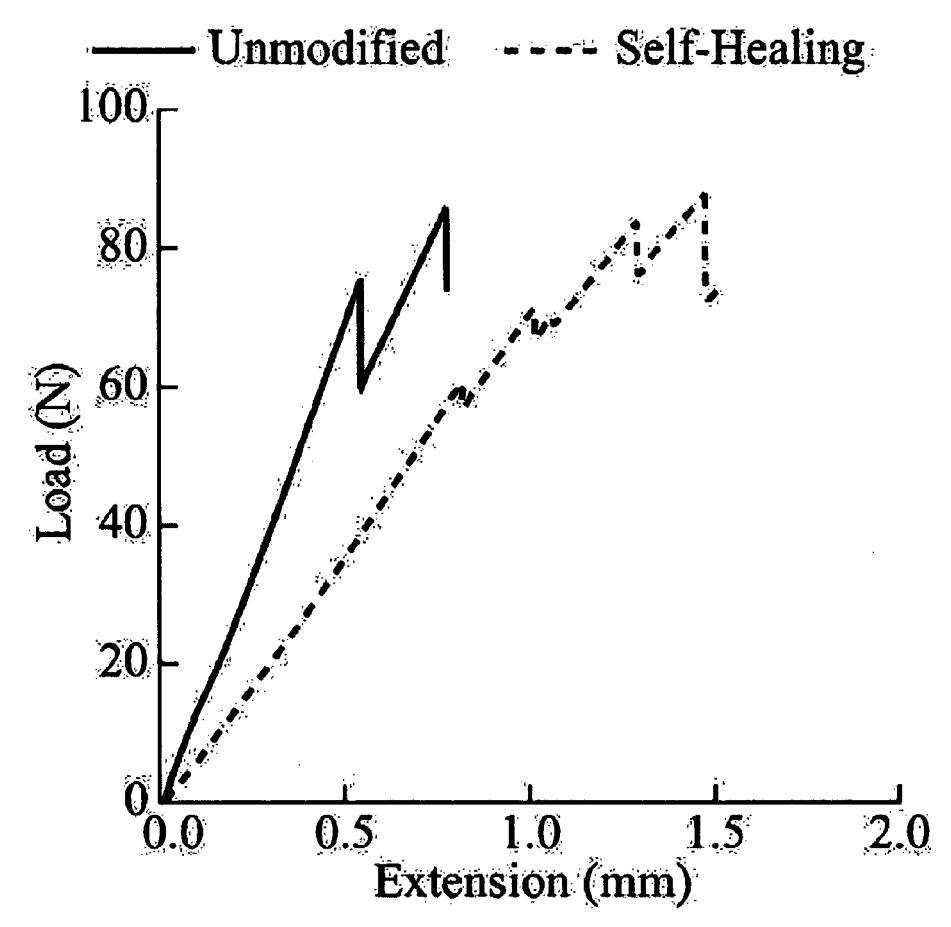
FIG. 1 shows results of TDCB strength recovery testing before post-cure healing between an unmodified polymer material and a self healing polymer material containing EMAA dispersed particles according to an embodiment of the present invention.

It will be understood that the self healing polymer materials according to various embodiments of the present invention are also referred to in the below Examples as "mendable" resins or polymers.

EXAMPLE 1

Self Healing Polymers and Polymer Materials

Polyethylene-co-methacrylic acid (EMAA) particles were used as a healing agent by mixing the particles into an epoxy resin resulting in an increase in the fracture strength of the resin. EMMA was capable of providing recoveries of fracture strength in a damaged epoxy resin at 150° C. without the need for externally applied pressures during healing. The EMAA healing agent formed a discrete phase within the resin that was able to react with the resin during healing.

Damaged single edge notched bars (SENB) and tapered double cantilever beams (TDCB) were healed at 150° C. for 30 min to achieve up to an 85% recovery in critical stress intensity and 140% recovery in sustainable peak load. Optical and scanning electron microscopy revealed that strength recovery in the damaged resin was achieved via EMAA particle healing (i.e. healing of damage within an EMAA particle) as well as the formation of an adhesive EMAA layer between adjacent epoxy fracture surfaces. Microscopy also showed that small bubbles in the EMAA particles act as a healing agent delivery mechanism wherein expansion during heating forced larger volumes of healing agent into the damaged region of the resin.

The healing ability of the EMAA healing agents were assessed using both tapered double cantilever beam (TDCB) and single edge notched bar (SENB) test pieces made by adding EMAA particles (250-425 μm) directly into a triethyltetramine (TETA) cured diglycidyl ether of bisphenol A (DGEBA) resin.

Sample Preparation

The epoxy was produced by curing DGEBA (DER 331 from Dow Plastics Australia) with TETA (DEH24 from Dow Plastics Australia) at a stoichiometric ratio (i.e. 100:13 w/w epoxy/DGEBA to amine/TETA). SENB test pieces were cured at 50° C. for 90 min in silicone moulds and then post cured at 150° C. for 30 min, TDCB specimens were allowed to solidify at 23° C. overnight prior to curing/postcuring at 50° C. and 150° C. as described for SENB test pieces. EMAA pellets (Nucrel 2940, DuPont Packaging and Industrial Polymers) were cryogenically ground, separated into particle size ranges by water flushing through a stack of 20, 35, 60, 100 and 270 mesh sieves and then dried under vacuum at 50° C. for 4 days. The mendable resins were produced by heating the DGEBA to 70° C., then mixing in the 15 vol. % EMAA particles (−35+60 mesh) prior to mixing in the TETA.

Fracture Testing

TDCB and SENB were used to assess the fracture strength of undamaged, damaged and healed epoxy resins. The fracture strength of the epoxy resins was assessed using an Instron 5566 machine at approximately 23° C. TDCB testing was carried out using the same test configuration and crosshead speed (5 µm/sec) as described by Brown et al. (Fracture testing of a self-healing polymer composite. Exp. Mech. 2002; 42:372). During healing efficiency testing, the samples were loaded until crack growth occurred and then unloaded prior to catastrophic failure of the test piece. The damaged test pieces were then healed in a 150° C. oven for 30 min and then allowed to sit for at least 30 min prior to retesting. Peak load values were typically averaged over 5 failure events and the standard error was set as the standard deviation in peak load divided by the square root of the number of peak load values recorded.

SENB testing was carried out in general accordance with ASTM-D5045 using 5×10×50 mm bars in a 40 mm span three point bend and a crosshead speed of 165 µm/sec. A sharp crack was generated in each SENB using a diamond saw to cut a 3 mm deep notch and then tapping with a razor blade to generate a 2 mm deep pre-crack. For the virgin (pre-cracked) material, SENB were loaded until 90% loss of the peak load was reached. Healing was conducted by positioning the SENB notch side up in an oven at 150° C. for 30 min. Re-loading of the healed SENB was carried out using the same procedure as for the virgin SENB but loading was stopped at 99% loss of the peak load. Multiple healing cycles were carried out by repeating the healing and re-loading steps. Peak load values were averaged over 5 test pieces and the standard error was set as the standard deviation in peak load divided by the square root of the number of peak load values recorded.

Microscopy

Specimens for microscopic imaging were cut from test bars in 1-2 mm thick sections using a diamond saw. Fractured surfaces were coated with 200-250 Å of iridium prior to imaging at 5 kV on a Philips XL30 Field Emission scanning electron microscopy (SEM). For reflectance microscopy, cross sections of the samples were imaged as cut or after polishing at 200 rpm using Kemet Diamond Compound 3-FD-C4. Samples were prepared specifically for transmission microscopy by curing the resin as a thin film between two smooth silicone rubber surfaces. After curing the resin films were imaged in transmission mode without any further modification unless stated otherwise.

Effect of EMAA Inclusion on Resin Properties

Both TDCB and SENB have been used to assess the effect of incorporating an EMAA healing agent into a TETA cured DGEBA resin (FIGS. 1 and 2) prior to any healing. In order for new mendable resins to remain useful, the incorporation of healing agents should not have a detrimental effect on the material's original physical properties. Unmodified resin (epoxy resin with no EMAA particles added) and mendable resin (epoxy resin containing 15% EMAA) were compared in order to determine the effect of EMAA particles on the resin's fracture strength. The TDCB methodology used here was originally described by Beres et al. (Specimen Designed for Constant-K Testing at Elevated Temperatures. J. Testing. Eval. 1997; 25:536.) and has a critical stress intensity (KI) that is independent of crack length.

This TDCB test method is typically used to assess the fracture strength of brittle materials via determination of KI and was used by Brown et al. (Fracture testing of a self-healing polymer composite. Exp. Mech. 2002; 42:372) to assess the performance of some of the first mendable epoxy resins, KI is a measure of the force required to extend a sharp crack and thus reflects the load bearing capacity of a cracked material. In addition to KI calculation, the peak load and load extension plot gradient can be used to compare the physical strength of the unmodified and the mendable resins. The SENB methodology used here is based on ASTM 5045 and provides an insight into the unmodified and mendable resin's physical strength by enabling KI calculation as well as measurement of the peak load and load-extension plot gradient. The SENB test piece is much smaller and less complex compared to the TDCB test piece however KI is dependant upon crack length.

Figure 2:
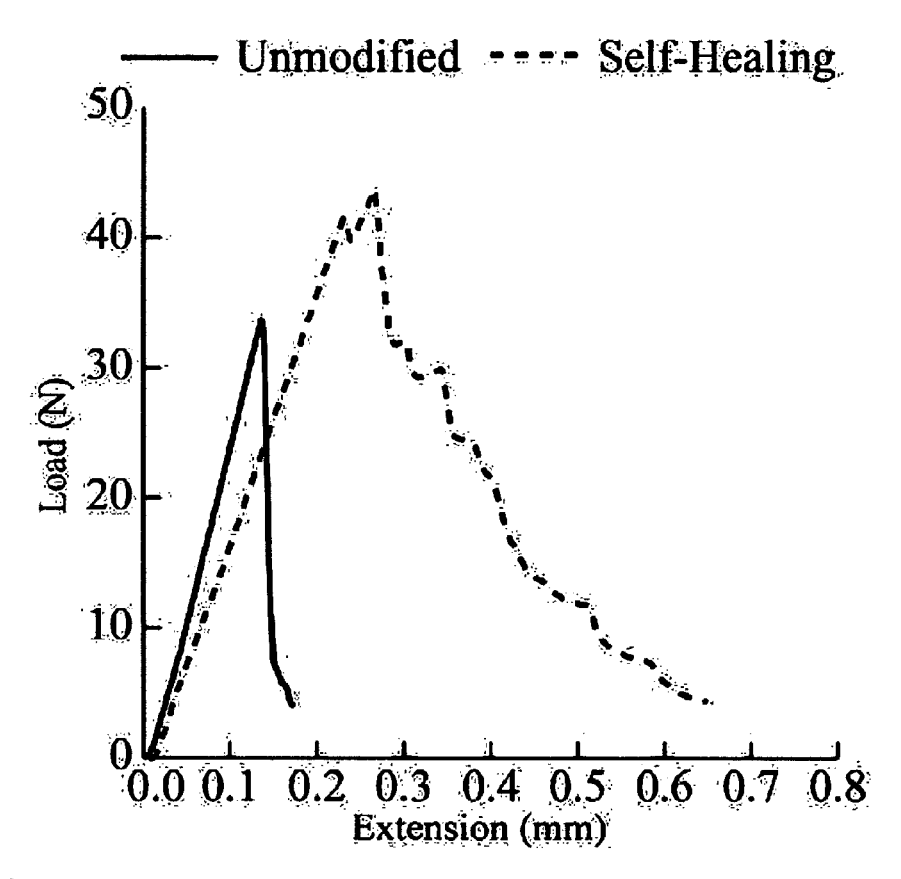
FIG. 2 shows results of SENB strength recovery testing before post-cure healing between an unmodified polymer material and a self healing polymer material containing EMAA dispersed particles according to an embodiment of the present invention.

Addition of 15 vol. % EMAA to the epoxy resin resulted in a small increase in the peak load of TDCB. The unmodified resin had a peak load of 84±4 N and the mendable resin has a slightly higher peak load of 89±1 N (FIG. 1). The small increase in peak load observed after adding the EMAA may be attributed to particulate based toughening of the resin. Particulate-based toughening in epoxy resins is a well documented phenomenon wherein the particles enable stress release via mechanisms that reduce or eliminate crack growth during loading. In addition to the increase in peak load, the mendable resin had a smaller load-extension gradient than that of the unmodified resin. Even though the load-extension gradient of TDCB specimens varies with the length of the pre-crack, unmodified TDCB test pieces with crack lengths of over 10 mm still possessed larger load-extension gradients than the pre-cracked mendable TDCB with 1-2 ram crack lengths, so the difference in these gradients has not come from differences in the crack length. Instead, the decrease in load-extension gradient in the mendable TDCB shows that addition of EMAA particles to the resin has caused a drop in modulus. Both the increase in peak load and decrease in modulus seen here are in good agreement with existing literature on thermoplastic or rubber toughened epoxy resins where incorporation of soft polymers into rigid epoxy resins typically results in an increase in fracture toughness and a decrease of elastic modulus.

In agreement with the TDCB results, the SENB tests (FIG. 2) also reveal that addition of 15 vol. % EMAA to the epoxy resin resulted in an increase in the peak load of and a small decrease in modulus of the SENB. The peak load in the mendable resin (43±1 N) was approximately 25% larger than that of the unmodified resin (34±2 N). The differences in the absolute value of peak load between the TDCB and SENB can be expected due to the different test piece configuration and the different extension rates used during the two different types of tests (5 µm/sec for TDCB and 165 µm/sec for SENB). Previous studies have shown that the toughening effect of thermoplastic or rubber modifiers can be increased as the strain rates increases. Hence the toughening effect of the EMAA particles on the epoxy resin is enhanced when tested at the fatter cross head speeds during SENB testing, resulting in the different levels of toughening effects identified by TDCB and SENB test pieces used here. Despite the variation in the extent of change in peak load, both SENB and TDCB testing revealed that incorporation of the EMAA healing agent has increased the fracture strength of the epoxy resin.

Healing Ability Assessment

Figure 3:
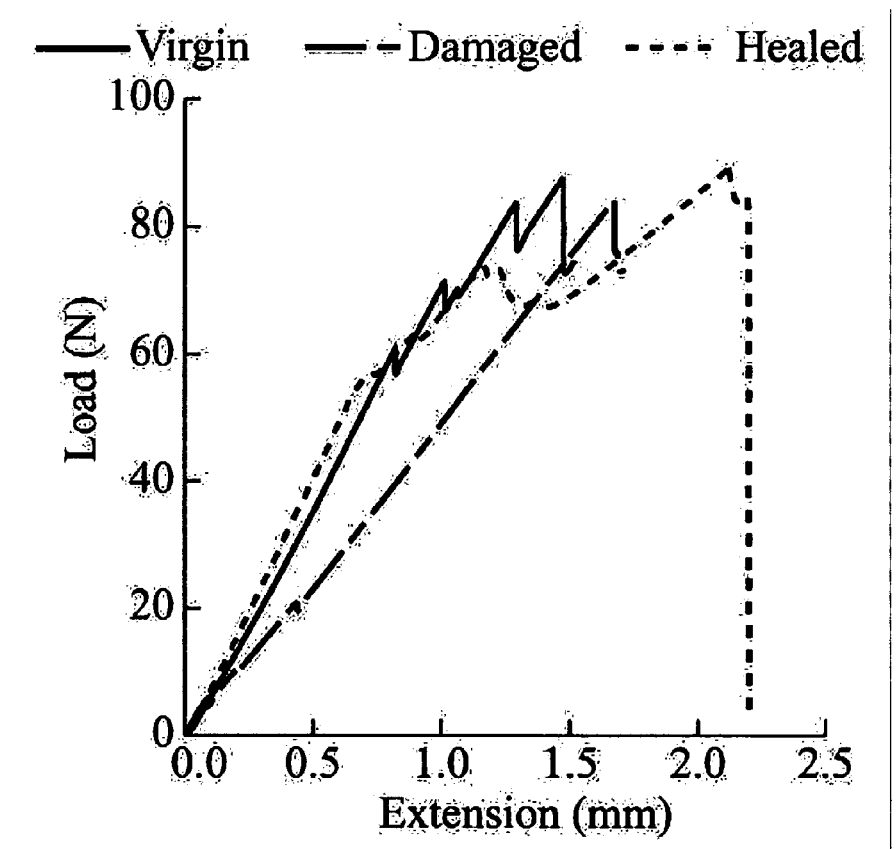
FIG. 3 shows results of TDCB strength recovery testing after post-cure healing at 150° C. for 3 hours between an unmodified polymer material and a self healing polymer material containing EMAA dispersed particles according to an embodiment of the present invention.

The healing ability of EMAA was assessed by comparing the fracture strength of virgin (containing a small pre-crack), damaged (virgin specimens that have been loaded until significant crack growth occurred) and healed (damaged specimens that have been healed at 150° C. for 30 min) TDCB and SENB specimens (FIG. 3). The testing and calculation methods used to assess a healing ability have a significant effect on the percentage of strength recovery reported (Kessler MR. Self-healing: a new paradigm in materials design. Proc. Inst. Mech. Eng. Part Aerosp. Eng. 2007; 221:479.). As such, it is difficult to compare mendable systems tested using different methodologies. In this study TDCB testing has also been used in order to facilitate comparision with existing mendable epoxy technologies. In these existing technologies healing agents/healing systems were assessed using the ratio of healed material's peak load (Ph) to the virgin material's peak load (Pv) to calculate a healing efficiency (ηp) according to equation 1 below. In addition to TDCB testing, a standardised SENB test method (ASTM 5045-99) has been used during healing ability assessment. In SENB the stress applied to the crack tip varies crack length such that the peak load recovery during healing may not be proportional to KI, which means that the KI values need to be calculated independently. The correlation between crack length (a) and KI values in the SENB used here (equation 2) have been published by Brown et al. (Brown W F, Srawley J E. Plane strain crack toughness testing of high strength metallic materials. In:ASTM Technical Publication 410, American Society for Testing and Materials, Philadelphia, 1966.). In this equation the SENB width (W), SENB thickness (B), crack length (a), a dimensionless stress intensity coefficient (Y, calculated as per equation 3) and the bending moment (M, calculated as per equation 4) are used to calculate KI. Equation 2 can be rearranged into a form where KI is equal to the peak load (P) multiplied by a constant derived from Y and the dimensions of the individual test piece (equation 5). Equation 5 can then be used to calculated KI for the virgin (KI,v) and healed (KI,h) test pieces such that a stress intensity healing efficiency (ηKi) can be calculated (equation 6) during assessment of the EMAA healing ability.

$$\eta_p = 100 \times \frac{P_k}{P_w} \quad (1)$$

$$K_t = Y \times \frac{6Ma^{1/2}}{BW^2} \quad (2)$$

$$Y = 1.93 - 3.07(a/W) + 14.53(a/W)^2 - 25.11(a/W)^3 + 25.80(a/W)^4 \quad (3)$$

$$M = \frac{P \times L}{4} \quad (4)$$

$$K_I = P\left(60Y \times \frac{a^{1/2}}{BW^2}\right) \quad (5)$$

$$\eta_{KI} = 100 \times \frac{K_{I_{p}k}}{K_{I_{v}v}} \quad (6)$$

SENB testing provides a useful alternative to the TDCB methodology when determining the healing capability of the EMAA. Apart from the benefits of using simpler and smaller test pieces, one additional benefit of using SENB over TDCB is the ability to extend the SENB test pieces to 95% load loss without catastrophic failure. TDCB made from the epoxy resin used here undergo catastrophic failure at an unpredictable point during loading. Catastrophic failure in test pieces prior to healing introduces complex variables like healing piece alignment and clamping pressure which impact upon the performance of the healing agent being tested. Although it is possible to unload the TDCB prior to catastrophic failure, this introduces a number of other complications. Firstly, damaged TDCB test pieces unloaded prior to critical failure possess the same peak load as the undamaged test piece, which means that the damaged test pieces have a ηp of 100% even though no healing has occurred. Secondly, the slipstick nature of the epoxy resin used here makes it difficult to accurately control crack length at unloading. As a result each unloaded test piece has a different crack length and so the level of stress applied to the healed crack in the TDCB during reloading will vary significantly between test pieces. In contrast to the TDCB, SENB of the epoxy resin used can be loaded until a 95% reduction in the peak load without occurrence of a catastrophic failure. Loading the SENB in this manner produced damaged test pieces with smaller peak loads (3.2±0.2 N) and more consistent crack lengths (8.8±0.1 mm) than those achievable in the corresponding TDCB samples. As such, SENB testing enables the healing ability assessment of the EMAA healing agent through peak load and load extension gradient comparisons without some of the complications associated with TDCB testing as discussed above.

TDCB Testing

Healing of the damaged TDCB specimens containing the EMAA healing agent indicated that a significant strength recovery could be achieved (FIG. 3). The virgin TDCB sustained a peak load of approximately 87 N before the sample failed and the crack extended to a new arrest point. Reloading the damaged TDCB without healing resulted in a similar peak load being achieved however the load-expension plot has a smaller gradient indicative of the larger crack length (FIG. 3). In contrast to the damaged TDCB, the healed TDCB possessed a similar load-extension gradient to the virgin specimen upto a peak load of 74 N. This peak load was sustained at between 1.0 and 1.3 mm extension in FIG. 3. After the healing agent failed, the load returns to the level expected from a damaged test piece of a similar crack length. Restoration of the original load-extension gradient up to approximately 74 N reflects a ηp (and ηKI) of approximately 85%.

Even though TDCB testing revealed that a significant strength recovery has been achieved, this test method suffers from a number of limitations when assessing the EMAA healing agents being studied here. One of these limitations relate to a ductile response from the EMAA healing agent upon loading. This ductile response in the EMAA healing agent results in significant viscous flow and plastic deformation during failure of the healed epoxy resin. Evidence of this plastic deformation is seen in the load-extension gradient after failure of the EMAA healing agent (between 1.5 mm and 2 mm extensions in FIG. 3), with extrapolation of this region to 0 mm extension passing through approximately 20 N instead of 0 N as would have occurred in a material showing a linear elastic response. The non-linear elastic response of the healed TDCB violates critical assumptions of the KI calculation, which means that the values obtained in the healed epoxy may no longer be accurate. Therefore, the KI of the healed resins containing the EMAA particles may not be proportional to the peak load as had been assumed during the assessment of other mendable epoxy resins. Even though the traditional KI values cannot be accurately determined from the mendable TDCB specimens, the recovery in peak load and load-extension gradient still clearly demonstrates the significant fracture strength recovery achieved during healing process.

SENB Testing

Figure 4:
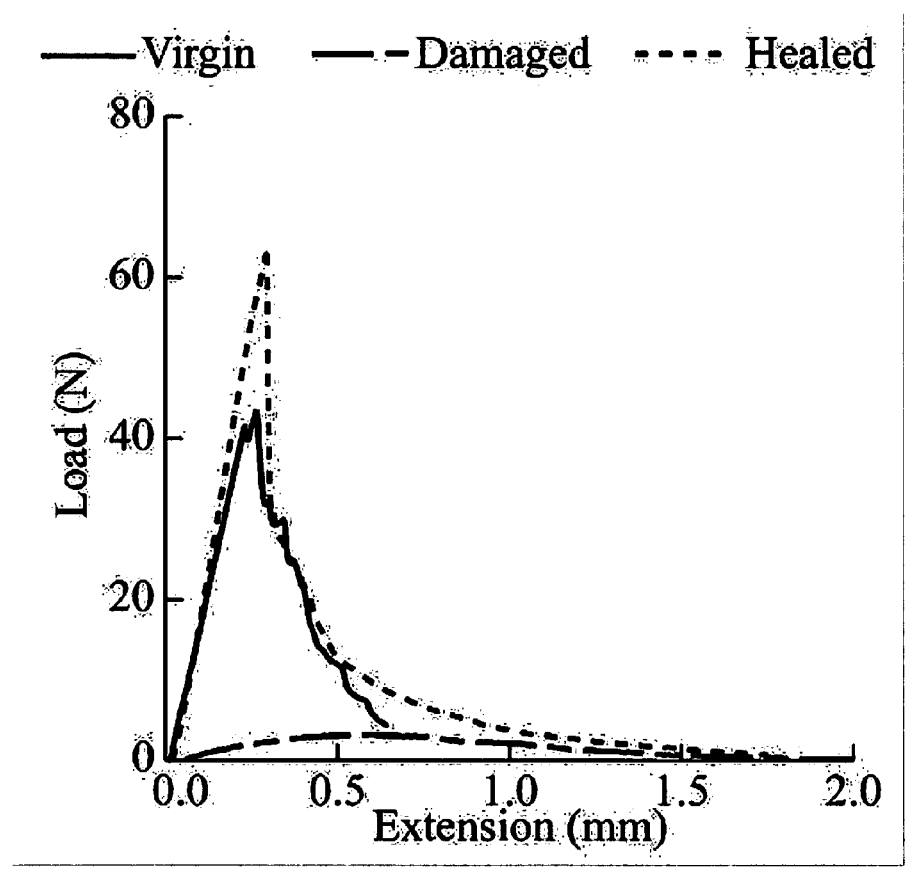
FIG. 4 shows results of SENB strength recovery testing after post-cure healing at 150° C. for 3 hours between an unmodified polymer material and a self healing polymer material containing EMAA dispersed particles according to an embodiment of the present invention.

Testing of healed SENB revealed that more than 100% of the virgin materials peak load could be restored using the EMAA healing agent (FIG. 4). The healed SENB sustained a peak load of 60±6 N which is approximately 140% of the peak load sustained by the virgin SENB (43±1 N). A ηp of more than 100% can be achieved in the healed SENB due to differences in the crack length and crack morphology between the virgin and healed SENB. In notched/cracked specimens like the SENB, the stress applied at a crack tip generally increases with a increases in crack length and a decrease in crack radius (Hertzberg RW. Deformation and fracture mechanics of engineering materials, New York., 1983.). After healing the SENB, the crack that formed during loading is closed along with a portion of the 2 mm long pre-crack formed by tapping with a razor blade. This means that the crack length during testing of the healed specimens was shorter than that in the virgin test pieces. The shorter crack length in the healed specimens results in a drop in the stress intensity at the crack tip such that larger peak loads can be sustained before the crack growth occurs. In addition to the effects of crack length, stress intensity at the crack tip is reduced by an increase in the crack tip radius as the ductile EMAA fills the crack and rejoins the adjacent epoxy fracture surfaces.

SENB assessment of EMAA healing ability resulted in $\eta kI$ of approximately 80%. Examination of the SENB load-extension plots revealed that there is a negligible level of plastic yielding prior to crack growth, indicating that the problem associated with non-linear elastic response has been largely avoided in this case. By assuming that the pre-crack in the SENB is completely healed (such that crack length (a) is reduced from 5 mm to 3 mm) then KI for the virgin and healed SENB can be calculated according to equation 5.

With $KI,v$ at $0.75 \pm 0.05$ MPa·m½ and $KI,h$ at $0.61 \pm 0.0.03$ MPa·m½ the SENB reflects an 81% $\eta kI$ that is comparable to the 85% $\eta KI$ seen in the TDCB tests. It is important to note that even though similar $\eta kI$ were achieved using both SENB and TDCB test methods, the $\eta p$ vales of 140% to 85% are significantly different. This difference in up between the TDCB and SENB test pieces highlights the importance of using the same test methods when comparing different self-healing technologies.

Healing Mechanism Determination

Primarily, the EMAA healing agent restores the strength to the damaged epoxy by rebinding the adjacent fracture surfaces. The rebinding of adjacent fracture surfaces is apparent from the restoration of virgin material's load-extension plot gradient upto the point of EMAA failure. If the crack had not been rebound then the load-extension gradient would be smaller than that of the virgin test piece (as seen in the load-extension plot of the damaged TDCB in FIG. 3). In addition to the restoration of the load extension gradient, visual observation of the specimens during loading confirmed that the original crack in the epoxy resin remained closed until a peak load was reached. The rebinding of the cracks in the damaged epoxy can occur by 1) healing of the fractured EMAA particles and 2) the formation of an adhesive layer between the adjacent epoxy fracture surfaces.

Figure 5:
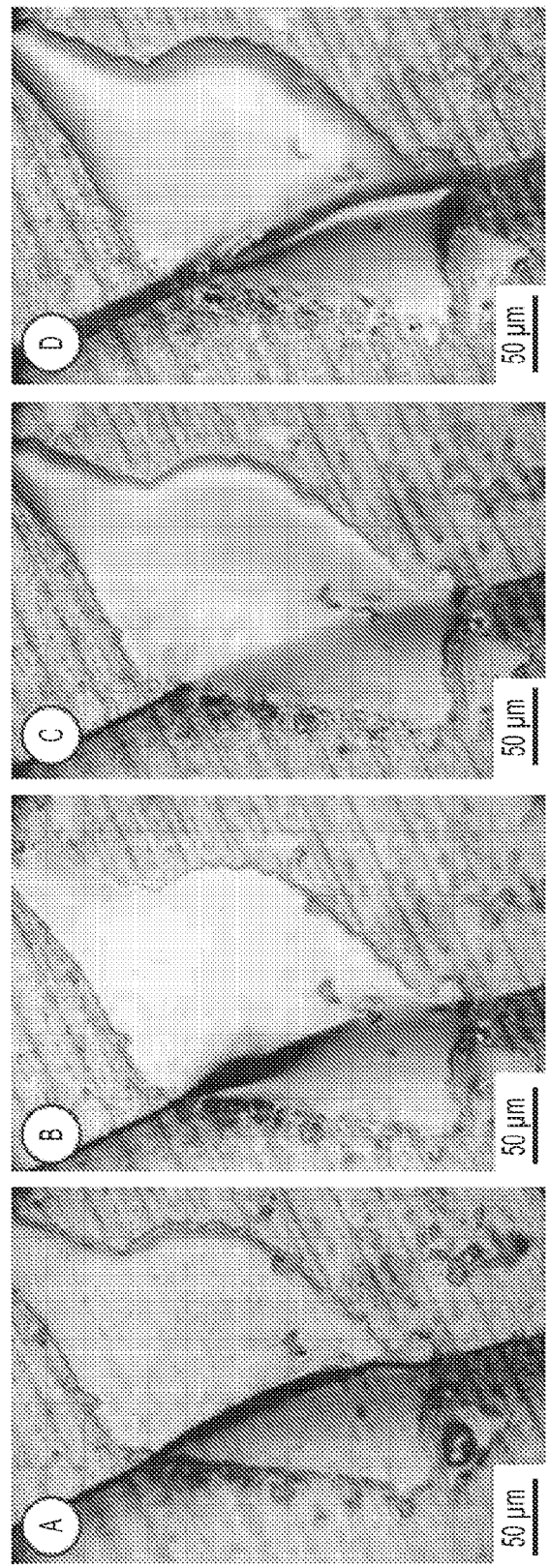
FIG. 5 shows optical microscopy on a cross-sectioned SENB as per FIGS. 3 and 4 samples.

Healing of the fractured EMAA particles was observed using optical microscopy on SENB cross-sections. During crack growth in the virgin resin the EMAA particles fracture resulting in EMAA particles on adjacent sides of the fracture plane (FIG. 5A). Subsequent to heating at 150° C., the EMAA particles undergo thermal expansion and viscous flow which leads to healing across the fracture plane in the epoxy resin (FIG. 5B-C). This type of healing is common in thermoplastics and results in strength restoration within the EMAA particles through diffusion and entanglement of the EMAA chains between the previously fractured segments. This particle healing results in strength restoration in the damaged epoxy as long as the particle-epoxy interface is strong enough to enable significant stress transfer between the adjacent sides of the fracture. Evidence of stress transfer from the epoxy to the healed EMAA particle is seen in the stretching and deformation of the healed EMAA particles that bridged the epoxy fracture plane during reloading of the healed resin (FIG. 5D).

Figure 6:
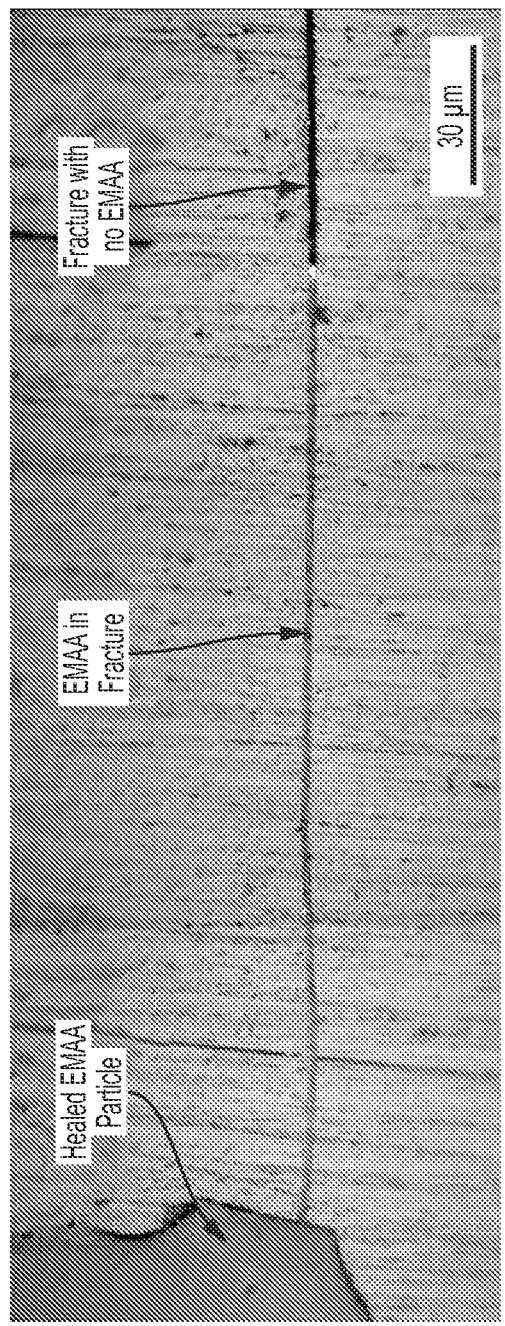
FIG. 6 shows optical microscopy on a cross-sectioned SENB as per FIGS. 3 and 4 samples.
Figure 7:
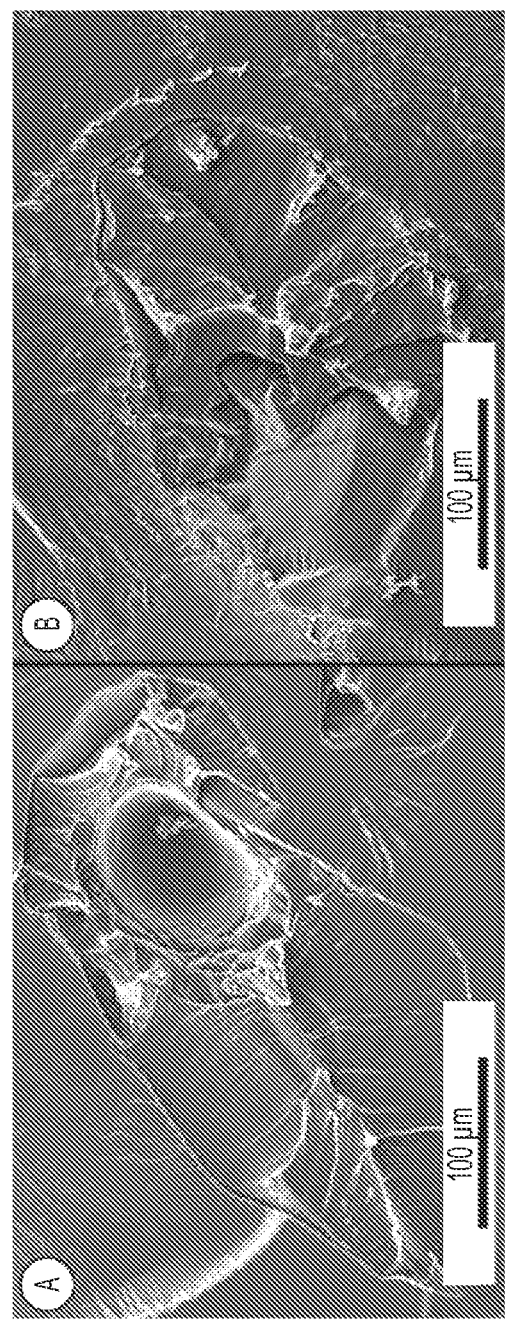
FIG. 7 shows optical microscopy on the fractured healed surfaces of a cross-sectioned SENB as per FIGS. 3 and 4 samples.

The formation of an adhesive layer rejoining adjacent epoxy fracture surfaces can also be observed using optical microscopy. Polished cross sections of healed SENB revealed a layer of the healing agent between adjacent epoxy fracture surfaces in the fracture plane surrounding the healed EMAA particles (FIG. 6). This layer has bonded with each of the adjacent epoxy fracture surfaces thus acting as adhesive to close the crack. The resulting reduction in cracked area of the epoxy resin results in the restoration of the resin's initial strength as the stress is transferred through the adhesive layer on reloading of the healed resin. Evidence that this layer is acting as an adhesive between adjacent epoxy fracture surfaces can be observed in SEM images of the fracture surface of the healed resin (FIG. 7). It can be seen that the layer has been torn and stretched during reloading of the healed SENB, and this can only occur if stress was transferred to the layer during reloading of the healed SENB. It is therefore suggested that strength is restored to the epoxy resin during healing via a combination of EMAA particle healing and the formation of an adhesive layer within the epoxy resin fracture plane.

The level of strength recovery achieved by the formation of an adhesive EMAA layer is enhanced by a pressure-driven delivery of healing agent into the epoxy fracture plane. The strength provided to an interface by an adhesive layer is typically increased with an increased coverage of the adhesive over the surfaces being joined. A difference between the thermal expansion coefficient of EMAA and the epoxy resin (approximated as $7-11 \times 10-4/°$ and $0.6-1.6 \times 10-4/°$ respectively) may result in a "differential expansive bleeding". In addition to any contributions, from "differential expansive bleeding," the formation of an adhesive layer is promoted by a pressure difference generated during the expansion of small bubbles present in the EMAA particles.

Figure 8:
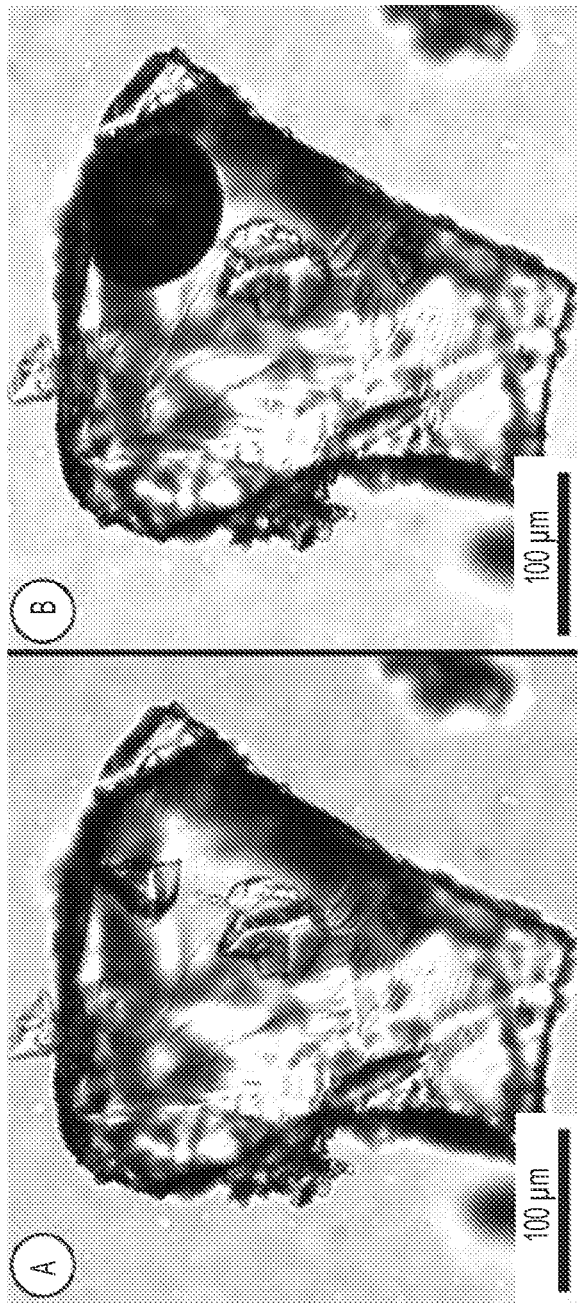
FIG. 8 shows optical microscopy on a cross-sectioned SENB as per FIGS. 3 and 4 samples containing a bubble in an EMAA dispersed particle.

Evidence of this pressure-driven healing agent delivery mechanism was first obtained via optical microscopy showing that small bubbles were formed within the EMAA particles during postcuring of the resin at 150° C. (FIG. 8A-B). Typically one bubble formed in each EMAA particle that had been completely encapsulated by epoxy resin during curing. These bubbles were likely to have formed due to a phase separation of volatile products formed during reactions between the EMAA particles and the epoxy resin. Reactions that produce a volatile product (water) and could take place between the EMAA and epoxy during post curing are currently under investigation but are likely to include tertiary amine catalysed acid-hydroxyl reactions or amidation of carboxylic acids.

Figure 9:
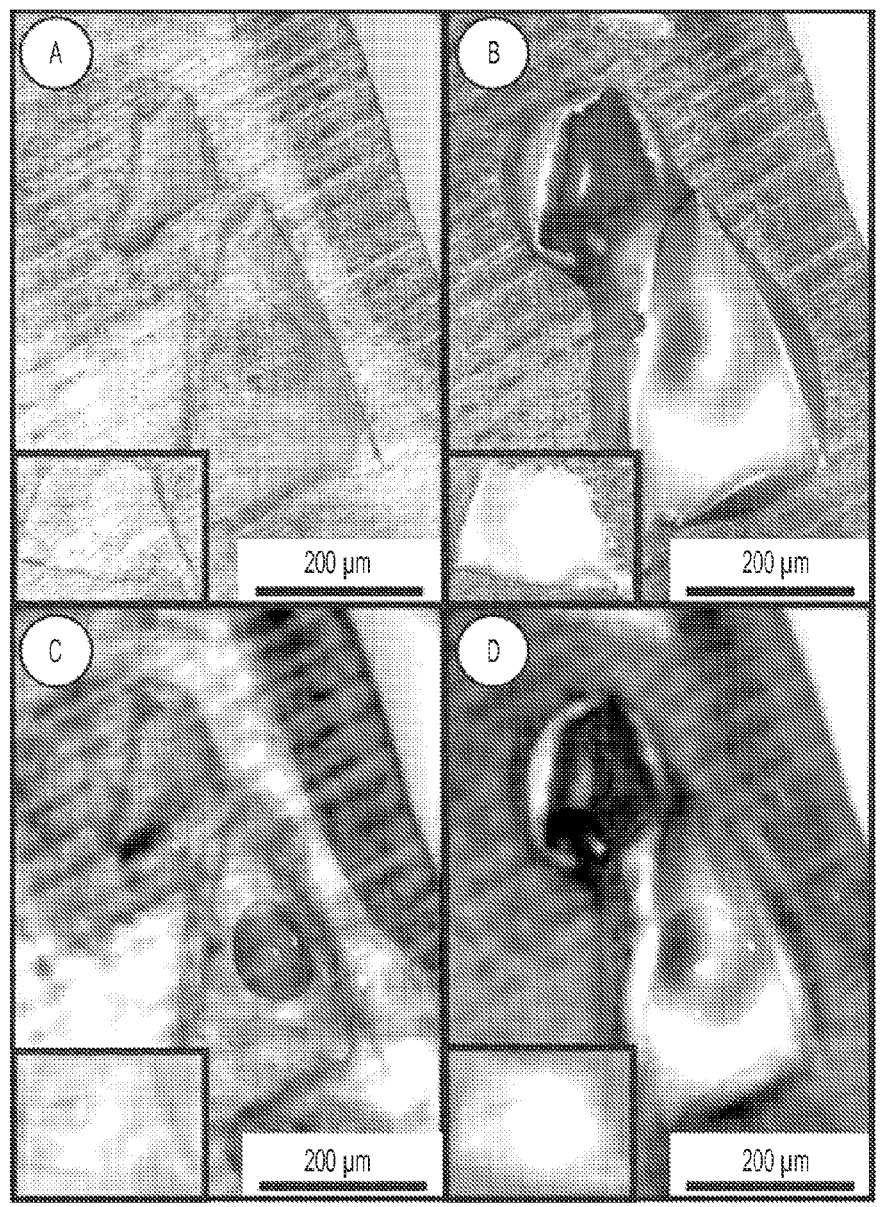
FIG. 9 shows optical microscopy on a cross-sectioned SENB as per FIGS. 3 and 4 samples containing a bubble in an EMAA dispersed particle.

Confirmation that the bubbles contained within the EMAA particles facilitated a pressure-driven healing agent delivery mechanism was obtained via optical microscopy. Initially, optical images of EMAA particles containing internal bubbles (FIG. 9A-B) along with particles that did not contain bubbles (FIG. 9A-B insets) were obtained in sectioned SENB. The section was then treated at 150° C. for 30 min and reimaged. After the heat treatment the diameter of the bubbles has been increased (FIG. 9C-D). Due to the rigid structure of the surrounding epoxy resin, expansion of the bubbles resulted in a build up of the pressure inside of the EMAA particle such that EMAA was forced beyond the EMAA-epoxy interface onto the surrounding epoxy surface. In contrast to the particles containing the bubbles, the particles that did not contain bubbles did not have EMAA on the surface of the epoxy surrounding the EMAA particle (FIG. 9C-D insets). It is apparent from these images that the pressure build up during heating of the EMAA particles containing bubbles has forced EMAA onto the surrounding epoxy. Hence it is concluded that during healing at 150° C. the expansion of these bubbles acts as a pressure-driven healing agent delivery mechanism. This healing agent delivery mechanism identified here in the EMAA healing agent (depicted in FIG. 10) has not been previously reported in a mendable epoxy resin.

Figure 10:
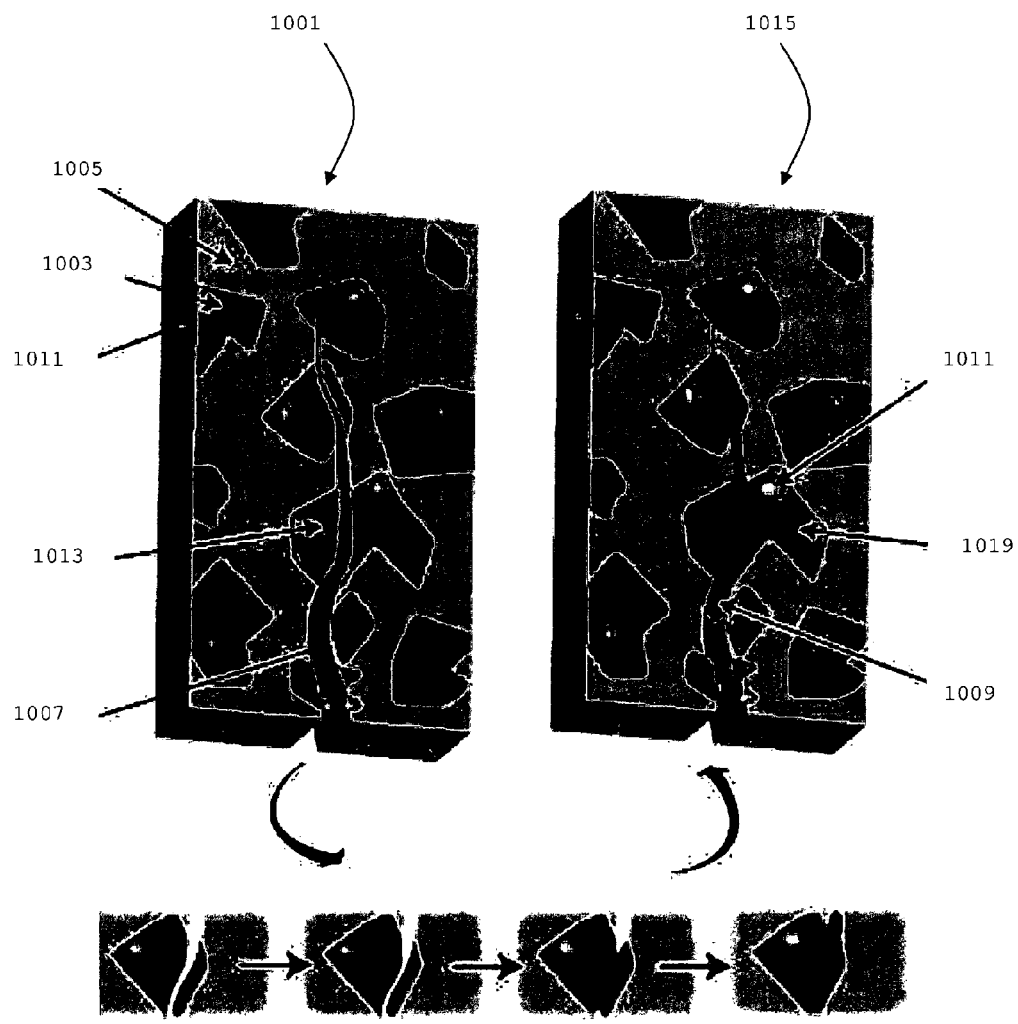
FIG. 10 shows a flow diagram of a healing process according to an embodiment of the present invention.
Figure 18:
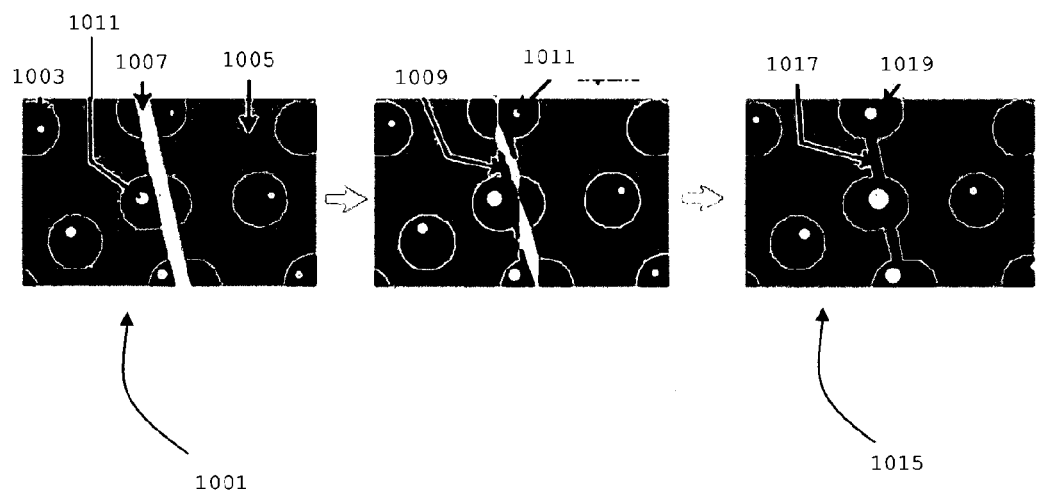
FIG. 18 shows a schematic of the healing mechanism utilised by the mendable epoxy resins containing EMAA particles according to an embodiment of the invention.

FIGS. 10 and 18 show the proposed pressure driven healing agent delivering mechanism where damaged resin (1001), which includes thermoplastic EMAA particles (1003) within a thermoset polymer matrix of epoxy resin (1005), has a fracture (interstitial gap or crack) (1007) that extends through the particles and the resin. During healing, the EMAA flows into the fracture (1009), which is promoted by the formation of bubbles (1011) in the EMAA particles near the fracture (1013) that provide expansive pressure within the EMAA particle. In the self-healed polymer material (1015) the fracture is healed where the adhesive layer rejoins both the thermoset resin (1017) and the EMAA particle (1019).

Conclusions

A novel and effective mendable epoxy system with excellent η (up to 140%) has been developed by dispersing EMAA particles into an epoxy resin. TDCB and SENB fracture testing was used to show that both the peak load and load-extension gradient were recovered by healing of damaged samples at 150° C. for 30 min. Strength recovery has been achieved during healing due to healing of the EMAA particles as well as the formation of an EMAA adhesive layer between the adjacent epoxy fracture surfaces. Both these strength recovery methods are highly reversible on reheating such that healing is likely to be achieved over multiple damage incidents. In addition to the identification of a new healing agent, a pressure driven healing agent delivery mechanism has also been proposed for the first time in a mendable epoxy. In this new healing agent delivery mechanism, bubbles expansion leads to a pressure build up inside the EMAA particles during healing such that larger quantities of healing agent are forced into, the epoxy fracture plane.

EXAMPLE 2

Bonding Interactions Between EMAA and Themoset Plastic Matrix

The chemical reactions/interactions between EMAA, diglycidyl ether of bisphenol-A (DGEBA), triethyltetramine (TETA), or a mixture of DGEBA and TETA were investigated using attenuated total reflectance fourier transformed infrared (ATR-FTIR) spectroscopy: Changes in the surface chemistry of the EMAA film after exposure to the different components of the epoxy resin were then used to determine the nature of the reactions taking place at the interfaces between the EMAA and resin during curing, post curing and healing.

Materials

Films of EMAA (Nucrel 2940, Dupont) containing 19 wt % methacrylic acid were produced by pressing at 1000 kPa and 130° C. for 1 min. After pressing, the 0.13 mm thick EMAA films were dried in a 50° C. oven for 6 days and then stored in a desiccator until being used. The epoxy resin components consisted of DGEBA (DER331 from Dow Plastics Australia) and TETA (DEH24 from Dow Plastics Australia). Treatments of the EMAA films were carried out at the curing temperature (50° C.) or the post curing temperature (150° C.) for 3 hours and 1 hour as set out in Table 1. Treatments at 150° C. were carried out under nitrogen to avoid degradation of the EMAA sample. After treatment, the EMAA films were thoroughly washed with acetone (removing any material that was not bound to the EMAA film surface) and then stored in a desiccator prior to spectral analysis.

TABLE 1

EMAA film treatment labels and associated treatment conditions used for FTIR analysis.

| Treatment Label | Amine Component (wt. %) | DGEBA Component (wt. %) | Treatment Time (h) | Treatment Temperature (° C.) |
|---|---|---|---|---|
| ED-50 | 0 | 100 | 3 | 50 |
| ED-150 | 0 | 100 | 1 | 150 |
| ET-50 | 100 | 0 | 3 | 50 |
| ET-150 | 100 | 0 | 1 | 150 |
| EDT-50 | 2 | 98 | 3 | 50 |
| EDT-150 | 2 | 98 | 1 | 150 |

Spectroscopy

A Bruker Equinox 55 FTIR was used in ATR mode to collect all FTIR spectra. Spectra from the surface of EMAA sheets were scanned from 600-4000 cm-1 and averaged over 64 individual scans. All EMAA treatments were carried out in triplicate, then each of the three spectra were standardized according to the methylene peak at 1465 cm-1 and then averaged prior to analysis. As there was no visible difference in the spectra of the EMAA aged at 50° C. for 3 hours and at 150° C. for 1 hour, all 6 spectra from these films were averaged and simply referred to as the 'EMAA spectra.' Oxirane and aromatic carbon peak areas were calculated using a local base line (trough-to-trough under the nominated peak) and integrated using a linear approximation over 2 cm-1 intervals.

Theory

The interfacial strength between the EMAA and the epoxy resin is dependant upon a number of factors such as the nature and the degree of chemical and/or physico-chemical interactions (covalent/ionic bond formation, Van de Waals interactions, acid-base interactions, hydrogen bonding), and physical interpenetration such as interlocking of uneven surfaces and interpenetration of molecular chains, etc (Rozenberg BA. Kinetics, thermodynamics and Mechanism of Reactions of Epoxy Oligomers with Amines. In: Dusek K, editor. Epoxy resins and composites Berlin: Springer-Verlag, 1985. p. 115.).

Given that the fracture surfaces of the epoxy resin are relatively smooth and that crosslinking in the epoxy polymer network limits the possibility for chain interpenetration, it has been assumed that physical interpenetrations do not play a major role in the interfacial strength of the mendable EMAA-epoxy system being investigated here.

During production of the mendable resin, the EMAA particles, DGEBA and TETA were mixed together and then the resin was cured at 50° C. and post cured at 150° C. This production method provides a route for the EMAA to react with the DGEBA, TETA or the DGEBA-TETA reaction products (i.e. oligomers or the epoxy resin's polymer network) that are present during the curing and post curing processes.

Figure 11:
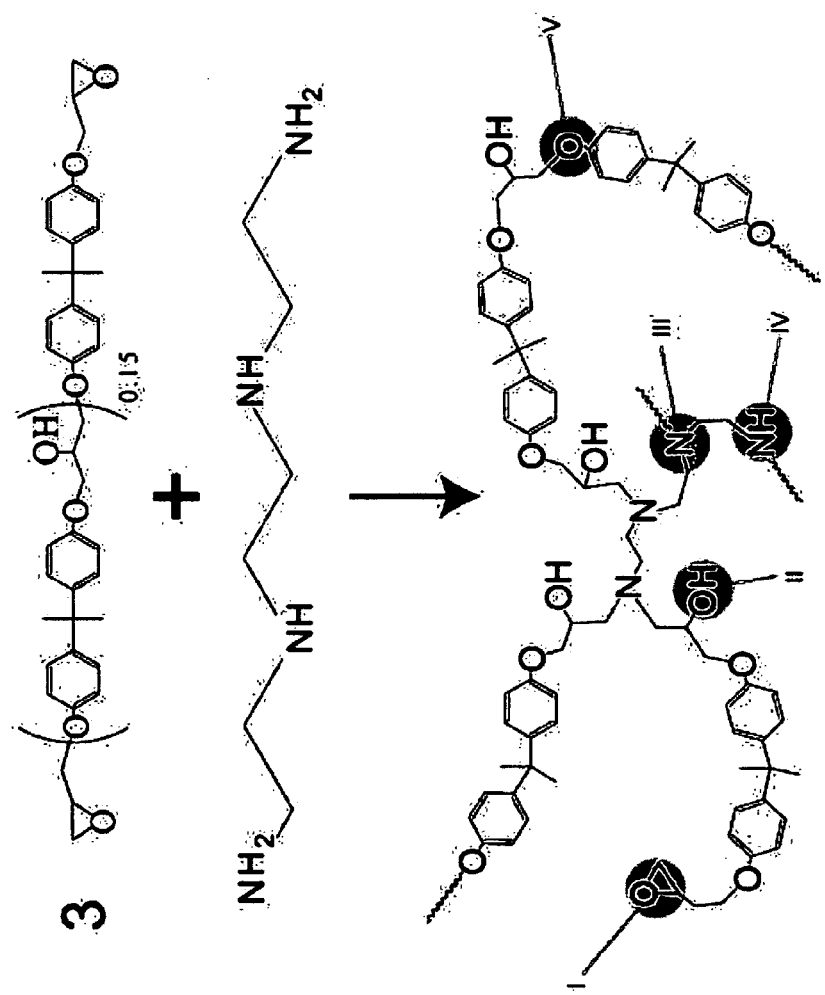
FIG. 11 shows a schematic of DGEBA-TETA reaction showing I) oxirane, II) hydroxyl, III) tertiary amine, IV) secondary amine and V) ether groups incorporated into the cure epoxy resin's polymer network.
Figure 12:
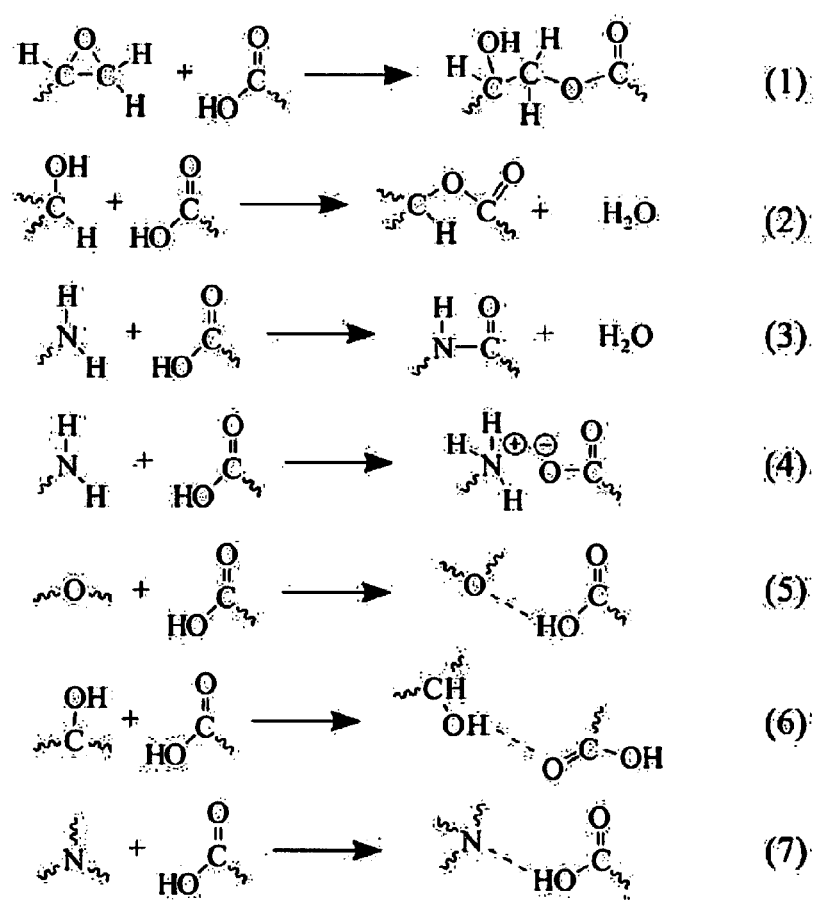
FIG. 12 shows a schematic of bonding interactions in the self healing polymer materials according to various embodiments of the present invention.

The oxirane-amine curing reaction that occurs during curing of the epoxy resin used in this study (Rozenberg BA. Kinetics, thermodynamics and Mechanism of Reactions of Epoxy Oligomers with Amines In: Dusek K, editor. Epoxy resins and composites Berlin: Springer-Verlag, 1985. p. 115.) (FIG. 11) produces a polymer network containing I) oxirane, II) hydroxyl, III) tertiary amine, IV) non-tertiary amine and V) ether groups. The existence of 4 available bonding sites on the TETA molecule prevents complete consumption of the oxirane/amine groups during curing such that even when the epoxy is post-cured there will still be unreacted amine and oxirane groups within the epoxy network. This means that the original amine and oxirane functionality of the TETA and DGEBA are also contained within the crosslinked polymer network and need to be included when identifying possible chemical reactions/interactions between the EMAA and epoxy resin during healing (FIG. 12). Taking into consideration all the functional groups discussed above, the acid groups on the EMAA can interact with the DGEBA, TETA and epoxy resin to form covalent bonds (Orr et al. Homogeneous reactive coupling of terminally functional polymers. Polymer 2001; 42:8171.) (Equations 1-3), ionic bonds (Rees RW. Diamine-modified ethylene-acid copolymers. Polymer Preprints 1973; 14:796.) (Equation 4) or hydrogen bonds (Kollman P A, Allen LC. Theory of the hydrogen-bond. Chem. Rev. 1972; 72:283.) (Equations 5-7) in addition to interactions from dipole and dispersion forces (FIG. 12). It should also be noted that reactions not included in Equations 1-7 are taking place during the curing of the epoxy (e.g. oxirane-amine bonding, epoxy-alcohol bonding) but these reactions do not result in bonding between the EMAA and epoxy and so have not been addressed here.

Differences in bond strength of ionic, covalent and hydrogen bonds (ionic bonds>covalent bonds>>hydrogen bonds>>dipole/dispersion forces (Kinloch AJ. The science of adhesion .1. Surface and interfacial aspects. J. Mater. Sci. 1980; 15:2141) mean that interfacial bonding from covalent/ionic bonds can produce much stronger interfacial strengths than can be achieved by a similar number of hydrogen bonds. In light of this, the identification of covalent and ionic bonds formed between EMAA and the epoxy resin during curing and healing have been used as a primary method of determining the active bonding mechanisms in this mendable system.

Figure 13:
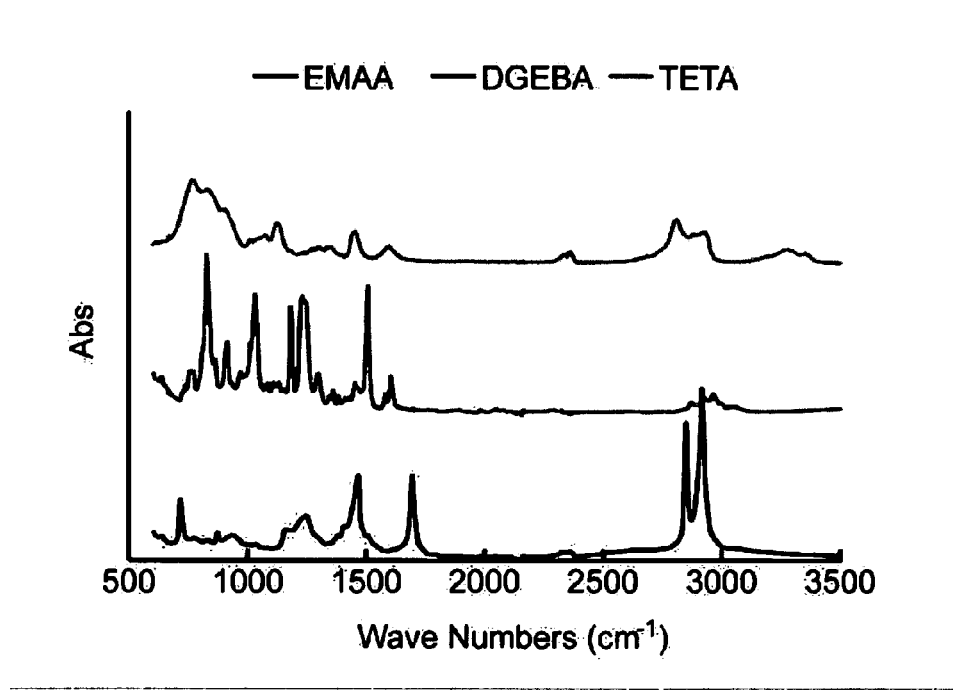
FIG. 13 shows FTIR spectra of EMAA, DGEBA and TETA.

Changes in the chemical functionality on the surface of EMAA films have been used to identify the type of chemical interactions that are most likely to contribute to the interfacial strength between the EMAA and resin. Any covalent/ionic bonding that occurs between the EMAA and resin components during curing/post curing result in the formation of new functional groups on the surface of the EMAA film. So, monitoring changes in acid concentration and the appearance of new functional groups on the EMAA surface enables the identification of possible reactions that have taken place between the EMAA and resin. In this study, the functionality on the surface of EMAA films was assessed before and after exposure to separate components of the resin (DGEBA, TETA or the DGEBA-TETA mixture). During exposure, similar conditions to those used during curing, post curing and healing have been maintained (albeit for longer times) to ensure that the same chemical reactions occur during testing as would occur during the materials in-service use. A comparison of peak intensities of functional groups (peak assignments in Table 2) in the spectra of the EMAA before and after exposure to separate components of the epoxy resin (spectra of age film and unmodified components in FIG. 13) were then used to determine which of the reactions described in Equations 1-4 have taken place at the EMAA-epoxy interface during curing.

TABLE 2

FTIR spectra peak assignments

| Material Type | Bond Type | Peak Location (cm-I) |
|---|---|---|
| EMAA, DGEBA, TETA | alkane | 720 |
| DGEBA | aromatic carbons | 830 |
| DGEBA | oxirane | 915 |
| EMAA | acid dimer | 930 |

TABLE 2-continued

FTIR spectra peak assignments

| Material Type | Bond Type | Peak Location (cm-I) |
|---|---|---|
| DGEBA | aromatic carbon and aliphatic ether | 1030 |
| DGEBA | aromatic carbon | 1180 |
| DGEBA | carbon-hydrogen or aromatic ether | 1230-1250 |
| EMAA | carboxylic acid | 1255 |
| EMAA | ketone | 1365 |
| EMAA | ketone | 1435 |
| EMAA, DGEBA, TETA | alkane | 1430-1470 |
| Ionomer | amide | 1500 |
| DGEBA | aromatic carbon | 1505 |
| Ionomer | amine salt of carboxylic acid | 1500-1570 |
| TETA | amine | 1580 |
| DGEBA | aromatic carbon | 1605 |
| Ionomer | amine salt of carboxylic acid | 1620-1650 |
| Ionomer | amide | 1650 |
| EMAA | acid dimer | 1700 |
| EMAA | ketone | 1727 |
| EMAA | ester | 1735 |
| EMAA | free carboxylic acid | 1750 |
| EMAA, DGEBA, TETA | alkane | 2850-2960 |

Binding Mechanisms during Epoxy Curing (50° C.)

Exposing EMAA films to DGEBA (ED-50) and TETA (ET-50) at 50° C. revealed that both the oxirane and amine components of the epoxy resin were adsorbed onto the surface of the EMAA during curing of the resin. FTIR spectra of the EMAA films exposed to DGEBA at 50° C. (FIG. 14) possessed peaks from the aromatic core of the DGEBA (830, 1030, 1180, 1225, 1510 and 1610 cm-1), aliphatic ether linkage (1035 cm-1) and the oxirane group (915 cm-1) that can be attributed to the adsorption of the DGEBA onto the EMAA film. The relatively small changes in the relative intensities of the oxirane group peak (discussed in more detail below) and EMAA acid dimer peak indicate that adsorption of the DGEBA at 50° C. has not resulted in a change in the functionality of the EMAA or the DGEBA. Given that equations 1-2 would have resulted in a change in functionality of both the EMAA and DGEBA that have not been observed here, it was concluded that the interactions between DGEBA and EMAA at 50° C. were due to hydrogen bonding (Equations 5-6).

Figure 14:
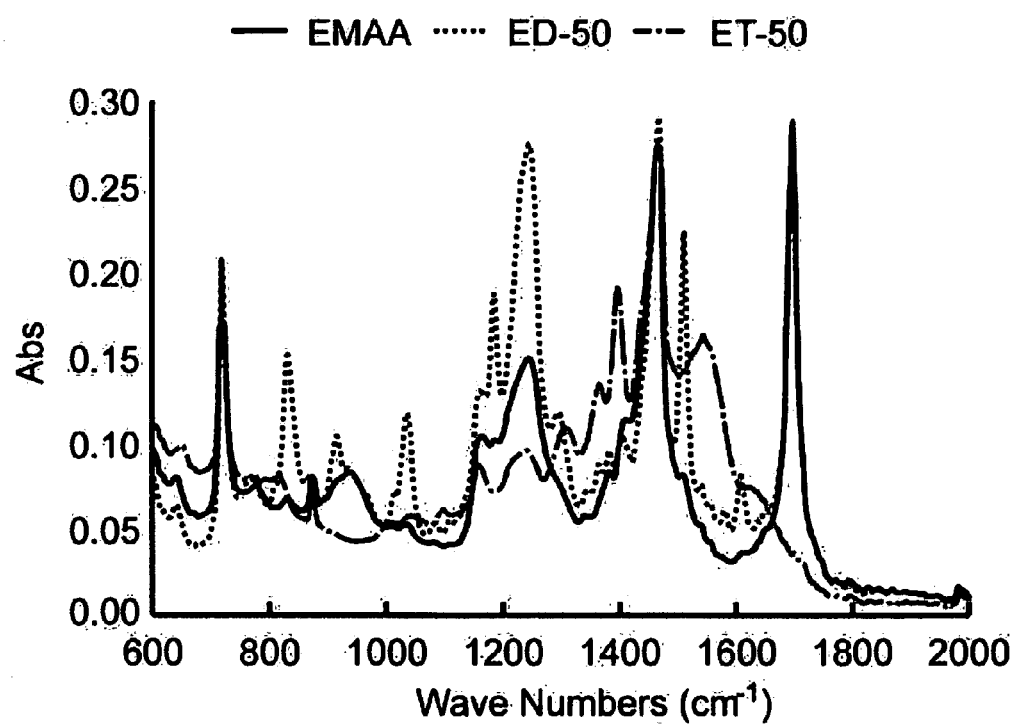
FIG. 14 shows FTIR spectra of aged EMAA, EMAA exposed to DGEBA at 50° C. (ED-50) and EMAA exposed to TETA at 50° C. (ET-50)

In contrast to the hydrogen bond-dominated adsorption of the DGEBA, the adsorption of TETA at 50° C. appears to be associated with formation of ionic bonds. FTIR spectra of EMAA exposed to TETA at 50° C. (ET-50) possessed much smaller acid dimer peaks at 920 cm-1 and 1700 cm$^{-1}$ (FIG. 14). The drop in intensity of these peaks is commonly associated with the salt formation as ionic bonds form when counter-ions (TETA in this case) are incorporated into an acid functionalised polyethylene [Han K, Williams HL. Ionomers—the sodium-salt of poly(ethylene-comethacrylic acid). J. Appl. Polym. Sci. 1989; 38:73.]. Further evidence of ionic bonding comes from the appearance of two peaks between 1530-1650 cm-1 (seen at 1533 cm-1 and 1627 cm-1) as described during the formation of amine-neutralised EMAA ionomers by Rees et al. [Rees RW. Diamine-modified ethylene-acid copolymers. Polymer Preprints 1973; 14:796]. Although the incorporation of TETA as counter-ions into EMAA has not been reported previously, previous studies relating to the use of other aliphatic amines such as diethylene triamine and ethylene diamine [see Rees et al above] as counter-ions in EMAA provide further evidence that the salt formation proposed here is likely to have occurred. The ionic and hydrogen bonding identified above indicate that adsorption of the epoxy resin's oxirane and amine components during curing contribute to the formation of strong interfacial strength between EMAA particles and epoxy resin.

Spectroscopy of EMAA films exposed to the DGEBA-TETA mixture (EDT-50) at 50° C. revealed that DGEBA adsorption is promoted when the EMAA comes in contact with both the amine and oxirane components simultaneously. The peak intensities relating to the DGBEA aromatic and the ether group on the spectra of EDT-50 (FIG. 15) are higher than those of these two functional groups on the ED-50 spectra (FIG. 14). This increase in FTIR peak intensity shows that a catalytic amount of TETA promoted the adsorption of DGEBA onto the EMAA at 50° C. In addition to the increase of adsorption of DGEBA, there was a small reduction of the acid dimer peak when a catalytic amount of TETA was present. This reduction in acid dimer concentration could be associated with acid-oxirane (Equation 1), acid-hydroxyl (Equation 2) or acid-amine reactions (Equation 3-4) (FIG. 11). It is unlikely that the drop in acid dimer concentration was a result of acid-amine reactions due to the absence of the IR peaks that would reflect amine absorption or amide formation (1500-1650 cm-1).

It is more likely that this reduction in acid dimer peak is due to consumption of a small number of acid groups through acid-oxirane or acid-hydroxyl reactions that can be catalysed by tertiary amines (discussed below). However, the EDT-50 spectra do not possess any visible ester group peaks, indicating that this reaction has a very low yield. Given the evidence of limited covalent bonding, the adsorption of DGEBA and TETA via hydrogen and ionic bonding respectively have been identified as the dominant mechanisms for the development of interfacial strength between the EMAA particles during curing at 50° C.

Bonding Mechanisms between EMAA and Epoxy during Post-curing (150° C.)

Figure 16:
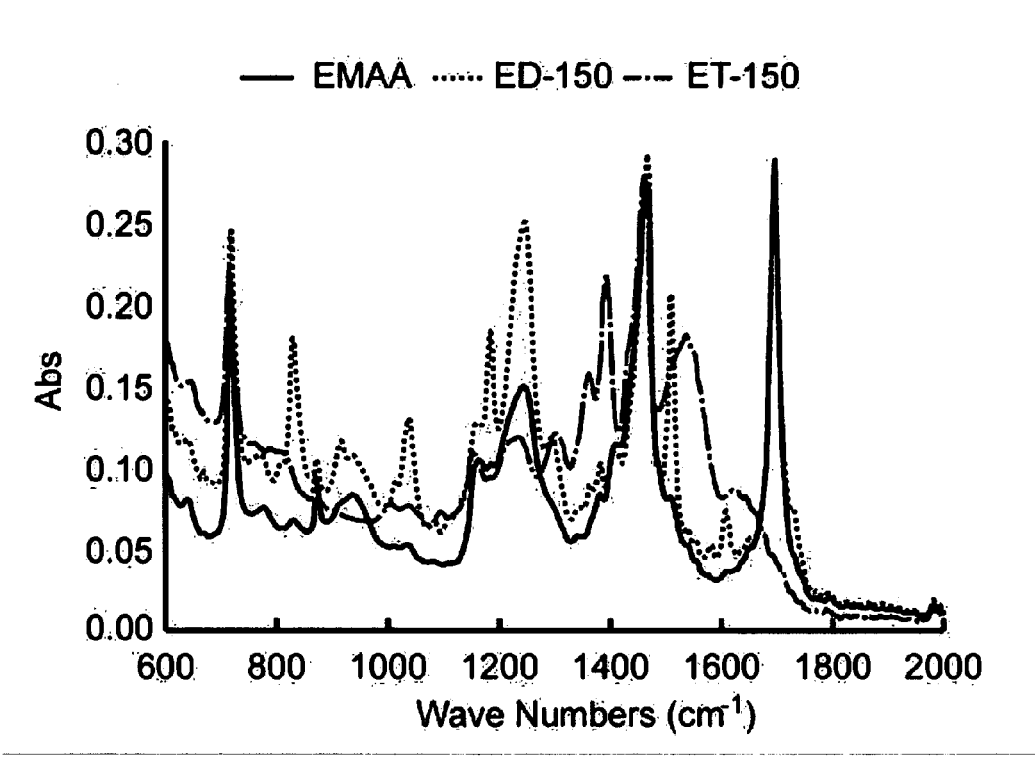
FIG. 16 shows FTIR spectra of aged EMAA, EMAA exposed to DGEBA at 150° C. (ED-150), EDT-150, EMAA exposed to TETA at 150° C. (ET-150) according to an embodiment of the invention.

The FTIR spectra of EMAA films exposed to DGEBA (ED-150) at 150° C. (FIG. 16) possessed peaks associated with the aromatic core, aliphatic ether linkage and oxirane group that were identified after exposure to DGEBA at 50° C. One difference between the ET50 and ET-150 spectra is an increase in intensity of the DGEBA peaks in the ET-150 spectrum. The increase in DGEBA peak intensities indicates that more DGEBA has been adsorbed onto the surface of the EMAA during exposure at 150° C. than was adsorbed during exposure at 50° C. Following the trend established between ED-50 and ED-150, exposure of EMAA films to TETA (ET-150) at 150° C. (FIG. 16) resulted in a similar spectrum to that of the EMAA film treated at 50° C. but with greater intensities in the peaks associated with salt formation. The increased peak intensity observed at 150° C. as compared to the case at 50° C. indicates the occurrence of higher degree of hydrogen and ionic bonding during the post curing process.

Figure 15:
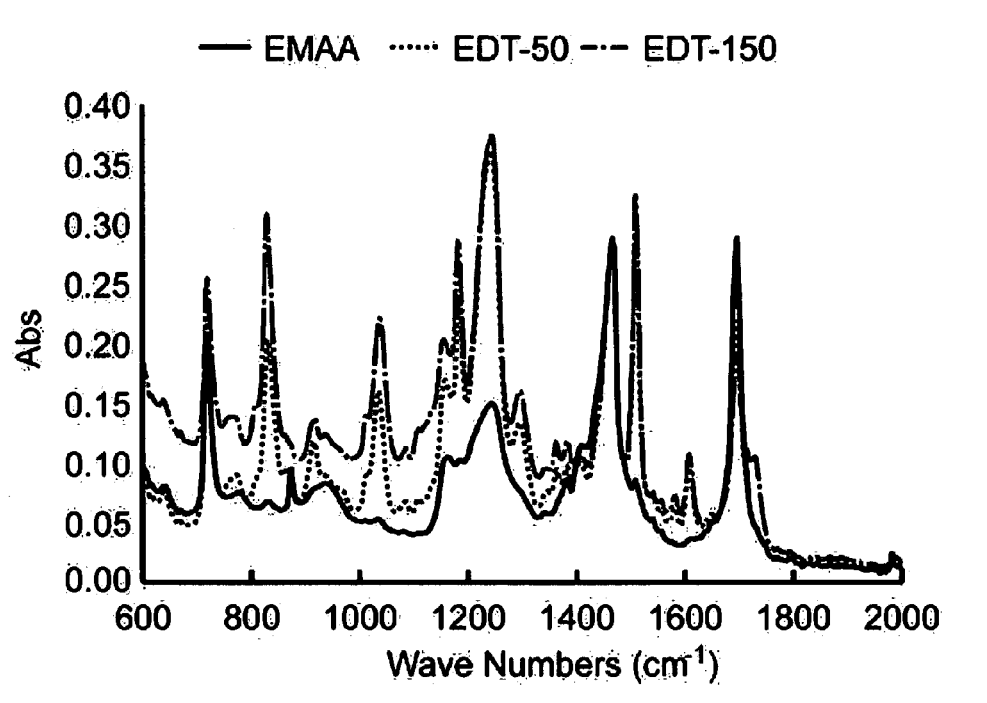
FIG. 15 shows FTIR spectra of aged EMAA, EMAA exposed to the DGEBA-TETA mixture at 50° C. (EDT-50) and EMAA exposed to the DGEBA-TETA mixture at 150° C. (EDT-150)

Spectra of the EMAA exposed to the DGEBA-TETA mixture at 150° C. revealed that covalent bonding was taking place in addition to the hydrogen/ionic bonding identified at 50° C. (FIG. 15). An indication that covalent bonding occurred is seen in the appearance of a new shoulder at 1710 cm-1 that can be attributed to the formation of an ester. Although a similar shoulder can be caused by degradation of the EMAA [Kramer R H, Raza M A, Gedde U W. Degradation of poly (ethylene-comethacrylic acid)-calcium carbonate nanocomposites. Polym. Degrad. Stab 2007; 92:1795.], degradation is unlikely to have occurred here as there is no shoulder in the spectra of aged EMAA (FIG. 14). It is therefore possible that this shoulder arises from either the acid-oxirane reaction or the acid-hydroxyl reaction; with the acid-oxirane reaction being generally favoured when these two mechanisms are in competition [Matejka L, Pokorny S, Dusek K. Network formation involving epoxide and carboxyl groups—course of the model reaction monoepoxide-monocarbonic acid. Polym. Bull. 1982; 7:123.].

There is evidence that oxirane groups on the DGEBA are consumed via the acid-oxirane reaction (Equation 1) during curing. A comparison of the ratio between an aromatic carbon peak (830 cm-1) and the oxirane peak intensities can be used estimate the portion of the oxirane groups being consumed during adsorption of the DGEBA. While it can be problematic to use the ratio of these two peaks for quantitative calculations, this method can be used to reflect changes of the functionality of DGEBA. For the system being investigated here, a decrease in carbon-oxirane peak ratio reflects the consumption of oxirane groups in the DGEBA that has been adsorbed by the EMAA film. The ratio of areas under the aromatic carbon:oxirane peaks increase from 2.4 to 4.1 and then to 6.1 for the spectra of DGEBA, ED-50 and ED-150 respectively. Further increases in aromatic carbon:oxirane peak ratio (4.8 for EDT-50 and 12.1 EDT-150) were observed when EMAA was exposed to the DGEBA-TETA mixture. These increases in peak area ratios suggest that more oxirane groups were consumed during adsorption of DGEBA at 150° C. than at 50° C. The fact that this increased consumption of oxirane groups at 150° C. occurred in conjunction with the appearance of an ester peak indicates that the reduction in oxirane groups is likely to arise from an increase in the acid-oxirane reaction. Previous studies on the acid-oxirane reaction indicate that this reaction can proceed in bulk at elevated temperatures, but is usually promoted through the use of catalysts (such as tertiary amines) [see Rees et al above]. We have therefore concluded that the acid-oxirane reaction has taken place at the EMAA-resin interface during post curing of the mendable resin.

When the EMAA films were exposed to the DGEBA-TETA mixture at 150° C., acid-hydroxyl bonding was likely to occur in competition with the acid-oxirane reaction. In epoxy resins containing an excess of acid groups, the presence of tertiary amine promotes acid-hydroxyl etherification after all oxirane groups are consumed [Matejka L, Pokorny S, Dusek K. Network formation involving epoxide and carboxyl groups—course of the model reaction monoepoxide-monocarbonic acid. Polym. Bull. 1982; 7:123.]. FTIR of the EMAA films indicated that there are still a large number of acid dimers on the EMAA surface after exposure to the DGEBA-TETA mixture at 150° C. (FIG. 15). This shows that there is an excess of acid groups both during adsorption and after adsorption at 150° C. Under these conditions, the TETA molecules that have reacted with DGEBA (forming tertiary amine groups) can promote the acid-hydroxyl reaction between the acid groups on the EMAA and the hydroxyl groups of any DGEBA or DGEBA-TETA reaction products that have been adsorbed. The amine catalysed acid-hydroxyl reaction produces linkages containing an ester group that would contribute to the same FTIR peak shoulder as arises from acid-oxirane bonding. Even though contributions to the increased ester peak intensity from acid-oxirane reaction and acid-hydroxyl reaction could not be distinguished in the FTIR spectra, evidence that the acid-hydroxyl reaction occurred was obtained from the topology of the EMAA film. The surface of the EMAA films that had been in contact with the DGEBA-TETA mixture had a rippled appearance and possessed small voids where bubbles have formed. These ripples and bubbles are believed to have been caused by the boiling and loss of water that was formed subsequent to the acid-hydroxyl reaction (Equation 2). After boiling, the steam phase separated from the EMAA-resin interface and formed the ripples/voids in the EMAA film. This type of distortion on the EMAA surface did not occur in films exposed to unmodified DGEBA, unmodified TETA or the exposed DGEBA-TETA mixture at 50° C., indicating that a similar reaction had not taken place to an appreciable extent under these conditions. It was therefore concluded that the acid-hydroxyl reaction had been catalysed be presence of TETA during exposure of EMAA to DGEBA at 150° C.

The appearance of an ester shoulder coincided with a drop in the acid dimer peak that can be attributed to the consumption of amine groups via acid-oxirane and acid-hydroxyl bonding. There are 3 potential bonding reactions between the epoxy resin and the EMAA that result in the consumption of acid groups involving either the formation of ester groups (Equation 1-2) or amide groups (Equation 3). Although direct formation of amides as a result of reaction between amines like TETA and carboxylic acids can be achieved, it is unlikely to have occurred here given that typically heating above 150° C. is required to obtain an appreciable reaction rate [Kale V, Vedanayagam H S, Subbarao R, Rao M B. Kinetics of reaction of c-36 dimer acids with diethylenetriamine and triethylenetetramine for reactive polyamides. J. Appl. Polym. Sci. 1994; 53:807.]. Further evidence against amide formation comes from the absence of peaks associated with the amide group in the FTIR spectra of the EMAA exposed to TETA and from previous reports showing that amine salts in comparable polymer systems were not converted to amides until temperatures above 170° C. [see Rees et al]. In the absence of significant amide formation, the reduction in acid dimers has therefore come from the consumption of acid groups via the acid-oxirane and/or acid-hydroxyl reactions discussed above.

Despite the likelihood of acid-oxirane and acid-hydroxyl reactions took place during post curing, it should be noted that these reactions only produced a small reduction in the EMAA acid dimer peak. The relatively small change in the acid dimer concentration resulting from these reactions indicates that despite the presence of a large excess of oxirane and hydroxyl groups, the majority of carboxylic acid groups on the surface of the EMAA did not participate in the acid-oxirane reaction. This means that the acid groups in the EMAA remain largely unreacted during curing and post curing of the resin and so are available to interact with the damaged epoxy resin during healing.

Bonding Mechanisms between EMAA and Epoxy during Healing at 150° C.

The bonding reactions identified during post-curing at 150° C. can also occur at the EMAA-resin interface during healing. Residual functionality in the resin and low level of acid groups consumption during post curing means that the functional groups present in the EMAA and the resin during post curing (acid, oxirane, primary/secondary amine, tertiary amine and hydroxy) are also present during healing. The only reaction shown to consume a large percentage of acid groups during curing and post curing was the salt formation from TETA adsorption. Even though this reaction may consume acid groups at room temperature, amine salts have been shown to disassociate from acids at moderate temperatures [Fleischer C A, Morales A R, Koberstein J T. Interfacial modification through end group complexation in polymer blends. Macromolecules 1994; 27:379.].

Disassociation of the TETA salts in the EMAA enables the acid-amine, acid-oxirane and acid-hydroxyl reactions to occur during healing at 150° C. Given that the acid-oxirane and acid-hydroxyl reactions catalysed by tertiary amine are kinetically favored over the acid-amine reaction [Orr C A, Cemohous J J, Guegan P, Hirao A, Jeon H K, Macosko C W. Homogeneous reactive coupling of terminally functional polymers. Polymer 2001; 42:8171.], acids from the disassociated salts are likely to react with any available oxirane and hydroxyl groups during healing. This means that even though there is a significant decrease in chain mobility of the DGEBA and TETA components due to curing of the resin, the hydrogen bonding and covalent bonding reactions previously can still provide an interfacial bonding mechanism during healing.

Conclusion

The study of the bonding mechanisms between EMAA, DGEBA and TETA revealed that a number of interfacial interactions occurred during curing, post curing and healing of the mendable resin. During curing at 50° C., DGEBA and TETA were adsorbed by the EMAA via hydrogen bonding and ionic bonding respectively. During post curing at 150° C., covalent bonding between the DGEBA and EMAA (acid oxirane and/or acid-hydroxyl reactions) occurred in addition to the hydrogen/ionic bonding. Without wishing to be bound by any theory, these bonding mechanisms are likely to be responsible for the development of strong interfacial adhesion between the EMAA particles and epoxy resin. Based on the availability of acid, oxirane and amine groups in the damaged epoxy resin, it is anticipated that the same types of covalent, hydrogen and ionic bonding identified during curing and post cure were responsible for interfacial strength development during healing. Identification of bonding via both acid-oxirane and acid-amine reactions during curing suggests that good interfacial adhesion between acid functionalised thermoplastic particles and the bulk material should be achievable in a wide range of both aromatic and aliphatic epoxy resins.

EXAMPLE 3

Identification of Critical Conditions for Healing in a Mendable EMAA-Epoxy Resin Healing in a mendable epoxy containing polyethylene-co-methacrylic acid (EMAA) particles has been assessed. The peak load (P) in virgin, damaged and healed single edge notched bending bars tested using different EMAA contents, EMAA particle sizes, healing temperatures and healing times were compared. Changing EMAA contents from 6 vol % to 18 vol % and particle size ranges from 50-150 µm to 250-450 µm revealed that larger contents of larger particles consistently produce up to 100% recoveries in P over 3 healing cycles. Increasing the healing time from 0 min to 90 min at healing temperatures of 110, 130 and 150° C. revealed an asymptotic increase in P with an approximately 100% recovery of the unmodified resins P after 90, 30 and 15 min respectively. In addition to identifying the critical healing temperature (110° C. for EMAA thermoplastic polymer in DGEBA-TETA thermoset matrix), further details regarding the healing mechanism of mendable resins containing EMAA particles were obtained.

The effects of EMAA content, EMAA particle size, healing temperature and healing time on the healing effeciency ($\eta$) of the epoxy resin are reported. By varying these conditions and then comparing the recoveries in peak load (P) of single edge notched bending bars (SENB) the conditions required for significant strength recovery in the mendable EMAA-epoxy system have been identified. The results from SENB testing have also been used to provide further insight into the healing mechanism as compared to the mendable EMAA-epoxy system containing other, thermoplastic healing agent-based mendable polymers.

Sample Preparation

The mendable epoxy was prepared by curing diglycidyl ether of bisphenol A (DGEBA, DER 331 from Dow Plastics Australia) with triethyltetramine (FETA, DEH24 from Dow Plastics Australia) at stoichiometric ratio (100:13 w/w epoxy to amine). Pellets of the EMAA healing agent (Nucrel 2940, DuPont Packaging and Industrial Polymers) were cryogenically ground, separated into particle size ranges by water flushing through a stack of 20, 35, 60, 100 and 270 mesh sieves and then dried under vacuum at 50° C. for at least 4 days prior to being used. Mendable SENB were prepared by mixing the specified amount of EMAA into the DGEBA at 70° C. prior to addition of the TETA (at approximately 45° C.). After mixing, the SENB were then cured at 50° C. for 90 min in silicone moulds and then removed from the moulds and post cured for 30 min at 150° C.

Fracture Testing

The fracture strength of the epoxy resins was assessed using an Matron 5566 machine at approximately 23° C. as described previously. SENB testing was carried out in general accordance with ASTM-D5045 using 5 mm width, 10 mm thickness and 50 mm length bars in a 40 mm span three point bend and a crosshead speed of 10 mm/min. The peak load (P) of each test piece was set as the maximum compression load sustained during bending of each SENB. Virgin SENB were prepared using a diamond saw to cut a 3 mm deep notch and then tapped with a new razor blade to produce a 2 mm deep pre-crack. Damaged SENB were created by loading the virgin SENB until a 90% loss of P. Healing of the damaged SENB was conducted by placing the SENB (notch side up) in an oven at 150° C. for 30 min unless otherwise specified. Peak strengths in the healed SENB were recorded as described above with loading stopped at 99% loss of P. Multiple healing cycles were carried out by repeating the healing and re-loading steps described above.

The healing efficiency ($\eta$) was calculated according to Equation 1 below where $P_{Healed}$ a is P of the healed SENB and $P_{Initial}$ is P of the virgin SENB.

$$\eta = 100 \times \frac{P_{Healed}}{P_{Initial}} \quad (1)$$

The P values for each set of conditions were averaged over 5 test pieces and the standard error calculated as the standard deviation in P divided by the square root of the number of values recorded. The factorial experimental design was carried out using 3 replicates of each corner point and the centre point as set out in Table 3. P from each replicate of the factorial design was calculated from the average of 6 individual SENB such that each corner point reflects the average of 18 individual SENB containing the specified EMAA content and EMAA particle size. The standard errors quoted for P in the factorial design were calculated using the standard deviation in average P from the three replicates.

TABLE 3

Factorial design levels and the associated EMAA content and EMAA particle size ranges

| Factorial Allocation (Content Level, Size Level) | EMAA Content (vol %) | Particle Size Range (μm) |
| --- | --- | --- |
| a (1, −1) | 18 | 50-150 |
| b (−1, 1) | 6 | 250-450 |
| ab (1, 1) | 18 | 250-450 |
| i (−1, −1) | 6 | 50-150 |
| Centre point (0, 0) | 12 | 150-250 |

It is important to note that more than 100% of healing efficiencies may be obtained from the SENB test due to changes in the crack length during healing. During the course of the SENB test, the critical stress intensity factor (stress required for crack growth to occur) decreases as the crack length grows and vice versa [Brown W F, Srawley J E. Plane strain crack toughness testing of high strength metallic materials. In:ASTM Technical Publication 410, American Society for Testing and Materials, Philadelphia, 1966.]. Given that the virgin SENB needs to be pre-cracked prior to testing, healing that resulted in rebinding of this pre-crack produced SENB with shorter crack lengths than the virgin test piece. Hence strength recoveries associated with healing of the pre-crack can result in higher P than the virgin material due to the mechanical advantage obtained by the shorter crack length. Relative comparisons are focused upon since the material characteristics and healing conditions are varied such that all the specimens have an equal capacity for precrack healing. So even though the effects arising from changes in the crack length can be accounted for, this correction is unnecessary in the present circumstances.

Microscopy

Specimens for microscopic imaging were cut from SENB in 1-2 mm thick sections using a diamond saw. Fractured surfaces were coated with 200-250 Å of iridium prior to imaging at 5 kV on a Philips XL30 Field Emission scanning electron microscopy (SEM). For reflectance optical microscopy (OM) analysis, cross sections of the samples were imaged as cut or after polishing at 200 rpm using Kemet Diamond Compound 3-FD-C4.

Effect of EMAA Content and Particle Size on Healing Efficiency

Initially, a 22 factorial design with centre points was used to identify a statistical effect of EMAA particle size, EMAA content and their combined effect on P of the epoxy resin. During the factorial experiments EMAA contents of 6 vol %, 12 vol % and 18 vol % were used in conjunction with particle size ranges of 150-53 μm, 250-150 μm and 450-250 μm in accordance with the factorial design allocation set out in Table 3.

Figure 17:
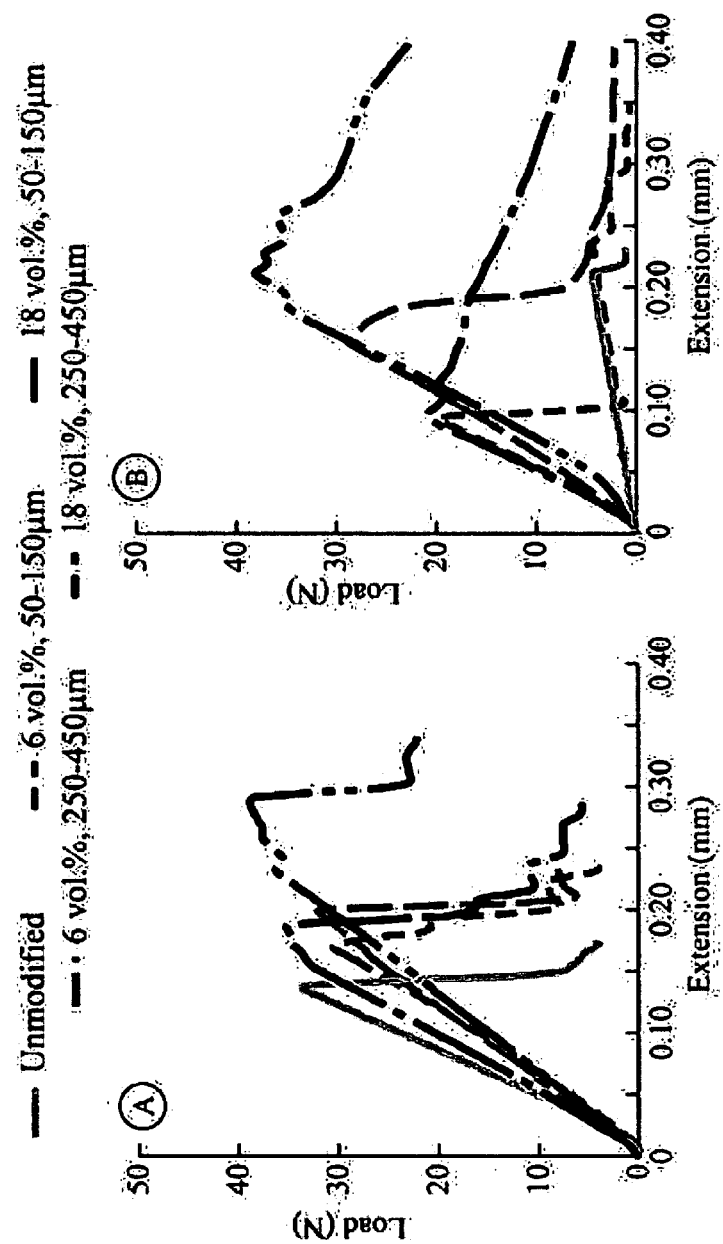
FIG. 17 shows load extension plots of A) virgin and B) healed mendable resins containing different EMAA contents and particle size ranges according to an embodiment of the invention.

Experiments varying the EMAA content and particle size revealed that incorporation of the EMAA into the epoxy resin resulted in changes in P that were smaller than the associated standard errors (FIG. 17A, Table 4). The negligible effect of EMAA on P of the SENB appears to be different from the previous reports where incorporating 15 vol % EMAA into the resin resulted in a measurable increase in P. There are a number of possible reasons for this discrepancy although the most Likely cause may be due to a nonlinear relationship between EMAA content and P. It is possible that the epoxy resins containing EMAA particles behave similarity to other particulate reinforced resins which were shown to experience a reduction in P as particle concentration increases due to the formation of new crack nucleation sites. Although there is no direct evidence for toughening of the epoxy resin with addition of the EMAA, inclusion of the EMAA particles has not resulted in an undesirable drop in P of the epoxy resin as has been seen in other reported mendable polymers containing thermoplastic-additives as healing agents [Zako M, Takano N, Fujioka H. On self-repair for microcracks in FRP. Proceedings of the Fifth Japan International SAMPE Symposium, 1997. p. 919.]. This means that even at relatively high loadings of the EMAA healing agent (18 vol %) there is no measurable reduction in P of the matrix resin.

TABLE 4

Peak Loads of virgin/healed mendable resins and the associated healing efficiencies of mendable resins according to the EMAA content and particle size range

| EMAA Content Particle Size Range (vol %, μm) | Virgin Peak Load (N) | Healed Peak Load (N) | | | Healing Efficiency (%) | | |
|---|---|---|---|---|---|---|---|
| | | 1st Healing Cycle | 2nd Healing Cycle | 3rd Healing Cycle | 1st Healing Cycle | 2nd Healing Cycle | 3rd Healing Cycle |
| Unmodified Resin (0, —) | 34 ± 5 | 5 ± 4 | 0 | 0 | 15 | 0 | 0 |
| 18, 50-150 | 31 ± 3 | 28 ± 2 | 36 ± 3 | 40 ± 3 | 89 | 114 | 126 |
| 6, 250-450 | 37 ± 3 | 18 ± 2 | 25 ± 6 | 30 ± 8 | 49 | 67 | 81 |
| 18, 250-450 | 39 ± 3 | 39 ± 1 | 46 ± 1 | 54 ± 3 | 101 | 125 | 138 |
| 6, 50-150 | 30 ± 2 | 18 ± 4 | 24 ± 2 | 27 ± 1 | 61 | 80 | 91 |
| 12, 150-250 | 32 ± 6 | 30 ± 1 | 35 ± 2 | 38 ± 3 | 92 | 107 | 117 |

A comparison of η in mendable resins containing different EMAA contents and particle size ranges (Table 4) revealed that resins containing higher EMAA contents and larger particles resulted in the highest healing efficiency (101%) after the 1st healing cycle. A comparision of P in the healed resins as a function of EMAA content and particle size range (effect analysis using the factorial design) revealed a trend where P are improved by increasing both the EMAA content and particle size, with increases in EMAA content having a more pronounced effect. This suggests that improvements in healing efficiency are more likely to be achieved by increasing the EMAA content rather than the EMAA particle size in a mendable epoxy resin. In addition to revealing P recovery, load-extension plots of the healed SENB (FIG. 17B) indicated that the healed resins possessed significantly higher strength after failure (seen as the increased load sustained after P is reached) when the 250-450 μm particles were used. This increase in post-failure strength of the resin reflects that much larger energies were required to reopen the healed cracks compared to the energy required to produce the original cracks. This increase in energy to failure after healing represents a significant improvement in the mendable resins structural integrity as both a higher load and more energy were needed to generate the level of damage that was present prior to healing.

Even though increasing the EMAA content and particle size improved the level of strength recovery after healing, resins with low levels of small particles (6 vol % of 50-150 μm Particles) still exhibited measurable strength recovery with respect to the unmodified resin. Table 4 shows that the unmodified resin had a P of 5 N after healing while resins containing 6 vol % of 50-150 μm particles had a P of 18 N. The 5 N load sustained by the unmodified resin was not a result of strength recovery but rather represented the residual strength in the SENB as loading was stopped at 90% loss of P.

Taking the residual strength of the resin into account, it is apparent that the resin containing low EMAA contents and small EMAA particles (6 vol % of 50-150 μm) still showed a 43% recovery in P after healing. In fact, all of the combinations of EMAA particle size and content resulted in a significant increase in P after healing. This indicates that the critical EMAA content and particle size range required to achieve measurable healing efficiencies are lower/smaller than the lowest/smallest levels that have been investigated in this study. The capability of EMAA particles to restore P by up to 60% at 5 vol % compares favorably to the 37.5% P recovery that has been previously reported in the mendable polymers using a similar thermoplastic content. Furthermore the optimum recovery in P obtained in the mendable resins containing 15 vol % of EMAA (101%) is comparable to existing technologies that have achieved up to 66% [Hayes S A, Jones F R, Marshiya K, Zhang W. A self-healing thermosetting composite material. Composites Part A—Applied Science and Manufacturing 2007; 38:1116.] and 90% [Zako M, Takano N, Fujioka H. On self-repair for microcracks in FRP. Proceedings of the Fifth Japan International SAMPE Symposium, 1997. p. 919.] P recoveries using 20% and 40% thermoplastic healing agents respectively.

After the resins were healed once, the fracture-healing cycle was repeated two more times to evaluate η after multiple fractures (Table 4). For all the combinations of EMAA content/particle size range, the second and third healing cycles resulted in P that were larger than the previous healing cycle. This increase in P values after each fracture-healing cycle resulted in η of more than 100% for all mendable resins containing 12 vol % or more EMAA after the third healing cycle. The highest η achieved in the EMAA particle filled resin was 138% (obtained with 18 vol % of 250-450 μm EMAA particles). The high level of strength recovery and repeatability of healing, demonstrated here without clamping of the damaged test pieces, represents a significant improvement in healing capability with respect to existing thermoplastic epoxy-based and poly (caprolactone)-based mendable resins.

Effect of Healing Conditions on Healing Efficiency

According to the proposed healing mechanism, the EMAA healing agent needs to be thermally activated to initiate the healing. Therefore, variation of the healing temperatures and healing time is expected to influence the achievable strength recovery.

FIG. 18 shows a schematic diagram of the proposed healing mechanism. According to this mechanism, a sufficient amount of heat needs to be applied to melt the EMAA particles to initiate the healing process. Melting of the particles facilitates flow of the EMAA such that strength can be restored via particle healing and adhesive layer formation. In addition to melting of the EMAA, heat is needed to promote the pressure driven healing agent delivery mechanism (expansion of small bubbles in the EMAA particles) as well as binding between the EMAA and epoxy. As it is desirable to achieve the highest level of strength recovery using the lowest temperatures and shortest healing times possible, the critical healing temperatures and the associated healing times for mendable resins containing the EMAA particles were investigated. During this investigation, the mendable resins with the same EMAA content (15 vol % of 250-450 µm particles) as previously reported were used. In order to assess the effect of healing temperature on P, the healing time was kept at 120 min and the temperatures were varied between 70° C. and 150° C. at 20° C. increments. In order to assess the effect of healing time on P, the healing temperature was set at 110° C., 130° C. or 150° C. and healing times were varied between 5 min and 90 min.

Figure 19:
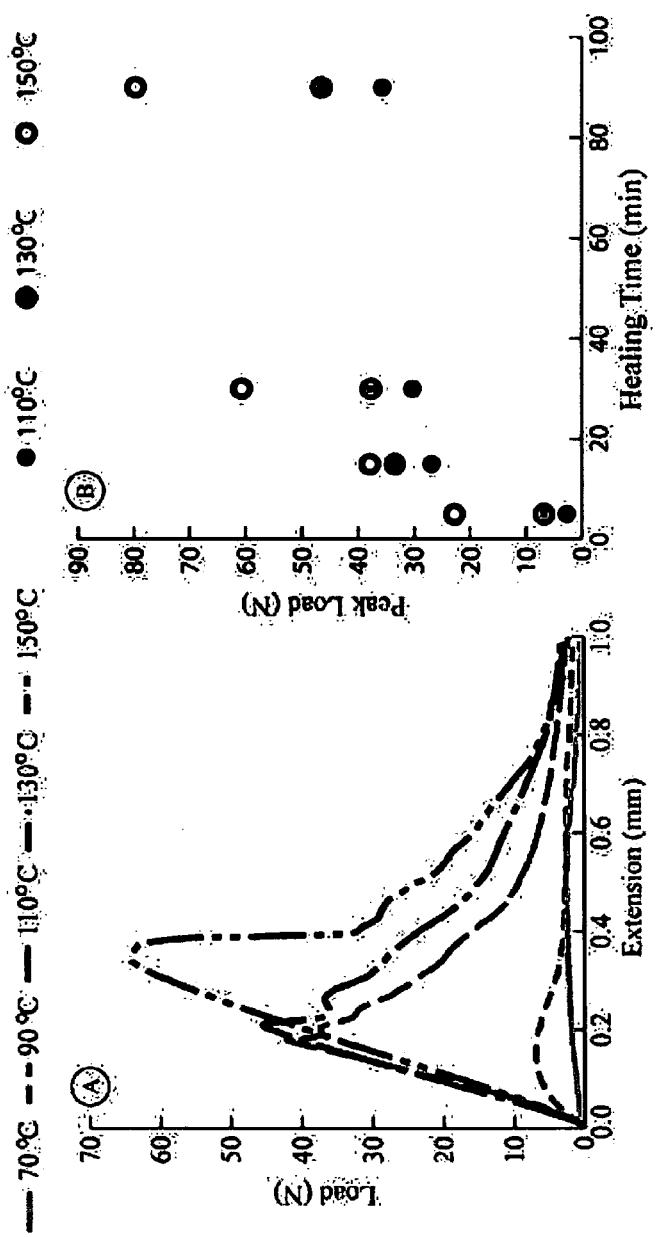
FIG. 19 shows SENB testing results of resins containing 15 vol % of 250-450 μm EMAA particles showing A) load extension plots and B) peak load with respect to healing time ranges of resins healed at different temperatures.
Figure 20:
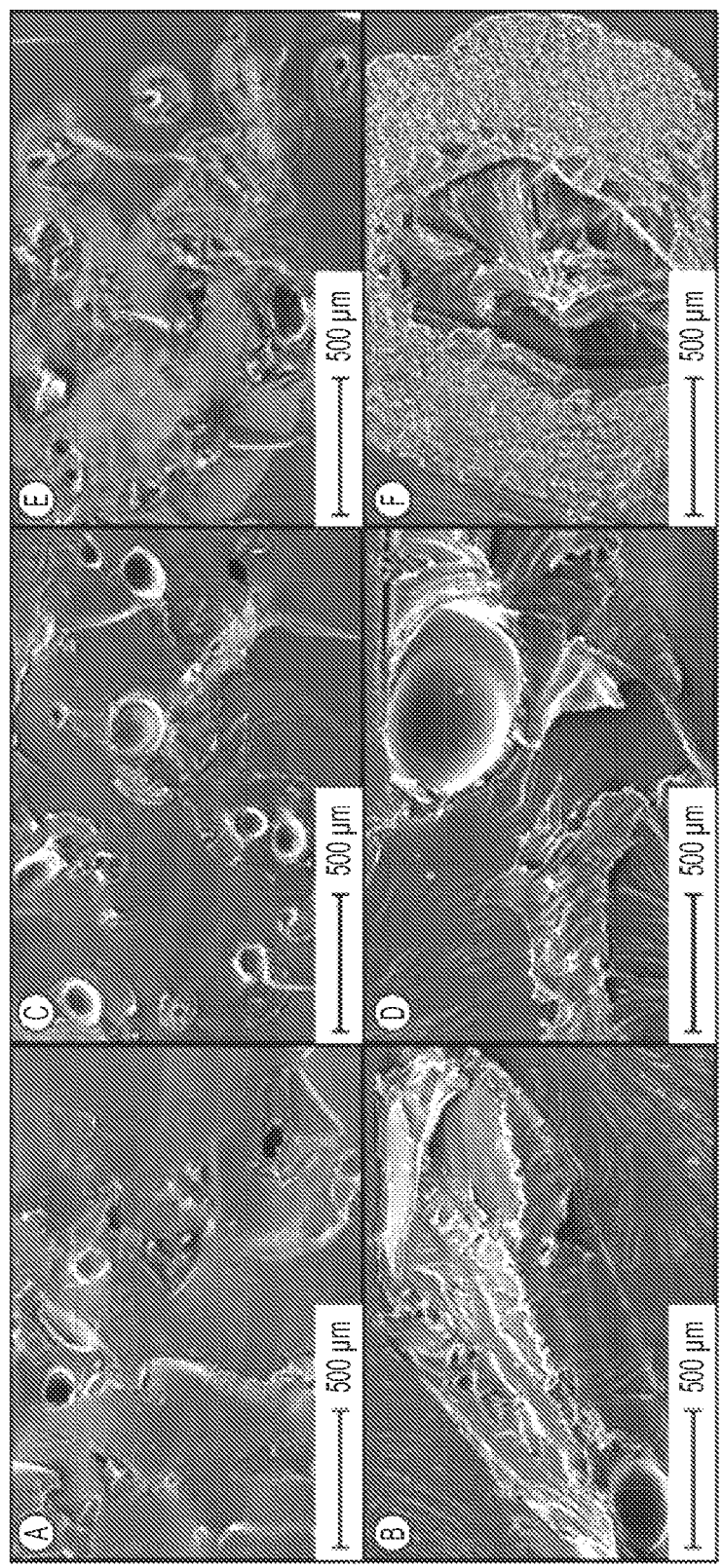
FIG. 20 shows SEM images of fracture surfaces from healed resins containing 15 vol % of 250-450 μm EMAA particles after healed for 120 min at A-B) 90° C., C-D)110° C. and E-F) 150° C.

Varying the healing temperature revealed that increases from 70° C. to 150° C. resulted in an increase in P of the healed resin (FIG. 19A). At temperatures less than 110° C. there was limited or no strength recovery observed, making 110° C. the critical healing temperature for this mendable resin. The limited P recovery at temperatures below 110° C. can be attributed to the absence of an adhesive layers joining the adjacent resin fracture surfaces. FIG. 20A-B reveals that there is no adhesive layer on the surface of the fractured resin after healing for 120 min at 90° C. In contrast to this, an adhesive layer that has peeled off the fractured resin can be seen surrounding the EMAA particles of a mendable resin healed at 110° C. (FIG. 20C-D). The absence of this adhesive layer in resins healed at 90° C. means that rebinding of the fracture surfaces was limited to EMAA particle healing, resulting in smaller levels of strength recovery due to the smaller area of the fracture surfaces being rejoined (only 15% of the surface can rejoin from particle healing based upon the volume fraction of the EMAA in the resin). Reasons why the adhesive layer does not form at the lower temperatures may be due to the high viscosity of the EMAA at these temperatures or insufficient pressure buildup in the bubbles that usually promotes adhesive layer formation. Even though the reason why the adhesive layer did not form below 110° C. is still under investigation, the critical temperature needed for significant P recovery (110° C.) has been identified.

In contrast to the low level of healing at 90° C. and below, η of more than 100% was achieved at by healing 110° C., 130° C. and 150° C. for 120 min, The virgin resin containing 15 vol % of 250-450 µm EMAA particles had a P of 43±1 N and resins healed at 110° C., 130° C. and 150° C. had a P of 45±1 N, 43±3 N and 67±1 N respectively. The improvement in strength recovery achieved as the temperature increases can be attributed to a drop in EMAA viscosity that promotes flow of the thermoplastic over the epoxy resin fracture surface during healing. SEM images of fracture surfaces of resins healed at 110° C. (FIG. 20C) and 150° C. (FIG. 20E) reveal an increase in the area of the fracture surface covered by the adhesive layer when the healing temperature was increased. This increase in area of the resin covered by the adhesive layer resulted in an increase in the area of the fracture surfaces that rebound during healing, which in turn increased the strength of the healed material. In addition to changes in the area covered by the adhesive layer, there was evidence of an increase in the bond strength between the adhesive layer and the resin as the healing temperature was increased. Evidence of a stronger interfacial bond between the EMAA and resin in the specimens healed at 150° C. comes from the rough texture of the thermoplastic layer on top of the smooth resin (FIG. 20F). This rough layer indicates the occurrence of a cohesive failure within the EMAA rather than an adhesive failure at the EMAA-resin interface. From the trends established above it can be concluded that even though 100% P recovery can be achieved by healing for 120 min at 110 and 130° C., using higher healing temperatures (150° C.) can result in a further improvement in η.

Fracture testing of the resins healed at temperatures between 110° C.-150° C. and for 5 to 90 min revealed that increasing the healing time resulted in an asymptotic increase P of the healed resins (FIG. 19B). After 30 min healing at the chosen healing temperature, the initially sharp increase in P with respect to healing time declines such that there is a much smaller increase in P between 30 min and 90 min than was observed between 5 min and 30 min. Even though this trend was observed at all three of the healing temperatures tested, as the healing temperature was increased, the time taken to achieve P equivalent to the virgin unmodified resin (34 N) was reduced. Using P of the virgin unmodified resin as the criteria for evaluating the critical healing time, it took 15 min, 30 min and 90 min to reach achieve P>34 N at 150, 130 and 110° C. respectively.

The observed decrease in critical healing time (and increase in maximum P achieved after 90 min healing) as healing temperature increased can be attributed to increases in EMAA flowability and EMAA-resin bonding as described above.

Figure 21:
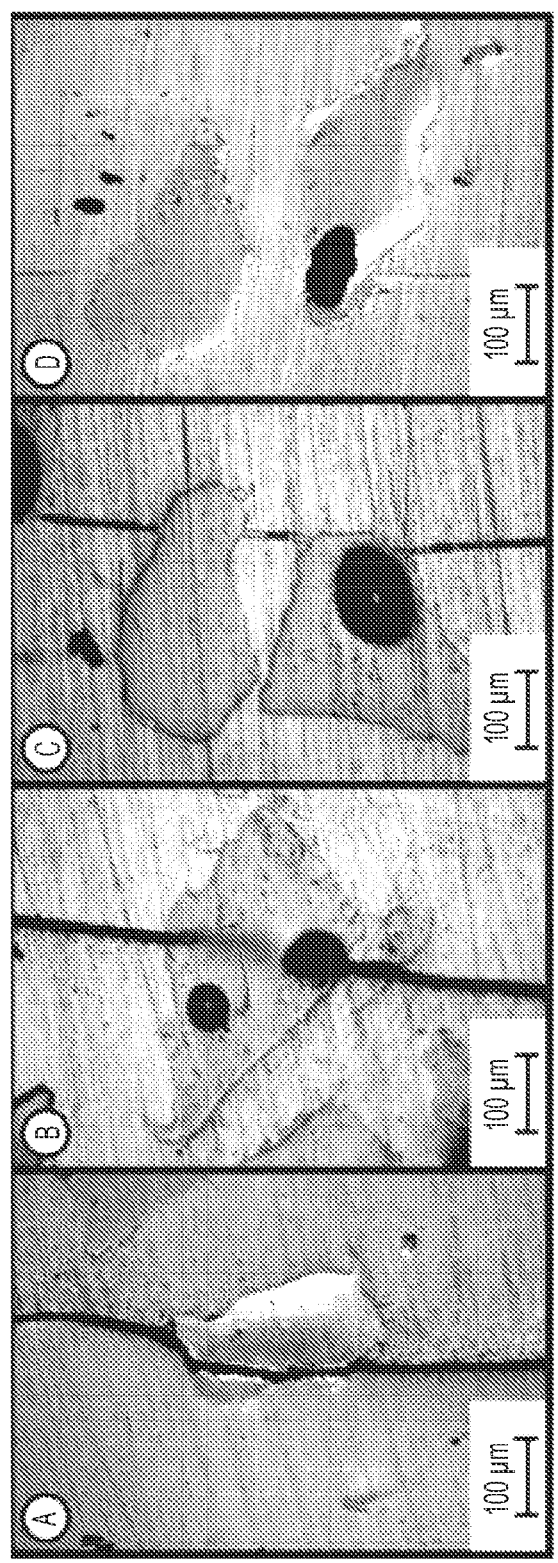
FIG. 21: optical microscopy images of polished cross-sections perpendicular to the fracture surfaces of resins containing 15 vol % of 250-450 μm EMAA particles after healing at 150° C. for A) 0 min, B) 5 min, C) 15 min and D) 30 min.

In addition to identifying the critical healing times at a range of healing temperatures, imaging of SENB healed at 150° C. as the healing time increased provided further insight into the healing mechanism. A series of optical microscopy images in FIG. 21 shows the progression of healing as the healing time increases. FIG. 21A shows that crack growth in the damaged resin propagates through the EMAA particles leaving EMAA on opposing sides of the fracture plane. As the healing time increases, the EMAA particle heals across the fracture plane (FIG. 21B) and forms an adhesive layer over the resin surrounding the EMAA particles which rebinds a portion the fractured resin (FIGS. 21 C & D).

The progression of healing captured in FIG. 21 closely matches the proposed mechanism depicted in FIG. 18, providing further evidence that this mechanism accurately describes the healing process taking place during healing of these mendable resins.

Conclusions

The effects of EMAA particle size, EMAA content, healing temperature and healing time have been investigated in order to determine critical healing conditions in the epoxy resin investigated in this work. A factorial experimental design analysing the effect of EMAA particle size and content revealed healing at 150° C. for 30 min resulted in 89% or greater recovery in peak load (P) over three healing cycles when EMAA contents of 12-18 vol % and particle size ranges covering 50-450 µm were used. The resins containing the larger particles and higher EMAA contents led to higher P. Varying the healing conditions of the mendable resins with a 15 vol % of 250-450 EMAA particles revealed that temperatus of 110° C. were required in order to achieve significant P recoveries. Using healing temperatures of 110° C., 130° C. and 150° C. resulted in approximately 100% recovery of the unmodified resins P after 90 min, 30 min and 15 min respectively. Identification of these critical healing conditions in the mendable resins containing EMAA particles has provided further insight into the healing mechanism and helps establish this technology as a viable alternative to existing mendable polymer technologies.

EXAMPLE 4

Confirmation of the Healing Mechanism in a Mendable EMAA-Epoxy Resin

The following results and discussion are provided to support the previously proposed healing mechanism shown in FIGS. 10 and 18. Confirmation of the mendable polymer morphology was obtained via SEM and X-ray tomography (Xum) and healed single edge notched bending bars (SENB).

Figure 22:
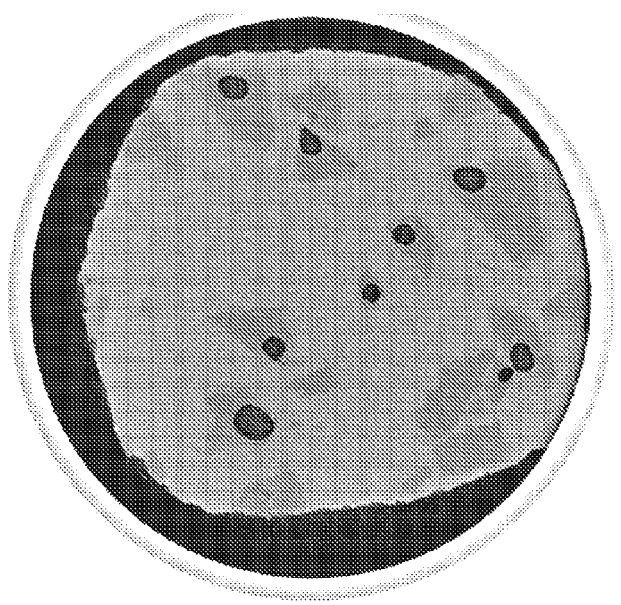
FIG. 22 shows a low magnification Xum image of a cylindrical section of a healed SENB showing the resin (lightest phase), EMAA particles (darker phase) and bubbles inside the EMAA (black regions inside darker phase)

Xum images (FIG. 22) of the mendable resin reveal discrete particles of a lower density than the epoxy rein. The EMAA has a density of 0.94 while the resin has a density of 1.1, which is inline with the Xum results. A secondary observation from the Xum is the appearance of bubbles exclusively in the EMAA particles. This morphology is in agreement with the system morphology proposed previously.

Figure 23:
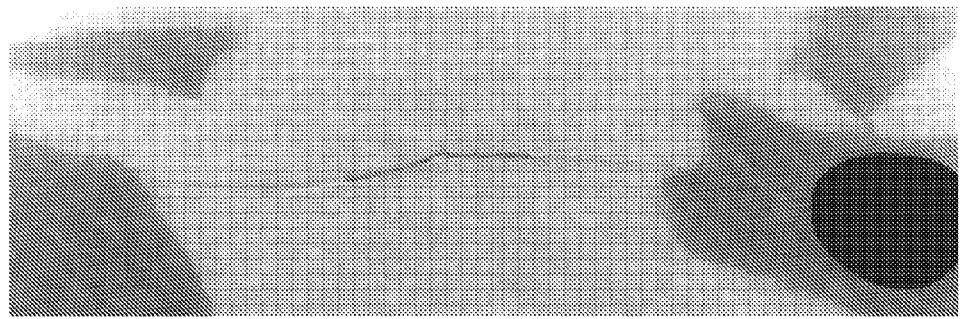
FIG. 23 shows a high magnification Xum image of a healed crack from a cylindrical section of a healed. SENB.

Xum images of the mendable resin also indicated that EMAA was present in the crack between adjacent fracture surfaces after healing. A healed crack passing through two EMAA particles is visible in the resin (horizontal line in the middle of FIG. 23). However the colouring of the crack changes from the darker phase (near the particles) to a black phase (in the middle of the resin between the two particles). The presence of the darker phase suggests that EMAA has flowed into the crack during healing and is sandwiched between adjacent epoxy fracture surfaces. The presence of the black phase suggests that there are still some regions of the crack that have not been rejoined by the EMAA.

Figure 24:
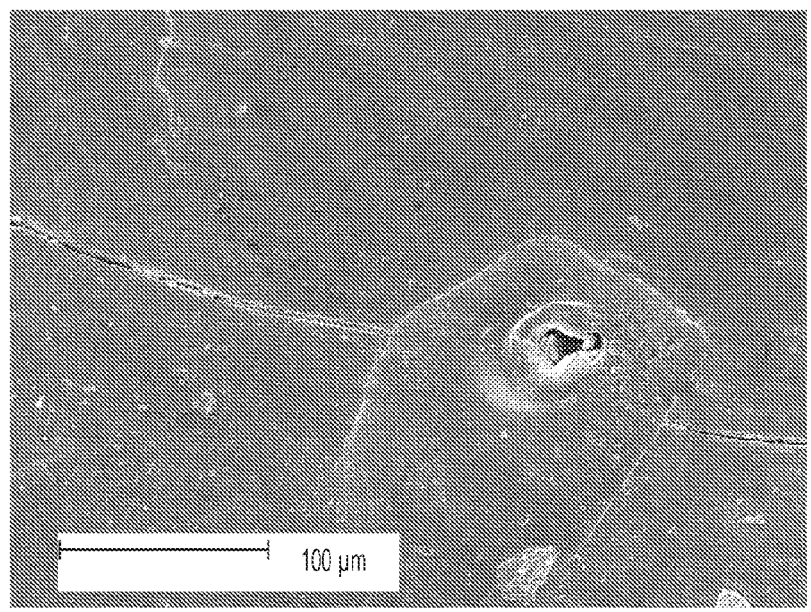
FIG. 24 shows low magnification SEM image of the polished cross-section of a healed SENB with the crack perpendicular to the sample surface.
Figure 25:
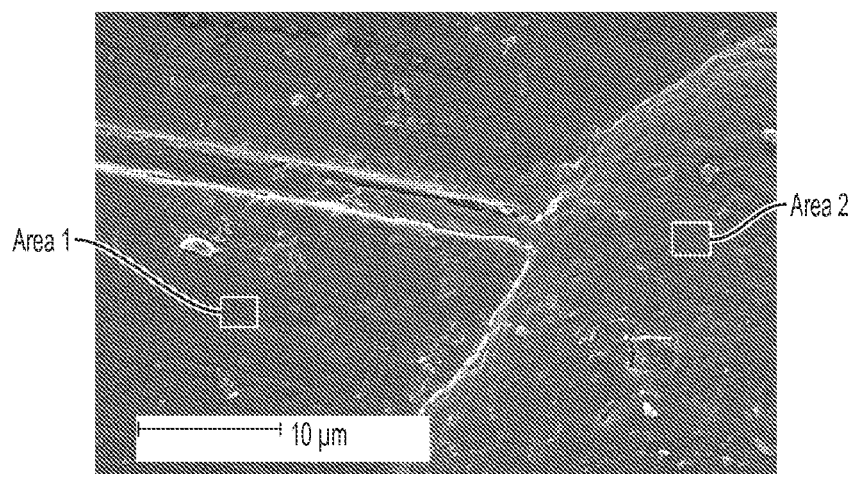
FIG. 25 shows high magnification SEM image of the polished cross-section of a healed SENB with the crack perpendicular to the sample surface showing the areas scanned with EDS.
Figure 26:
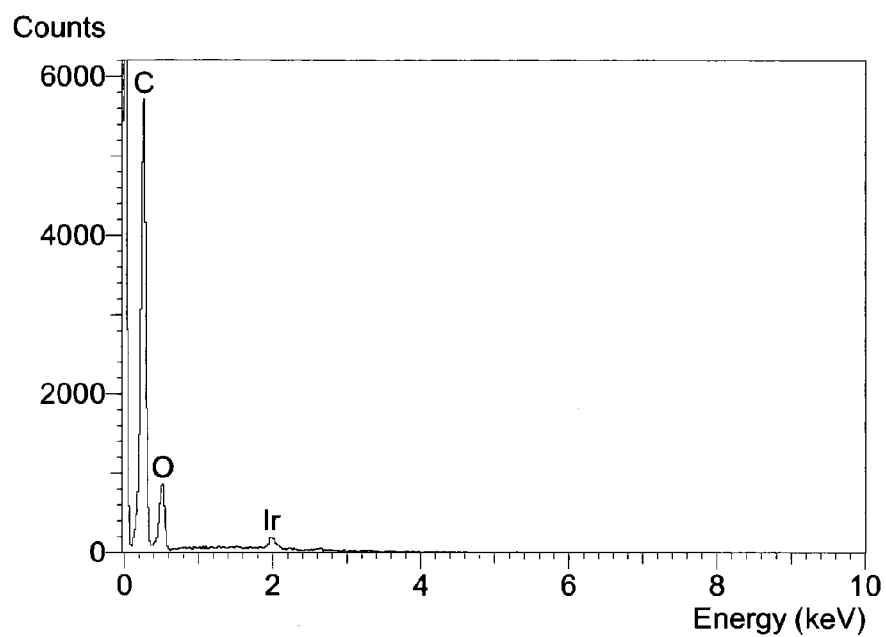
FIG. 26 shows EDS scan result from Area 1 showing only carbon, oxygen and the iridium coating peaks.
Figure 27:
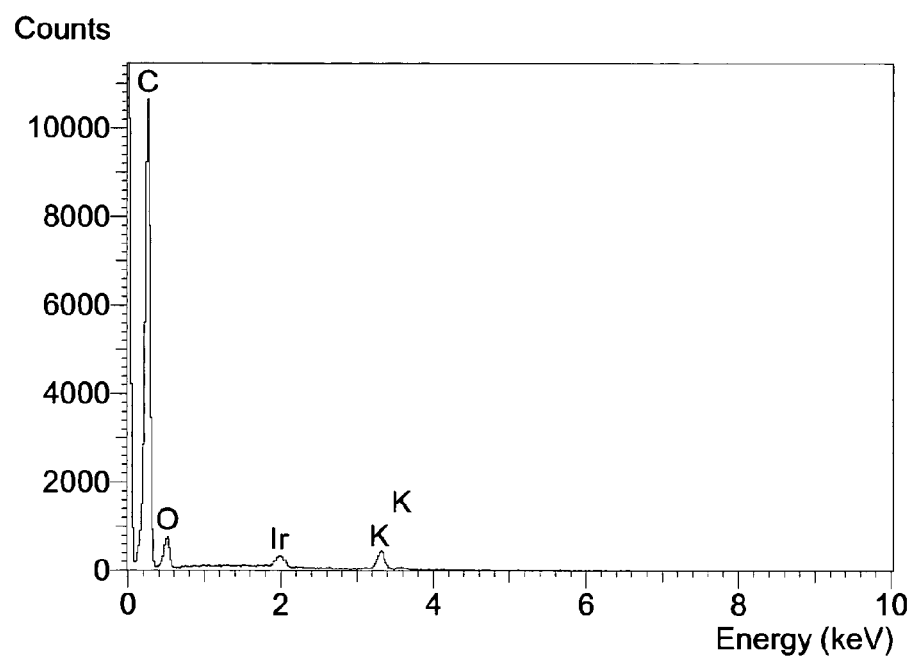
FIG. 27 shows EDS scan result from Area 2 showing the carbon, oxygen, iridium coating and potassium peaks.
Figure 28:
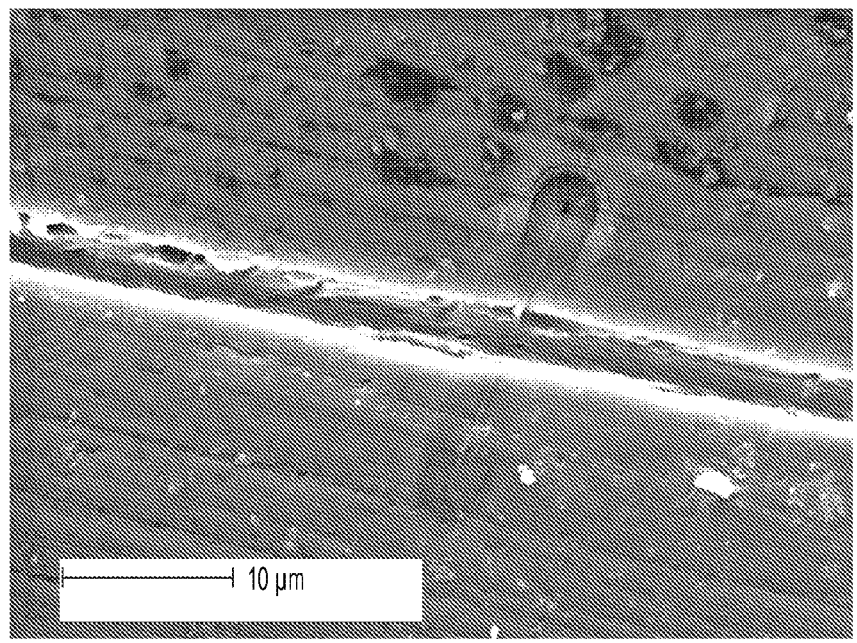
FIG. 28 shows high magnification SEM image of the polished cross-section of a healed SENB with the crack perpendicular to the sample surface showing the area analysed by the line scan (scar on the surface shows area scanned)
Figure 29:
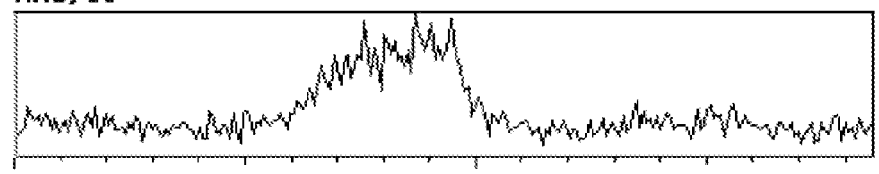
FIG. 29 shows EDS line scan result for potassium showing that potassium is found exclusively in the crack.

Further evidence of the mendable polymer morphology was obtained through SEM images collected in parallel with energy dispersive X-ray spectroscopy (EDS) (FIGS. 24-29). A healed SENB was cross-sectioned and polished such that the healed crack was perpendicular to the samples face (FIG. 24). After polishing, the sample was soaked in potassium hydroxide over night such that the potassium ions would form a salt with the acid group in the EMAA. This salt formation was done to enable EDS detection of the EMAA phase, where potassium will be present. Imaging of the cross-section revealed discrete particles that had circular voids (formally bubbles) inside. Two areas of a higher magnification image of the particle-rein interface near the crack (FIG. 25) was scanned with EDS to reveal potassium was present inside the particle (FIG. 27) but not in the bulk phase (FIG. 26). This confirmed that EMAA was present as a discrete particle phase in the mendable resin. Further to confirm that the EMAA remained as a discrete phase, the high magnification SEM image revealed that some of the EMAA had flowed into the crack plane during healing. An EDS line scan across a rejoined section of the crack revealed that potassium was present inside the crack but not on either of the adjacent sides of the crack (FIGS. 28 & 29). This shows that EMAA has flowed into the crack during healing and has rejoined the adjacent resin fracture surfaces in the resin. Hence both Xum and SEM confirm the proposed healing mechanism takes place in the mendable resins contain EMAA.

Support for Proposed Chemistry of Healing

Confirmation that the EMAA does maintain its acid functionality was obtained via near infrared (NIR) and nuclear magnetic resonance (NMR) spectroscopy.

Figure 30:
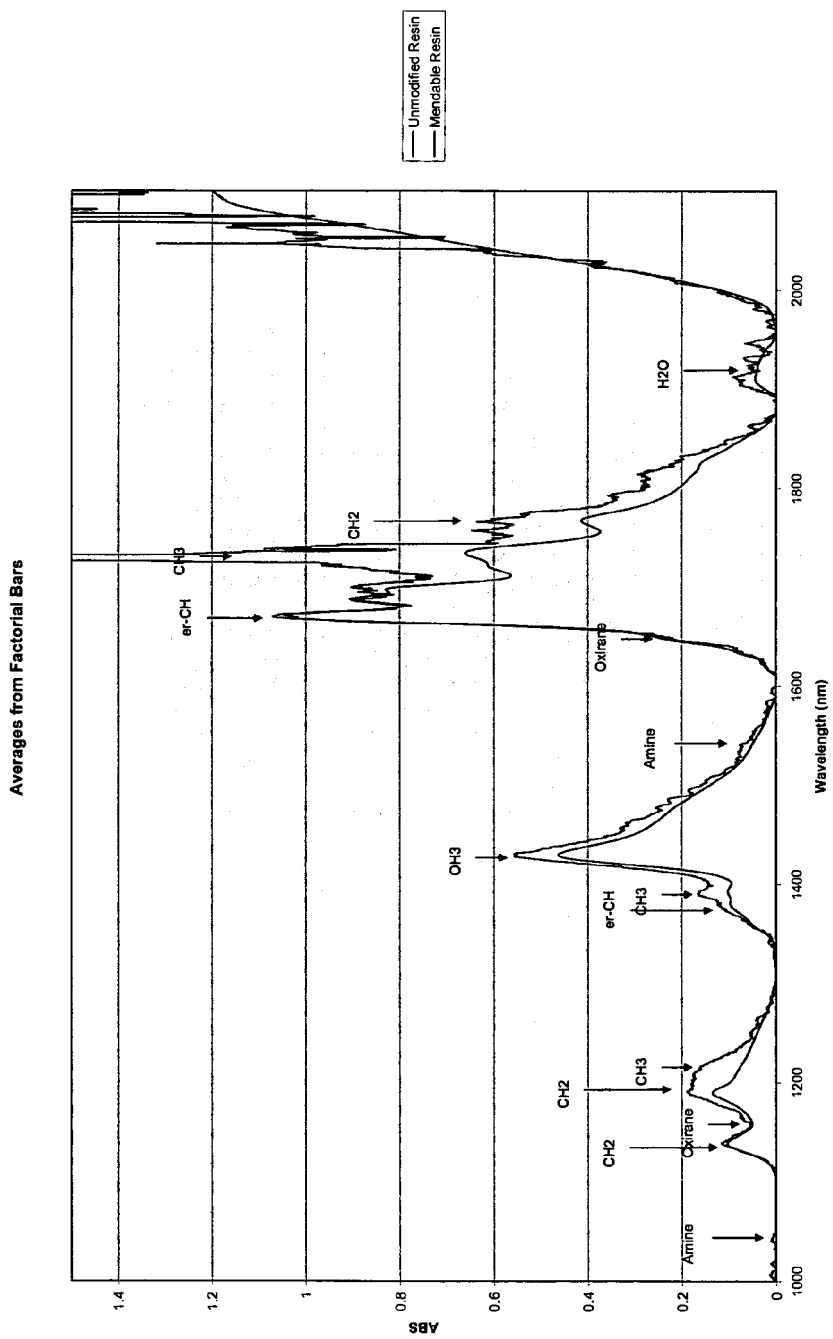
FIG. 30 shows an NIR spectra of unmodified resin and mendable resin according to an embodiment of the invention.

Transmission NIR spectroscopy of the unmodified resin, EMAA and mendable resin revealed a combination were collected (FIG. 30). The mendable polymer possessed increased ch2 and ch3 peaks reflecting incorporation of the ethylene backbone and methyl side group of the EMAA. The mendable resin also possessed oxirane and amine peak intensities that were higher than the unmodified resin. The change in intensity is relatively small however this indicates that the addition of particles has lowered the extent of conversion in the resin (as commonly reflected in literature). Despite showing that there was only a small change in the resin functionality, NIR did not show that the functionality of the EMAA was maintained.

Figure 31:
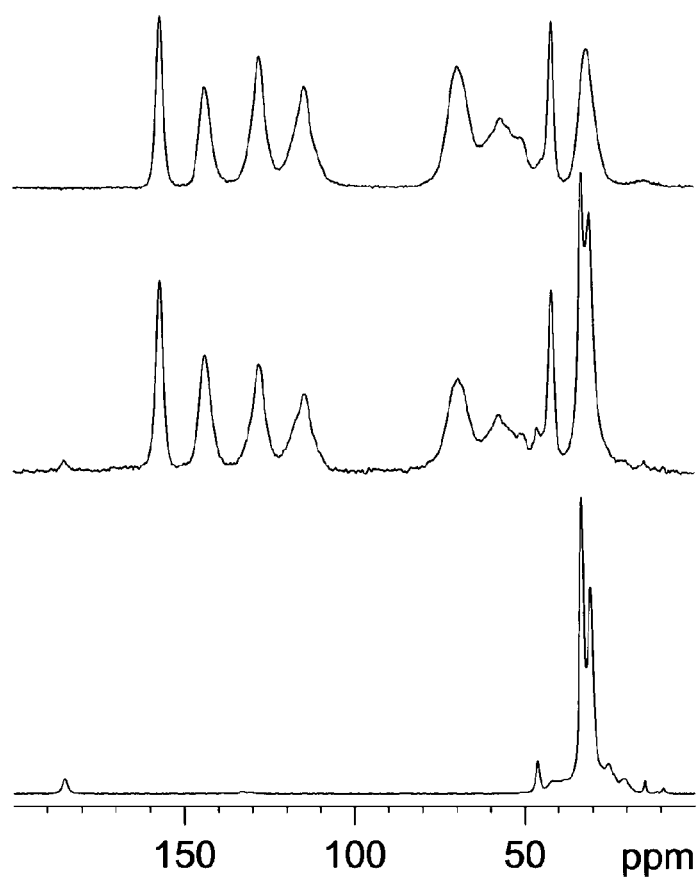
FIG. 31 shows an NMR spectra of unmodified resin (top), mendable resin (middle) and EMAA (bottom)

NMR of the EMAA, unmodified resin and mendable resin were collected (FIG. 31). The spectra of the mendable polymer appears as the sum of the EMAA and resin components, indicating that both components remain largely unchanged. The peak near 180 in the mendable resin indicates that the acid functionality of the EMAA remains largely unreacted during curing of the mendable resin. This would be expected if the EMAA remained as a discrete phase during curing. Spectroscopy has therefore revealed that the mendable resin possesses the functionality needed for the proposed healing mechanism to take place.

Figure 32:
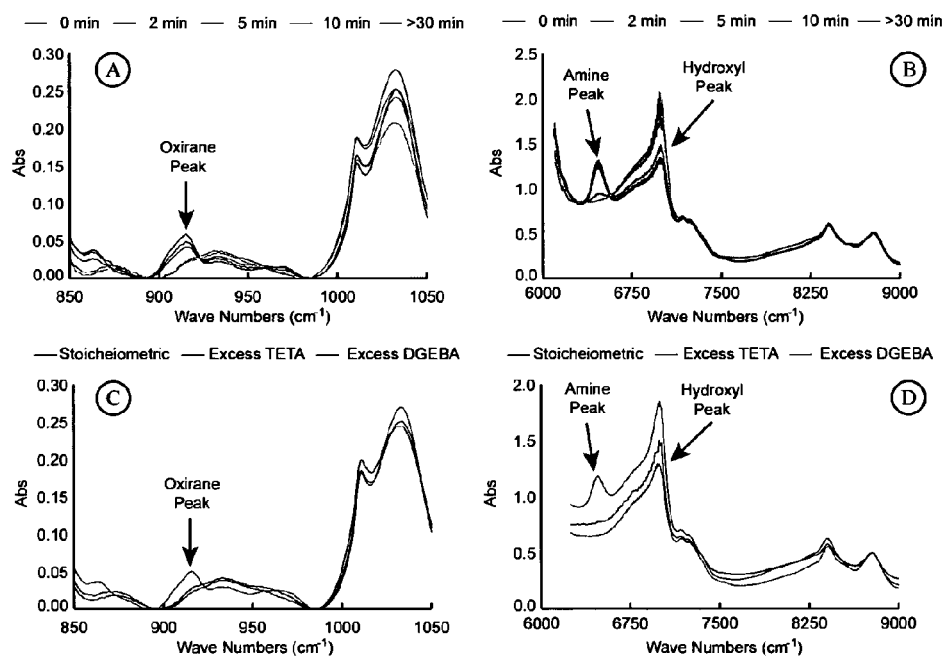
FIG. 32 shows IR spectra of butt joint test pieces with A, B) varied post cure times at 150° C. cast a stoichiometric ratios and C, D) varied stoichiometric ratios and post cured for 30 min at 150° C.

Binding interactions between the EMAA and cured epoxy resin were assessed using butt joints possessing a range of functional group concentrations. Butt joints were selected for use over other adhesion testing methods because the high testing speeds used in butt joint testing promote adhesive failure rather than cohesive failure. By promoting adhesive failure in the joint, the peak load sustainable in butt joints best reflects the strength of the EMAA-epoxy interface such that varying the oxirane, amine and hydroxyl group concentrations in butt joint test pieces can be used to identify chemical bonds/interactions that result in binding between the EMAA and resin during healing. This study utilised the effect of cure time and DGEBA:TETA ratio on functional group concentration in epoxy resins to vary the oxirane, amine and hydroxyl group concentrations in butt joint test pieces. Peak intensities from infrared spectroscopy (IR) scans were used to monitor the effect of cure time and DGEBA:TETA ratio on oxirane (915 cm$^{-1}$ peak), amine (6500-6650 cm$^{-1}$ peak$^{53}$) and hydroxyl (7000 cm$^{-1}$ peak) group concentrations in the resin (FIG. 32). Binding interactions between EMAA and the cured resin were then identified from trends in butt joint strength with respect to the changes in functional group concentration.

Figure 33:
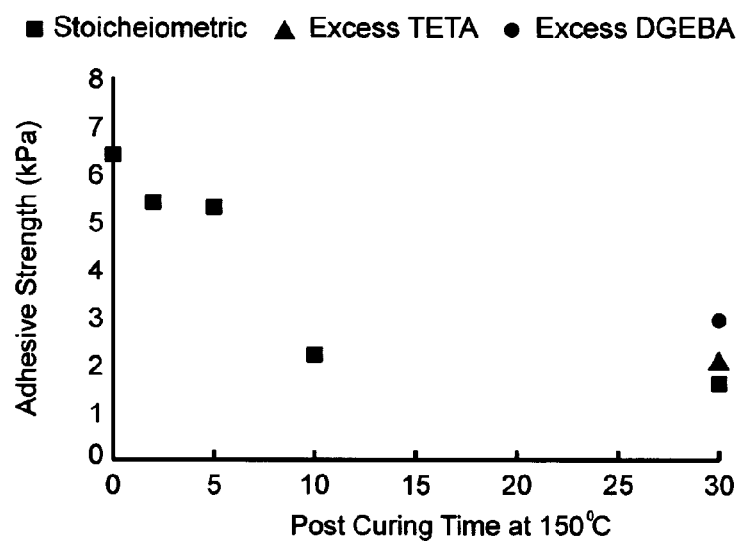
FIG. 33 shows an adhesive strength of epoxy resin butt joints joined with EMAA film with respect to curing time at 150° C. and ratio of DGEBA:TETA.

Changes in the adhesive strength of EMAA-epoxy joints with different curing times indicated (FIG. 33) that acid-oxirane and/or acid-amine reactions (Equations 1, 3, 4) provide more strength to the EMAA-epoxy binding mechanism than the other chemical reactions/interactions (Equations 2, 5-7). Increasing cure time from 0-5 min had resulted in a small decrease in adhesive strength (from 6.4 kPa to 5.3 kPa, FIG. 33). In contrast to this, joints of resins with post cure times of ≥10 min possessed significantly smaller adhesive strengths (1.6-2.2 kPa). These changes in adhesive strength with respect to post cure time show that a significant drop in adhesive strength occurs when as the oxirane and primary/secondary amine concentration decreases and the hydroxyl group concentration increases. The trend of decreasing peak load with decreasing oxirane/amine concentration indicates that the acid-amine and acid-oxirane reactions made a significant contribution to bond strength between EMAA and the epoxy resin produced when shorter post cure times are used. Further to this, it can be said that acid-hydroxyl reactions do not contribute significantly to interfacial adhesion with respect to the contribution from acid-amine and acid-oxirane reactions. Despite the established link between unreacted oxirane and amine groups and an increase in interfacial adhesion, the 1.6 kPa strength in butt joints made using over 30 min post curing at 150° C. indicates that significant binding between the EMAA and cured resins still takes place when there are negligible levels of unreacted oxirane and amine groups. This means that binding mechanisms independent of unreacted oxirane and amine groups also contribute to binding between the EMAA and cured resin.

Figure 34:
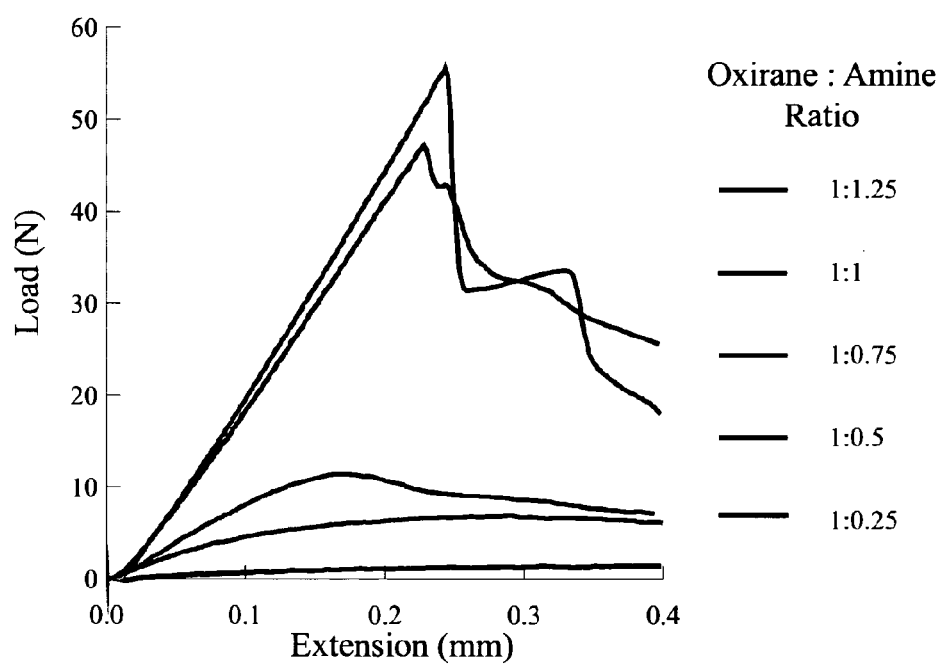
FIG. 34 shows load extension plots of healed mendable resins made with different oxirane:amine ratios.

Testing of butt joint made from non-stoichiometric DGEBA:TETA ratios revealed (FIGS. 33 and 34) that hydrogen bonding is likely to dominate binding between the EMAA and epoxy in the healed resins. Joints made form resins containing an excess of DGEBA had a higher adhesive strength (2.9±0.8 kPa) than resins made with an excess of TETA (2.1±0.4 kPa) and with a stoichiometric ratio (1.6±0.3 kPa). The increase in adhesive strength in joints made with an excess of DGEBA or TETA compared to joints made using stoichiometric ratios showed that promoting either acid-oxirane or acid-amine bonding can result in a measurable increase in the EMAA-epoxy interface strength. Although these results show that increasing oxirane/amine group concentrations can improve interfacial adhesion, they also indicate that significant joint strength is still obtained in resins with negligible oxirane and/or amine concentrations (seen in resins made with an excess of TETA and DGEBA respectively). This result is in good agreement with the trend showing that neither acid-amine nor acid-oxirane bonding is critical to interfacial strength development as was established by testing butt joint made using more than 30 min post curing times.

Adhesive strength development in the absence of oxirane and primary/secondary amine groups can be attributed to the formation of hydrogen bonds (Equations 5-7) between acid groups in the EMAA and hydroxyl, tertiary amine and ether groups contained within the epoxy resin's polymer network. Even though hydrogen bonds are weaker than covalent and ionic bonds, hydrogen bonds have been shown to provide significant strength to a range of polymer systems and interfaces. It is therefore not surprising that there is significant strength at the EMAA-resin interface even when there are only low level of functional groups that can form covalent/ionic bonds across the interface. Given that the self-healing epoxy is made using stoichiometric reagent ratios and is post cured at 150° C. for 30 min (resulting in an epoxy containing low concentrations of oxirane and primary/secondary amine groups) hydrogen bonding is likely to be the dominant bonding mechanism during healing in the EMAA-epoxy system. Despite identifying that hydrogen bonding dominates the existing self-healing system, the discovery that resins containing unreacted amine and/or oxirane functional groups have significantly higher adhesive strengths can be used to improve the healing efficiency of thermoplastic additive based self healing systems in the future.

Figure 35:
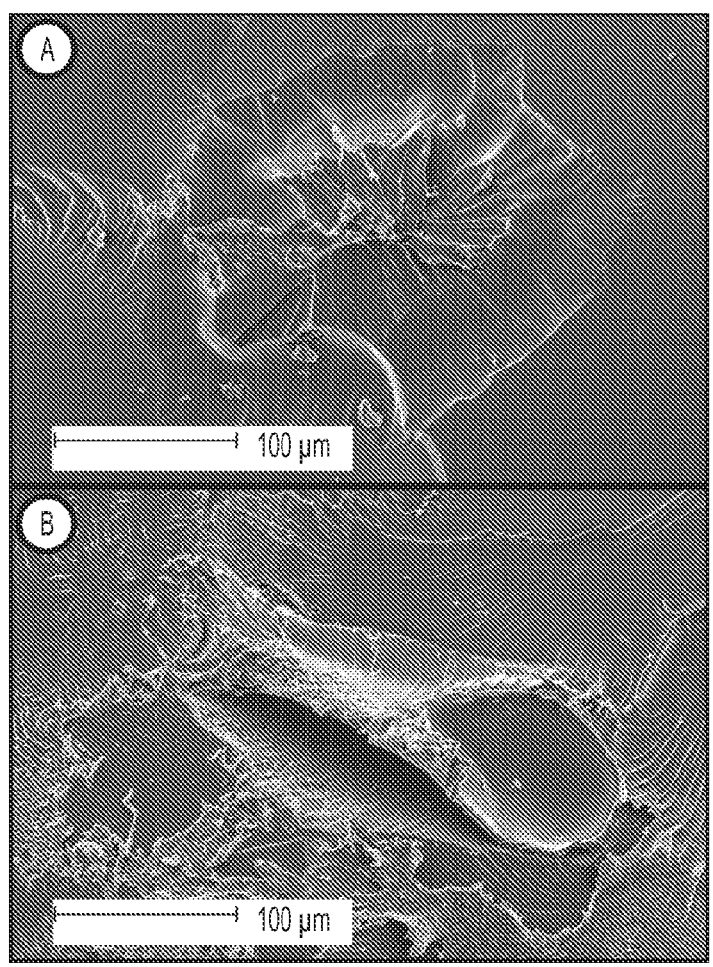
FIG. 35 shows SEM image of healed SENB fracture surfaces of mendable resins with A) excess oxirane and B) stoichiometric oxirane:amine ratio.

Varying the functionality of the resin in mendable SENB was also used to provide insight to the healing mechanism. Increasing the epoxy content, increases the residual oxirane groups and decreases the amine groups available. This resulted in a sharp drop in the healing efficiency despite the increased oxirane available for bonding during healing. SEM imaging (FIG. 35) revealed that this does not contradict with the above results where increasing oxirane groups produced better adhesion. SEM imaging revealed that no bubbles formed in the EMAA when an excess of oxirane was used. The absence of bubbles prevented the formation of an adhesive layer, limiting healing to EMAA particle healing. This result reflects the importance of the bubble expansion on delivery of the EMAA healing agent as well as the importance of the formation of an adhesive layer.

EXAMPLE 5

Use of EMAA Healing Agents in Carbon Fibre Laminates

The use of EMAA healing agents in carbon fibre laminates was undertaken.

Sample Preparation

Laminates were produced using; 198 gsm plain weave carbon fibre with a 3 k tow, triethyltetramine cured diglycidyl ether of bisphenol A and the EMAA (Nucrel 2940) healing agent. All laminates were 20 ply 300×170 mm plates made via hand layup and cured as 2000 kPa guage pressure and 70° C. for 60 min prior to post curing at 150° C. for 30 min. EMAA particle-based mendable laminates were made by including 15 vol % EMAA fibre in the epoxy resin. EMAA fibre-based mendable laminates were made by placing 2 or 4 EMAA fibre interleaves made from either 50 μm or 100 μm fibres in the 5 central spacings (on the $8^{th}$, $9^{th}$, $10^{th}$, $11^{th}$ and $12^{th}$ plies) of the laminate. A 50 μm thick Teflon sheet (Dupont) was also placed at the edge of the laminate in the centre spacing (on the $10^{th}$ ply) as a crack starter. The outside 20 mm of each laminate were cut off and discarded prior to test piece preparation.

EMAA particles; EMAA pellets were cryogenically ground, separated into particle size ranges by water flushing through 35 and 60 mesh sieves and then dried under vacuum at 50° C. for 4 days. The mendable resins were produced by heating the DGEBA to 70° C., then mixing in the 15 vol. % EMAA particles prior to mixing in the TETA.

EMAA interleaves; EMAA pellets were extruded in a Haake Minilab extruder at 140° C., 20 Ncm on to a roller spinning at 160 m/min (100 μm diameter fibres) or 400 m/min (50 μm fibres). The fibres were hand woven into a 170×300 mm grid (4 mm spacing between threads) using a wire frame. The junctions were melt sealed by placing the grid in a 150° C. oven between teflon film covered galvanized steel plates (2×170×300 mm) for 7.5 min. Interleaves made from 100 μm and 50 μm diameter fibres were approximately 7 gsm and 3 gsm respectively.

Healing Assessment

The healing potential of EMAA in laminates was tested via mode I interlaminar fracture toughness testing. Double cantilever beam (DCB) test pieces (15×130 mm) were cut from the laminates using a diamond saw. A piano hinge was glued on the end with the starter crack and specimens were damaged by loading under Mode I conditions until a crack length of over 50 mm was obtained in the test piece. After being damaged, small clips were put on each side of the test piece to close the crack and then the pieces were healed at 150° C. for 30 min. Test pieces were allowed to cool for 30 min after healing, then the clips were removed and test pieces were reloaded under mode I conditions until the 50 mm long crack had reopened (or the extension reached 20 mm).

Results

Figure 36:
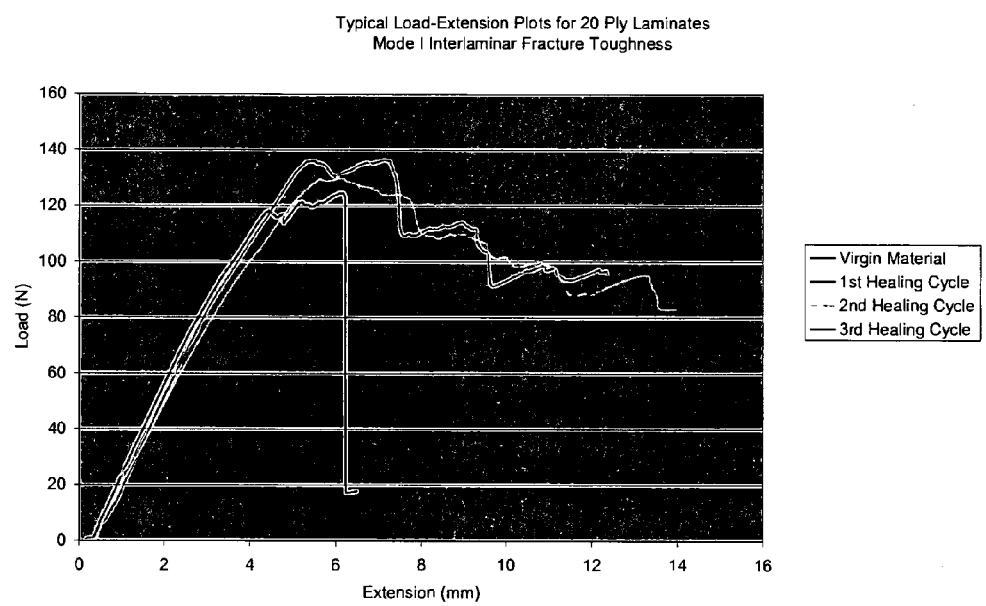
FIG. 36 shows typical load-extension plot of virgin and healed DCB test pieces.
Figure 37:
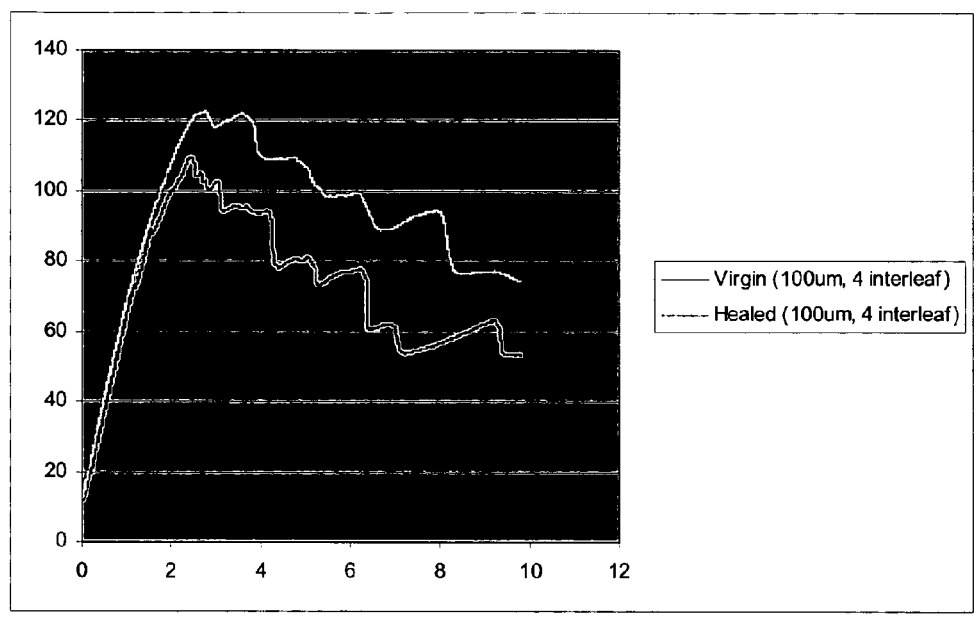
FIG. 37 shows typical load extension plot for a virgin and healed mendable laminate containing four interleaves made with 100 μm thread in the central 5 spacings.
Figure 38:
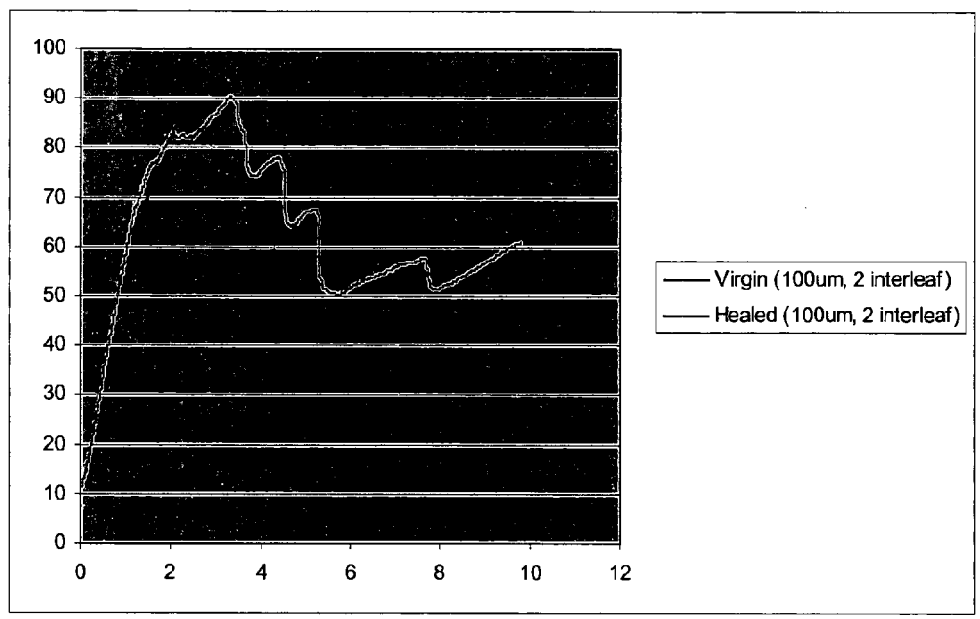
FIG. 38 shows typical load extension plot for a virgin and healed mendable laminate containing two interleaves made with 100 μm thread in the central 5 spacings.
Figure 39:
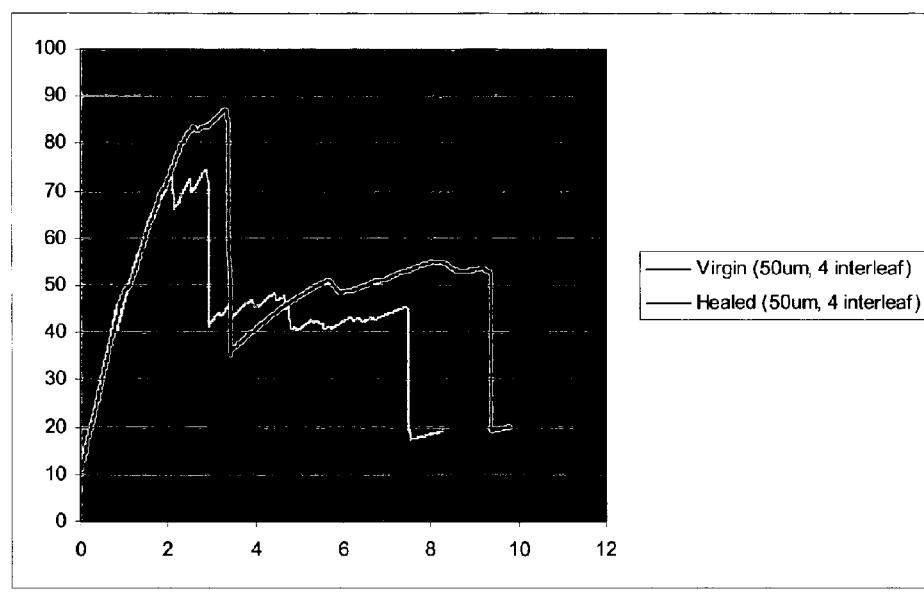
FIG. 39 shows typical load extension plot for a virgin and healed mendable laminate containing four interleaves made with 50 μm thread in the central 5 spacings.
Figure 40:
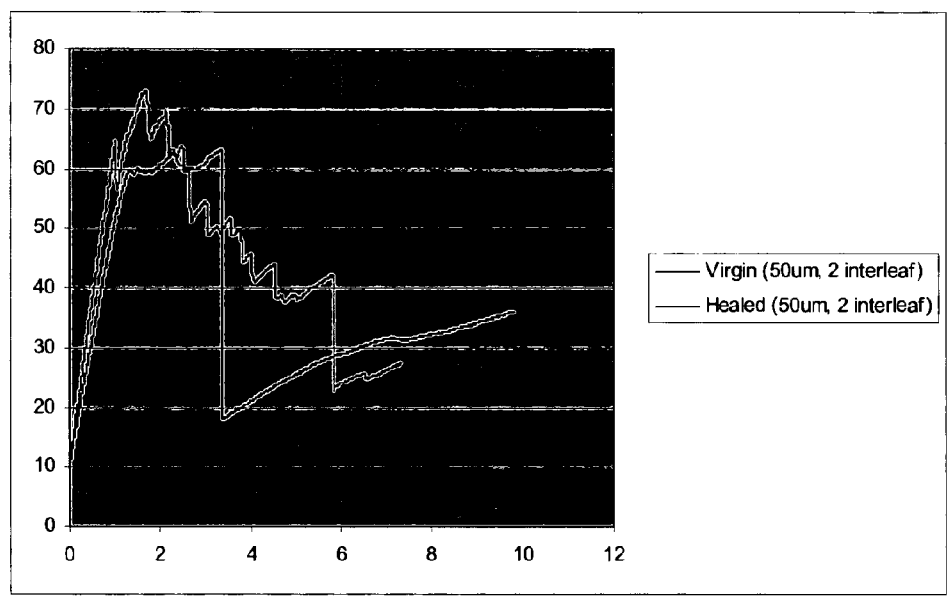
FIG. 40 shows typical load extension plot for a virgin and healed mendable laminate containing two interleaves made with 50 μm thread in the central 5 spacings.
Figure 41:
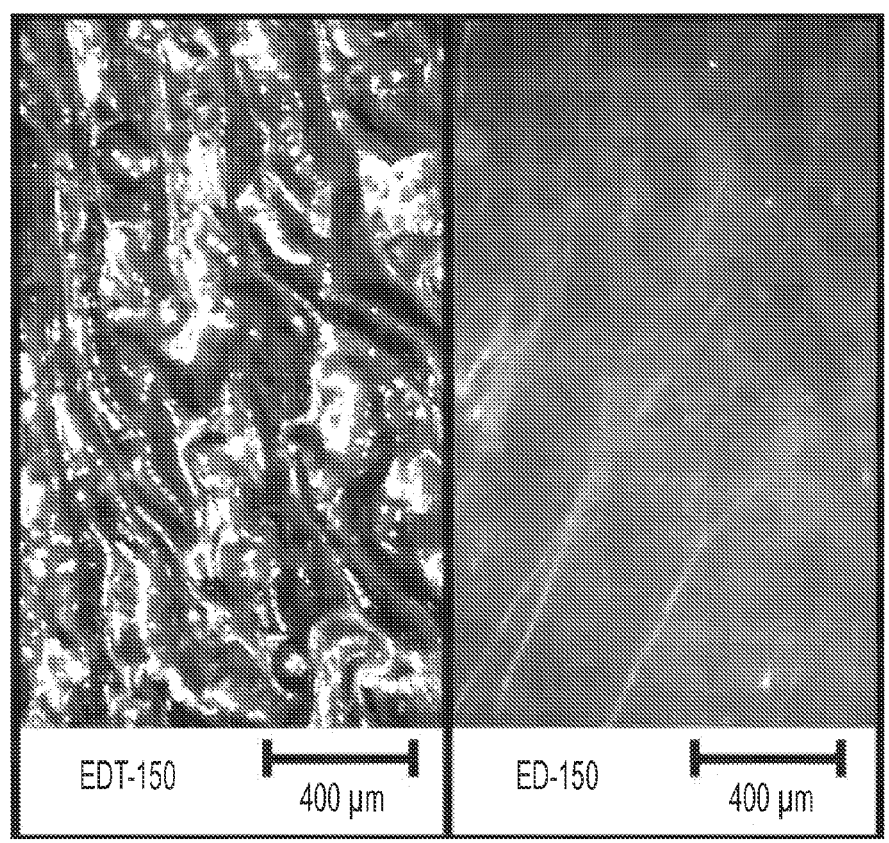
FIG. 41 shows a microscopy image according to an embodiment of the invention.

Initially the healing capability of EMAA in the laminates was assessed (FIG. 36).

Laminates containing EMAA particles showed significant strength recovery Mode I strength after healing. Peak load recoveries in the test pieces ranged from 121% to 98% as the number of healing cycles was increased from 1 to 10. The 120% recovery in peak load equates to an approximately 135% recovery in fracture toughness ($G_{IC}$). The drop in healing performance as the number of healing cycles was increased has been attributed to failure of the crack to close completely. Reloading healed specimens appears to promote carbon fibre bridging and this results in carbon fibre-base obstruction to crack closure during healing. Stiffness recoveries in the test pieces ranged from 93% to 73% over 10 healing cycles.

All laminates containing EMAA fibres showed significant strength recovery after healing. Peak load recoveries in the test pieces ranged from 119% to 85% as the EMAA content was decreased from 4×100 μm EMAA interleafs to 2×50 μm EMAA interleafs. Stiffness recoveries in the test pieces were similar to that seen in the peak load. An example load-extension plot of a virgin and healed test piece for each of the mendable laminates is shown in FIGS. 37-40.

Incorporating EMAA either as a particle or a fibre resulted in an increase in thickness of the laminates. Using the average thickness of unmodified laminates and particle-filled laminate and projected thicknesses of the fibre-filled laminates indicates that the particle-based and majority of the fibre-based (all except two interleaves of 50 μm fibre) result in a 55-60% increase in laminate thickness. In contrast to this, the mendable laminate containing the least EMAA (two interleaves of 50 μm fibre) results in a 20% increase in laminates thickness. The similarity in laminate thicknesses and strength recoveries between the particle- and fibre-filled systems is surprising since the content of EMAA in each ply of the laminate ranges from 33 gsm in the particle-based system and down to 12 gsm in the mendable resin containing four interleaves of 50 μm fibre. In contrast to the particle based system, using fibres is more amenable to scaling and the current industry production processes.

EXAMPLE 6

Carbon Fibre Laminates

The use of EMAA healing agents in carbon fibre laminates was studied in further detail.
EMAA Fiber and Particle Production EMAA fibers were drawn from a Haake Minilab extruder set at 20N cm and 140° C. with winding speeds of 160 and 400 m min$^{-1}$ for the 50-75 and 100-150 μm diameter fibers, respectively. EMAA pellets (Nucrel 2940, DuPont) were cryogenically ground, flushed through 35 and 60 mesh sieves, and then dried under vacuum at 50° C. for 4 days.
Laminate Production Laminates (20 ply) were produced via hand layup using weave carbon fiber and diglycidyl ether of bisphenol A (DGEBA) (DER 331 from Dow Plastics, Australia) mixed with triethyltetramine (TETA) (DEH24 from Dow Plastics, Australia) at stoichiometric ratio (100:13 w/w epoxy to amine). Carbon-fiber-reinforced polymer (CFRP) test samples were produced using EMAA healing agent in the form of particles (CFRP$_p$) and in the form of fibers (CFRP$_f$). CFRP$_p$ were produced by adding 15 vol.-% EMAA particles to the epoxy resins prior to hand layup. CFRP$_f$ were produced by placing EMAA meshes (4×4 mm$^2$ square grid) as interleaves between the central 6 plies using the arrangements described above. A 12.5 μm Teflon interleaf was placed between the central 2 plies as a crack starter. During curing laminates were placed under a vacuum for 15 min, pressed at 2000 kPa at 70° C. for 60 min then postcured at 150° C. for 30 min. EMAA content in CFRP was estimated using the EMAA/carbon fiber ratio added during hand layup and the Ignition Loss of Cured Reinforced Resin test method (ASTM 2584-08).
Healing Assessment Interlaminar fracture toughness testing was carried out in alignment with ASTM 5528-01 at 5 mm min$^{-1}$ on 15 mm wide and 130 mm long double cantilever beams (DCB) with piano hinge fittings. Initial crack lengths for CFRP and CFRP$_p$/CFRP$_r$ were set at 10±2 and 20±3 mm, respectively. Initial failure energies were calculated as area under curve plus the area under an extrapolation of the stiffness value recorded at end of the first loading cycle to 20 mm extension (corresponding to the upper extension limit used during healing assessment).

Healing was carried out on CFRP$_p$ and CFRP$_f$ test pieces by clipping samples to bring the adjacent fracture surfaces into contact and then heating in a 150° C. oven for 30 min. The CFRP$_f$ possessed two or four interleaves made from either 50 to 75 or 100 to 150 μm referred to as CFRP$_f$2-50, CFRP$_f$4-50, CFRP$_f$2-100, and CFRP$_f$4-100, respectively. Recoveries in fracture toughness, failure energy, and peak load properties (P$_{Recovery}$) of the CFRP$_p$ and CFRP$_f$ were calculated using the initial property value (P$_{Initial}$) and healed property value (P$_{Healed}$) according to Equation (1) below. Failure energies and peak load were calculated from the area under the load-extension plot and maximum load sustained during testing, respectively. The opening mode I interlaminar fracture toughness (G$_{IC}$) of the laminates were calculated using the beam theory expression in Equation (2) below, where P is the 5% offset load, X is the load deflection point, b is the width of the DCB, and a is the initial crack length as described in ASTMD5528-01. All errors were calculated as the standard deviation from 5 replicates divided by the square root of the number of replicates (2.24).

$$P_{Recovery} = 100 \times \frac{P_{Healed}}{P_{Initial}} \qquad (1)$$

$$G_{IC} = \frac{3P}{2ba} \qquad (2)$$

Scanning Electron Microscopy (SEM) Imaging

Figure 42:
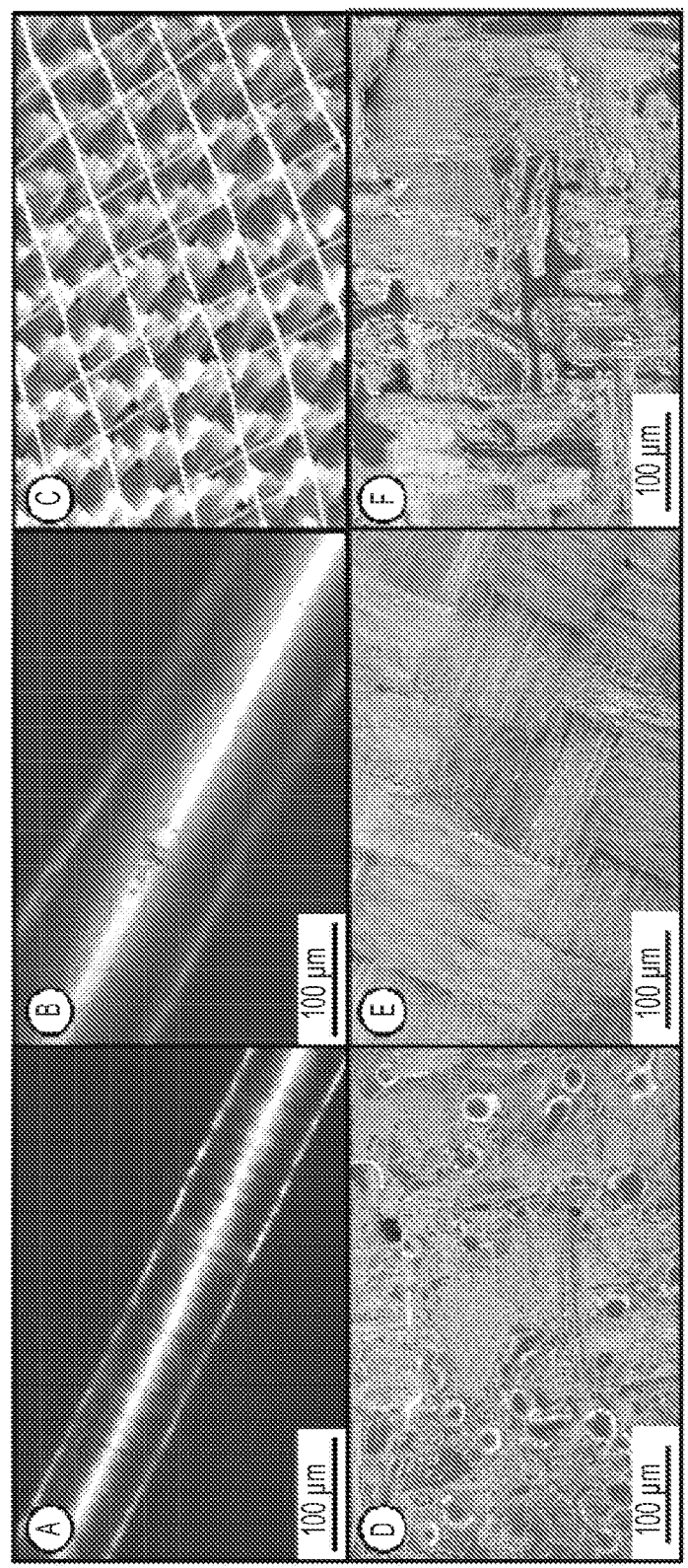
FIG. 42 shows microscopy images comprising (A) 50-75 mm diameter EMAA fiber, (B) 100-150 mm diameter EMAA fiber, (C) 100-150 mm diameter EMAA fiber mesh on woven carbon fiber ply, and SEM images of (D) healed $CFRP_p$, (E) fractured CFRP with no EMAA, and (F) healed $CFRP_fA$-100.

Fractured surfaces were cut from DCB with a diamond saw and then coated with 200-250 Å of carbon prior to mapping and mapping at 5 or 20 kV on a Leica S440 SEM. Potassium staining was carried out by soaking samples in 1 M KOH solution overnight and then rinsing off in distilled water. Energy dispersive spectroscopy (EDS) maps were smoothed using a median noise filter with a 10 pixel radius, colored using a 255 red photo filter and then overlaid onto the SEM image after aligning the potassium map via the corresponding secondary electron image.
Results and Discussion In this study, fibers with different diameters [FIGS. 42A and 42B show 50-75 and 100-150 μm diameter fibers, respectively] were produced by varying the speed of the collection reel on a mini Haake extruder. The fibers were woven into a loose mesh (of approximately 4 mm cubes) by winding single fibers around a metallic frame. Junctions in the mesh were then fused together in a 150° C. oven for 7.5 min between two metal plates covered with Teflon film to produce an EMAA mesh that could be placed as an interleaf on carbon fiber (FIG. 42C) during laminate production. Healing is initiated by heating the damaged material to above 100° C. whereby the EMAA becomes molten. More importantly, small bubbles in the EMAA expand at this temperature, resulting in flow of the healing agent into the material damaged region. The two factors, material selection of the healing agent and the pressure-driven delivery mechanism is critical; without it, strength recovery by (1) healing within the discrete EMAA particles and (2) rebinding of the adjacent epoxy fracture surfaces, would not have been achieved.

Despite the similarities, changing the EMAA conformation from particles (CFRP$_p$) to fibers (CFRP$_f$) resulted in significant changes in the fracture surface of healed laminates. Attributed to bubble expansion during healing, the fracture surfaces of healed CFRP$_p$ were dominated by smooth hemispherical voids surrounded by EMAA with a rough surface (FIG. 42D) and contained only small regions of the crosshatch pattern associated with the failure of the epoxycarbon fiber interface as seen in the CFRP$_p$ with no EMAA (FIG. 42E). An absence of crosshatch pattern indicated that the EMAA has covered most of the fracture surface during healing. In contrast to CFRP$_p$, healed CFRP$_f$ specimens possessed large regions with smoothed surfaces and crosshatched patterns as well as the regions of EMAA with rough surfaces identified in CFRP$_p$ (FIG. 42F). The changes in fracture surface between CFRP$_p$ and CFRP$_f$ could be a result of a change in healing agent delivery (incomplete delivery in the CFRP$_f$ leaving the crosshatch of the unhealed resin exposed) or a change in binding mechanism (adhesive failure in the EMAA resulting in templating of the crosshatch pattern onto EMAA). The complex appearance of healed CFRP$_f$ fracture surfaces made visual distinction between the EMAA and epoxy phases difficult.

Figure 43:
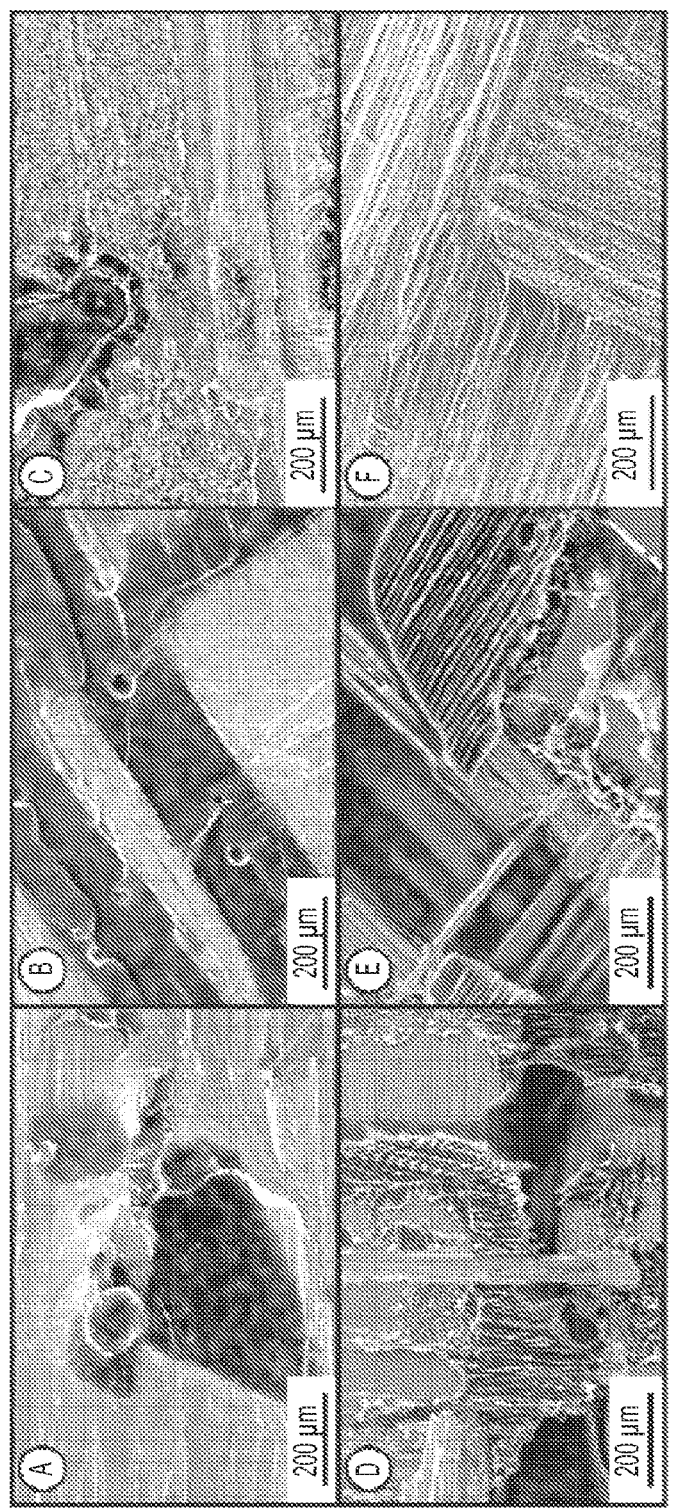
FIG. 43 shows SEM images of (A) fractured $CFRP_p$, (B) fractured $CFRP_f$, (C) healed $CFRP_p$, (D, E) $CFRP_fA$-100 healed, and (F) CFRP with no EMAA (all samples containing EMAA have been stained with aqueous potassium hydroxide and the EDS potassium map overlaid in red)

Potassium hydroxide (KOH) staining and EDS mapping were used to better differentiate between the EMAA and resin-rich phases in the healed fracture surfaces. This is achieved by reacting carboxylic acid groups in the EMAA phase not present in epoxy with a base to form regions rich in potassium salts. Overlays of potassium maps on SEM images of the same region of damaged and healed fracture surfaces provided insights to the EMAA morphology in the damaged region after initial fracture and healing. Staining the laminates with aqueous KOH revealed a number of differences between the healed CFRP$_p$ and CFRP$_f$ fracture surfaces. SEM images of the fracture surfaces from stained laminates revealed discrete EMAA particles and fibers in CFRP$_p$ (FIG. 43A) and CFRP$_f$ (FIG. 43B), respectively. The EDS maps from the healed fracture surface of potassium stained CFRP$_p$ (FIG. 43C) revealed a rough layer of EMAA covered most of the surface in the damaged region of the laminate. Regions of EMAA with smooth surfaces in the CFRP$_p$ only occurred inside EMAA particles and can be attributed to bubble expansion during healing. In contrast to CFRP$_p$, the healed fracture surface of CFRP$_f$ (FIGS. 2D and E) contained large areas of EMAA with a smooth or crosshatched appearance along with the rough layer of EMAA seen in CFRP$_p$. The large regions of EMAA with a smooth surface appear along the original fiber location leaving a thin EMAA layer coating the underlying epoxycarbon fiber features (FIG. 43E). The similarity in appearance of the smooth regions in CFRP$_f$ and the smooth surface inside the expanded bubbles in CFRP$_p$ particles suggests that these regions are formed via bubble expansion that occurs during healing. Therefore, it can be expected that the smooth EMAA regions and regions where no EMAA were present in CFRP$_f$ reflect areas in the damage plane did not rebind during healing and so do not contribute to strength recovered during healing. Conversely, close matching of the crosshatch pattern on the EMAA in the healed CFRP$_f$ to crosshatch patterns of the epoxy/carbon fiber fracture surface (FIG. 43F) suggest that these regions contributed to strength recovery, failing adhesively after being attached to the adjacent fracture surface during healing. These results indicate that the healing mechanism in laminates is similar to that seen in resins. However, using EMAA fibers instead of EMAA particles as a healing agent in CFRP promotes bubble growth along the EMAA fibers as well as adhesive failure between the EMAA and epoxy/carbon fiber regions during reloading of healed laminates.

A comparison of virgin CFRP, CFRP$_p$, and CFRP$_f$ properties revealed an increase in C$_{IC}$ and fracture energies as EMAA was added (Table 1). Increases in G$_{IC}$ with incorporation of EMAA into CFRP followed established trends of rubber particles/fiber laminate system.[14,15] While G$_{IC}$ clearly increased with additional EMAA content (Table 1), the increase of failure energy with EMAA content was only observed with the CFRPf series. Further work is needed to identify the true cause of this phenomenon; however, it is thought the difference stems from improved ability of EMAA fibers to arrest propagating crack growth with respect to the EMAA particles. Despite some differences between the particle- and fiber-based systems, these results show that the incorporation of the EMAA healing agent can also improve the toughness of virgin CFRP.

Healing of the damaged DCB at 150° C. for 30 min resulted in over 100% recovery peak load and energy to failure; however, G$_{IC}$ recovery is variable (Table 5) for both EMAA fibers and particles. The G$_{IC}$ calculation assumes linear elastic behavior in rigid materials but the EMAA healing agent is ductile. Thus, a change in stiffness can occur without crack growth and so the 5% stiffness limit is typically reached long before the peak load is sustained. A comparison of the load extension plots of CFRP$_p$ (FIG. 44A) and CFRP$_f$4-1000 (FIG. 44B) reveals a healing capability of over 100% in both these materials despite the 185 and 45% GIC recoveries recorded, respectively. Given the similarity in initial crack length in the mendable laminates, the peak loads and energy to fracture provide a better assessment of strength recovery than G$_{IC}$.

TABLE 5

Physical properties of laminates containing EMAA in different contents and confirmations.

| Laminate | EMAA content (gsm · ply$^{-1}$) | Virgin failure energy (J) | Virgin G$_{IC}$ (kJ · m$^{-2}$) | Failure energy recovery (%) | G$_{IC}$ Recovery | Peak load recovery (%) |
|---|---|---|---|---|---|---|
| CFRP$_p$ | 33 | 0.49 ± 0.04 | 0.85 ± 0.07 | 221 ± 17 | 185 ± 26 | 121 ± 3 |
| CFRP$_f$4-100 | 27 | 0.82 ± 0.10 | 0.68 ± 0.09 | 137 ± 10 | 45 ± 9 | 119 ± 3 |
| CFRP$_f$2-100 | 14 | 0.51 ± 0.04 | 0.28 ± 0.05 | 111 ± 9 | 156 ± 46 | 115 ± 3 |
| CFRP$_f$4-50 | 12 | 0.37 ± 0.01 | 0.27 ± 0.06 | 102 ± 8 | 95 ± 11 | 112 ± 3 |
| CFRP$_f$2-50 | 6 | 0.36 ± 0.02 | 0.23 ± 0.03 | 70 ± 5 | 58 ± 13 | 85 ± 3 |
| CFRP | 0 | 0.36 ± 0.01 | 0.17 ± 0.03 | — | — | — |

Figure 44:
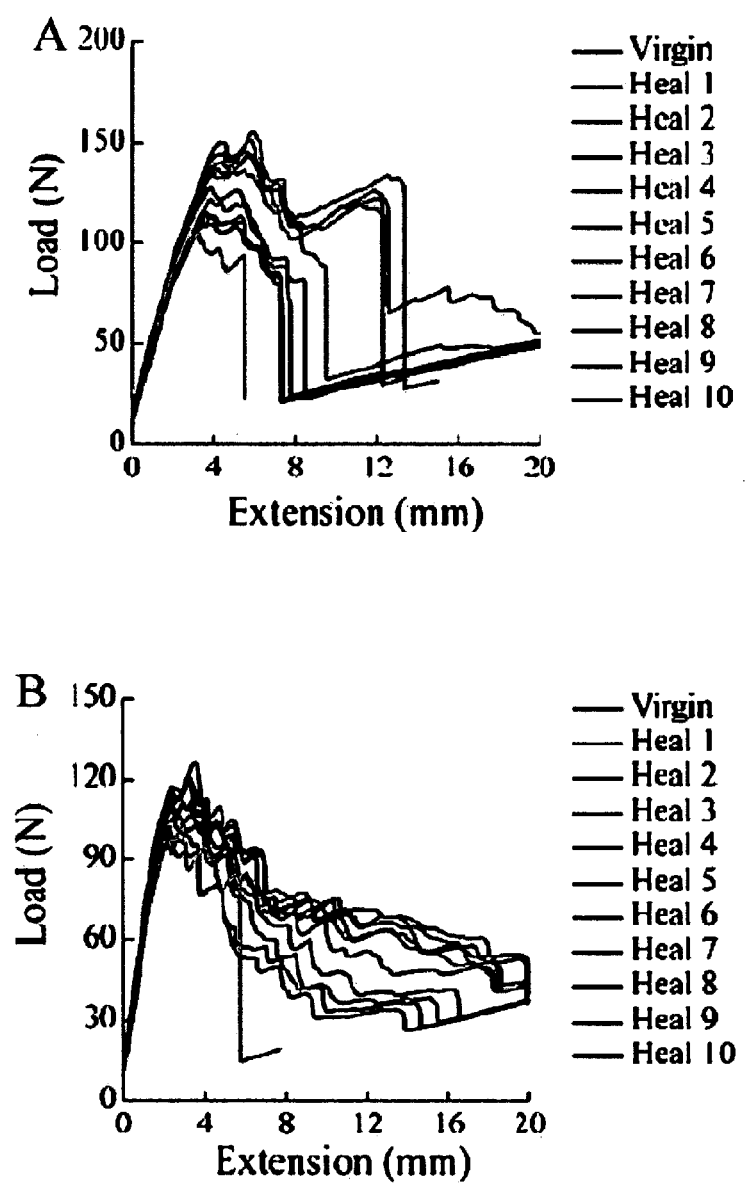
FIG. 44 shows load-extension plots of virgin and 10 healing cycles of (A) $CFRP_p$ and (B) $CFRP_fA$-100.

The difference in the percent of failure energy recovered between CFRP$_p$ and CFRP$_f$4-100 (both with similar EMAA contents) is likely due to the difference in initial energy to failure—the measured energy to failure in healed CFRP$_p$ and CFRP$_f$4-100 were 1076 and 1130 J, respectively. In addition strength recoveries achieved after 1 healing cycle, recoveries in peak load and failure energy were maintained over 10 healing cycles (FIG. 44). These plots also showed a loss in restored energy over repeated healing cycles. This loss in healing capability is thought to be caused by a gradual increase in carbon fiber breakage over repeated healing cycles. Adhesion of the EMAA to carbon fibers promotes carbon fiber breakage, evidenced by the carbon fibers seen adhered to the top of the EMAA layer in FIG. 43D. Fiber breakage results in reduction of laminate strength surrounding the crack and inhibits crack closure during healing leading to smaller healable areas of the laminate. With the aid of external heating blankets or in-built resistive heaters for in situ repair, it is postulated the mendable composite laminates could be integrated into wind-turbine blades, automotive or transport applications, given the impressive recoveries observed.

Conclusion

The thermoplastic fibers can be used as a healing agent capable of restoring over 100% $G_{IC}$, failure energy, and peak load in a damaged laminate over repeated healing cycles. The thermoplastic EMAA healing agent was incorporated into a CFRP as discrete particles and as continuous fibers in the form of a two-dimensional mesh. SEM imaging of potassium-stained laminates confirmed strength recoveries were achieved via rebinding of fracture surfaces by EMAA that had been delivered into the fracture plane. Even though SEM imaging revealed different surface structures between the $CFRP_p$ and $CFRP_f$, both EMAA conformations were capable of completely restoring the peak load after healing a closed DCB at 150° C. for 30 min.

The invention claimed is:

1. A self-healing polymer material comprising a primary polymer phase and a secondary polymer phase, wherein:
    the primary polymer phase comprises a thermoset polymer matrix;
    the secondary polymer phase comprises a thermoplastic polymer that is provided in the primary polymer phase as a dispersion of discrete portions in the form of particles and/or fibres that are capable of acting as a self-healing agent and are chemically reactive on post-curing or healing of the self-healing polymer material;
    the thermoplastic polymer is capable of flowing in the thermoset polymer matrix on post-curing or healing of the self-healing polymer material, and includes functional groups attached to and/or incorporated into a backbone of the polymer, the functional groups of the thermoplastic polymer being capable of chemical bonding or reaction with functional groups of the thermoset polymer matrix on post-curing or healing of the self-healing polymer material; and
    the functional groups attached to and/or incorporated into the backbone of the thermoplastic polymer are capable of forming a volatile by-product on chemical reaction with functional groups of the thermoset polymer matrix, on post-curing or healing of the self-healing polymer material.

2. The material of claim 1, wherein the secondary polymer phase is provided in an amount, on a volume basis with respect to the self-healing polymer material, in the range of 5 to 25%.

3. The material of claim 1, wherein:
    the functional groups of the thermoplastic polymer include one or more selected from the group consisting of amine, acid, hydroxyl, epoxy, ketone, ether, ester, or salts thereof, and
    the functional groups of the thermoset polymer matrix include one or more selected from the group consisting of epoxy, urethane, imide, cyanate ester, benoxazine, polyester, vinyl ester, phenolic, bismaleimide, amine, acid, hydroxyl, ketone, ether, ester, or salts thereof.

4. The material of claim 1, wherein the functional groups of the thermoplastic polymer include an acid, and the functional groups of the thermoset polymer matrix include one or more selected from the group consisting of epoxy, amine and hydroxyl.

5. The material of claim 4, wherein the amine is a tertiary amine.

6. The material of claim 1, wherein the thermoset polymer matrix is an epoxy based resin.

7. The material of claim 6, wherein the epoxy based resin is formed from a resin and a hardener.

8. The material of claim 7, wherein the resin is diglycidyl ether of bisphenol A (DGEBA).

9. The material of claim 7, wherein the hardener is triethylenetetraamine (TETA).

10. The material of claim 1, wherein the thermoplastic polymer is a functionalised polyolefin or copolymer thereof.

11. The material of claim 10, wherein the functionalised polyolefin or copolymer thereof is a functionalised polyethylene or copolymer thereof.

12. The material of claim 11, wherein the functionalised polyethylene or copolymer thereof is polyethylene co-methacrylic acid (EMAA).

13. The material of claim 1, wherein the discrete portions are in the form of particles having diameters in a range of 250-450 µm.

14. The material of claim 1, wherein the fibres each have diameters in a range of 100-150 µm.

15. The material of claim 1, wherein the particles and/or fibres are coated with an encapsulating agent.

16. The material of claim 1, further comprising one or more additives.

17. A fibre reinforced composite comprising a fibrous reinforcement component and the self-healing polymer material of claim 1.

18. A method for producing the self-healing polymer material of claim 1 comprising:
    dispersing the thermoplastic polymer into at least a first polymerizable thermoset agent; and
    curing the at least first polymerizable thermoset agent to form a thermoset polymer matrix where the thermoplastic polymer is embedded or dispersed within the thermoset polymer matrix.

19. The material of claim 1, wherein the volatile by-product is water that is formed from a condensation reaction between the functional groups.

20. The material of claim 1, wherein the discrete portions are in the form of particles having diameters of at least 50 µm.

21. The material of claim 20, wherein the discrete portions are in the form of particles having diameters in a range of 50 µm to 600 µm.

22. The material of claim 21, wherein the discrete portions are in the form of particles having diameters in a range of 100 µm to 500 µm.

* * * * *